(12) United States Patent
Kim et al.

(10) Patent No.: US 11,671,795 B2
(45) Date of Patent: Jun. 6, 2023

(54) METHOD AND APPARATUS FOR SUPPORTING MBS IN WIRELESS COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/346,862

(22) Filed: Jun. 14, 2021

(65) Prior Publication Data

US 2021/0392467 A1 Dec. 16, 2021

(30) Foreign Application Priority Data

Jun. 12, 2020 (KR) .................. 10-2020-0071847

(51) Int. Cl.
*H04W 4/00* (2018.01)
*H04W 4/06* (2009.01)
*H04W 28/06* (2009.01)
*H04L 1/1812* (2023.01)
*H04W 76/11* (2018.01)

(52) U.S. Cl.
CPC ............. *H04W 4/06* (2013.01); *H04L 1/1819* (2013.01); *H04W 28/06* (2013.01); *H04W 76/11* (2018.02)

(58) Field of Classification Search
CPC ....... H04W 4/06; H04W 28/06; H04W 76/11; H04W 48/12; H04W 52/0216; H04W 52/0219; H04W 52/0241; H04W 72/005; H04W 76/40; H04W 48/08; H04L 1/1819; H04L 1/1861; H04L 1/1896; H04L 5/0053; H04L 1/1848; H04L 5/0055; H04L 2001/0093
USPC .................................. 370/329, 330
See application file for complete search history.

(56) References Cited

U.S. PATENT DOCUMENTS

| | | | |
|---|---|---|---|
| 11,178,656 | B2 | 11/2021 | Jang et al. |
| 2011/0038299 | A1* | 2/2011 | Sugawara ............. H04L 12/189 370/312 |
| 2019/0190662 | A1 | 6/2019 | Lee et al. |
| 2020/0036542 | A1 | 1/2020 | Zhu et al. |
| 2020/0100142 | A1 | 3/2020 | Kim |
| 2020/0137652 | A1 | 4/2020 | Kim et al. |

(Continued)

FOREIGN PATENT DOCUMENTS

KR 10-1948801 B1 2/2019

OTHER PUBLICATIONS

International Search Report dated Sep. 16, 2021, issued in International Patent Application No. PCT/KR2021/007418.

*Primary Examiner* — Chuong T Ho
(74) *Attorney, Agent, or Firm* — Jefferson IP Law, LLP

(57) ABSTRACT

A method performed by a user equipment (UE) in a wireless communication system is provided. The method comprises receiving configuration information on a multicast broadcast service (MBS), and receiving, based on the configuration information, MBS data in a radio resource control (RRC)_Connected mode. The MBS data is transmitted to plurality of UEs including the UE for multicast transmission, or to the UE for unicast transmission. A Hybrid Automatic Repeat and request (HARQ) retransmission is applied to a transmission of the MBS data.

20 Claims, 21 Drawing Sheets

(56) References Cited

U.S. PATENT DOCUMENTS

| | | | |
|---|---|---|---|
| 2020/0323024 A1* | 10/2020 | Huang | H04W 4/06 |
| 2021/0037500 A1* | 2/2021 | Liu | H04B 7/0695 |
| 2021/0068003 A1* | 3/2021 | Kadiri | H04L 47/806 |
| 2021/0119732 A1* | 4/2021 | Zhu | H04L 1/0045 |
| 2021/0185566 A1* | 6/2021 | Zhu | H04W 24/10 |
| 2021/0204248 A1* | 7/2021 | Zhang | H04W 4/06 |
| 2021/0250918 A1* | 8/2021 | Liu | H04W 4/06 |
| 2021/0258918 A1* | 8/2021 | Hong | H04W 36/0007 |
| 2021/0345071 A1* | 11/2021 | Takeda | H04W 76/11 |

\* cited by examiner

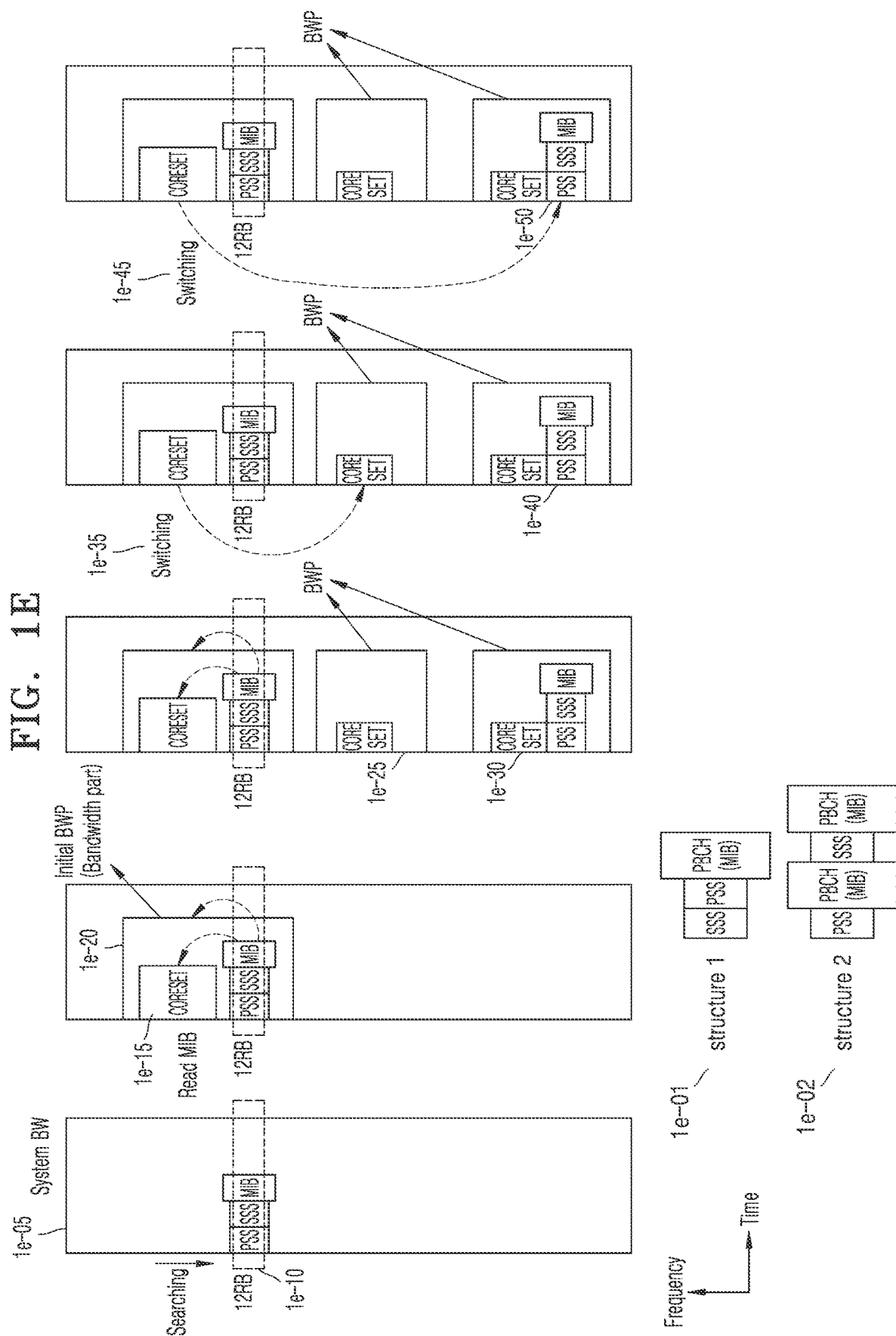

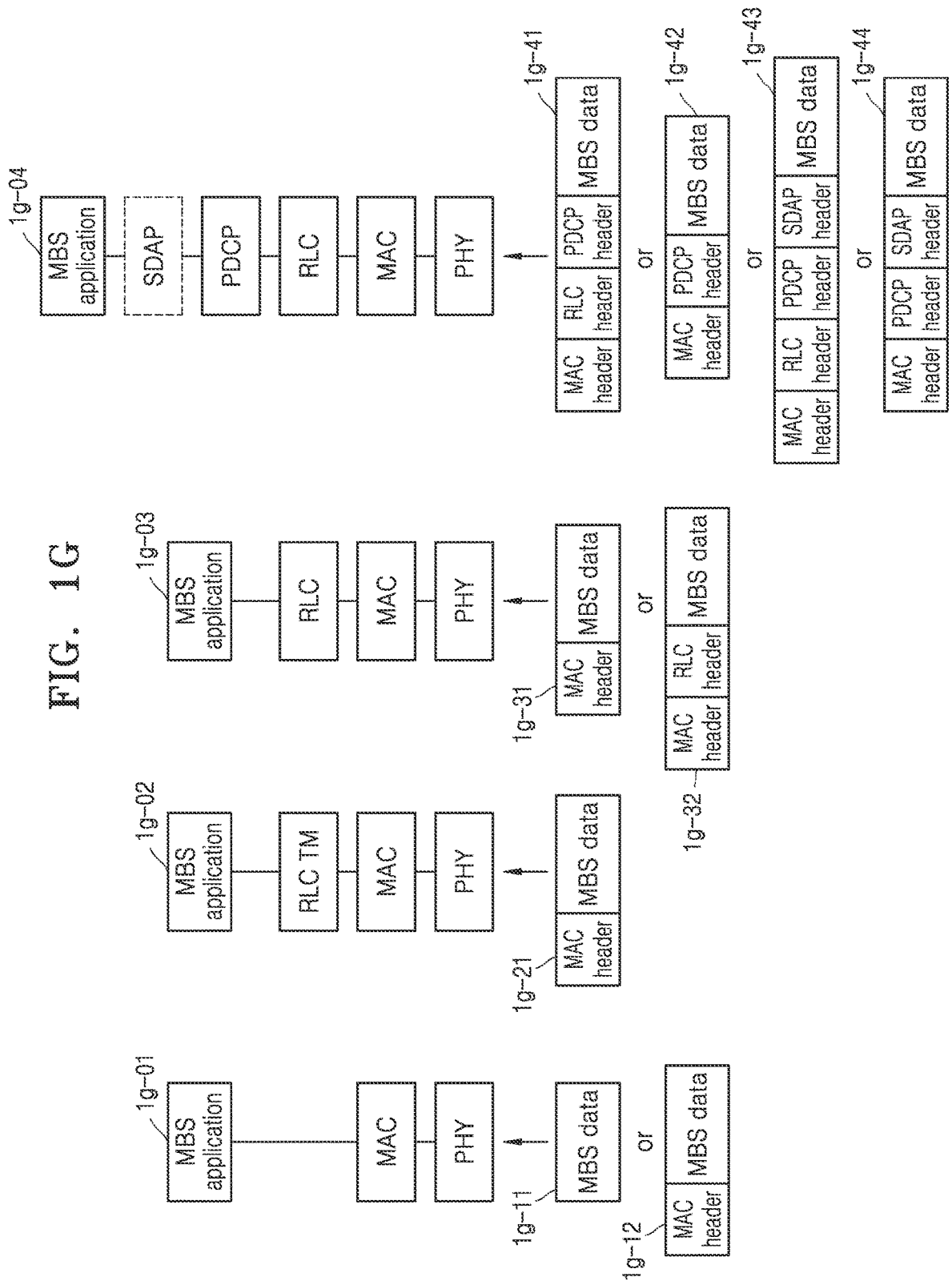

METHOD AND APPARATUS FOR SUPPORTING MBS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0071847, filed on Jun. 12, 2020, in the Korean Intellectual Property Office, the disclosure of which is incorporated by reference herein in its entirety.

BACKGROUND

1. Field

The disclosure relates to a method and apparatus for supporting a bearer structure supporting multicast or unicast in a next-generation mobile communication system.

2. Description of Related Art

To satisfy ever growing demand for wireless data traffics after the commercialization of a $4^{th}$ generation (4G) communication system, efforts have been made to develop an advanced $5^{th}$ generation (5G) or pre-5G communication system. Thus, the 5G communication system or the pre-5G communication system is called a communication system beyond a 4G network or a post-long term evolution (LTE) system. For achieving a high data transmission rate, it is considered to implement the 5G communication system in an ultrahigh frequency (mmWave) band (for example, a 60 GHz band). To alleviate propagation loss of radio waves and to increase a transmission distance of radio waves in an ultrahigh frequency band, techniques, such as beamforming, massive multi-input and multi-output (MIMO), full dimensional MIMO (FD-MIMO), an array antenna, analog beamforming, and a large scale antenna, have been discussed in the 5G communication system. Also, to improve a network of the system, techniques, such as an advanced small cell, a cloud radio access network (cloud RAN), an ultra-dense network, device-to-device (D2D) communication, wireless backhaul, a moving network, cooperative communication, coordinated multi-points (CoMP), and reception interference cancellation, have been developed in the 5G communication system. In addition, advanced coding modulation (ACM) schemes, namely, hybrid frequency shift keying (FSK) and quadrature amplitude modulation (QAM) (FQAM) and sliding window superposition coding (SWSC), and advanced access techniques, namely, a filter bank multi-carrier (FBMC), a non-orthogonal multiple access (NOMA), and a sparse coding multiple access (SCMA), have been developed, in the 5G communication system.

In the meantime, the Internet is evolving from a human-centered connectivity network where humans generate and consume information to an Internet of Things (IoT) network where distributed entities or things send, receive and process information. Internet of everything (IoE) technologies in which big data processing technologies, etc. based on connection with a cloud server, etc. are combined with the IoT technologies have also emerged. To implement the IoT, technological elements, such as a sensing technology, a wired/wireless communication and network infrastructure, a service interface technology, and a security technology, are required, and thus, recently, techniques for connection between things, such as a sensor network, machine-to-machine (M2M) communication, machine-type communication (MTC), etc., have been studied. In an IoT environment, intelligent Internet technology (IT) services that create new values in human life by collecting and analyzing data generated among connected things, may be provided. Based on convergence and combination between existing information technologies (IT) and various industries, the IoT may be applied to fields, such as smart homes, smart buildings, smart cities, smart cars or connected cars, smart grids, health care, smart home appliances and advanced medical services.

Thus, various attempts have been made to apply the 5G communication system to an IoT network. For example, techniques, such as a sensor network, M2M communication, MTC, etc., have been implemented based on 5G communication techniques, such as beamforming, MIMO, an array antenna, etc. As described above, that the cloud RAN may be applied as the big data processing technology may also be regarded as an example of the convergence between the 5G technology and the IoT technology.

As described above, various services can be provided with the development in a wireless communication system, and thus, there is a demand for a method for seamlessly providing the services. In particular, there is a demand for a structure or a configuration method of a multicast bearer or a unicast bearer for supporting a multicast or broadcast service (MBS) and a data processing method of a physical (PHY) layer, a medium access control (MAC) layer, a radio link control (RLC) layer, or a packet data convergence protocol (PDCP) layer configured to receive and process MBS data are required. Also, to support the MBS according to a handover between base stations or between networks, which support the MBS, or according to mobility of a terminal, a method of reconfiguring (or switching) a multicast bearer to a unicast bearer or reconfiguring (or switching) the unicast bearer to the multicast bearer is required.

The above information is presented as background information only to assist with an understanding of the disclosure. No determination has been made, and no assertion is made, as to whether any of the above might be applicable as prior art with regard to the disclosure.

SUMMARY

In a next-generation mobile communication system, in order to support a service such as a broadcast/multicast service, a mission critical service, or a public safety service, a multicast or broadcast service (MBS), a multimedia broadcast and multicast service (MBMS), or multicast and broadcast services may be supported. The MBS may be serviced to a terminal via a multicast bearer or a unicast bearer.

In order to support the MBS, a structure or a configuration method of a multicast bearer or a unicast bearer for supporting the MBS and a data processing method of a physical (PHY) layer, a medium access control (MAC) layer, a radio link control (RLC) layer, or a packet data convergence protocol (PDCP) layer configured to receive and process MBS data are required.

Also, a signaling procedure or an operation of a terminal has to be specified to continually support the MBS in a radio resource control (RRC) connected mode, an RRC idle mode, or an RRC inactive mode, or during conversion between the modes.

Also, to support the MBS according to a handover between base stations or between networks, which support the MBS, or according to mobility of a terminal, a method of reconfiguring (or switching) a multicast bearer to a unicast bearer or reconfiguring (or switching) the unicast bearer to the multicast bearer may be required.

Aspects of the disclosure are to address at least the above-mentioned problems and/or disadvantages and to provide at least the advantages described below. Accordingly, an aspect of the disclosure is to provide methods performed by a terminal to normally receive the MBS in various scenarios described above.

In accordance with an aspect of the disclosure, a method, performed by a user equipment (UE) in a wireless communication system, is provided. The method includes receiving configuration information on a MBS, and receiving, based on the configuration information, MBS data in a RRC_Connected mode. The MBS data is transmitted to plurality of UEs including the UE for multicast transmission, or to the UE for unicast transmission. A Hybrid Automatic Repeat and request (HARQ) retransmission is applied to a transmission of the MBS data.

In accordance with another aspect of the disclosure, a method, performed by a base station in a wireless communication system, is provided. The method includes transmitting, to a UE, configuration information on MBS, and transmitting, based on the configuration information, MBS data in a RRC_Connected mode. The MBS data is transmitted to plurality of UEs including the UE for multicast transmission, or to the UE for unicast transmission. A HARQ retransmission is applied to a transmission of the MBS data.

In accordance with yet another aspect of the disclosure, a UE in a wireless communication system, is provided. The UE includes a transceiver and at least one processor connected with the transceiver. The at least one processor is configured to receive configuration information on a MBS, and receive, based on the configuration information, MBS data in a RRC_Connected mode. The MBS data is transmitted to plurality of UEs including the UE for multicast transmission, or to the UE for unicast transmission. A HARQ retransmission is applied to a transmission of the MBS data.

In accordance with still another aspect of the disclosure, a base station in a wireless communication system, is provided. The base station includes a transceiver, and at least one processor connected with the transceiver. The at least one processor is configured to transmit, to a UE, configuration information on a MBS, and transmit, based on the configuration information, MBS data in a RRC_Connected mode. The MBS data is transmitted to plurality of UEs including the UE for multicast transmission, or to the UE for unicast transmission. A HARQ retransmission is applied to a transmission of the MBS data.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1E is a diagram of a procedure of providing a service to a terminal by efficiently using a large frequency bandwidth in a next-generation mobile communication system, according to an embodiment of the disclosure;

FIG. 1G is a diagram of a structure of a bearer that is established when a base station or a network supports a multicast or broadcast service (MBS) for a terminal in an RRC connected mode, an RRC inactive mode, or an RRC idle mode by configuring the MBS by using system information, an RRC message, or a control message for an MBS channel or a structure of a bearer that is established for the terminal to receive the MBS, according to an embodiment of the disclosure;

FIG. 1O is a diagram of signaling procedures for efficiently supporting an MBS according to an embodiment of the disclosure;

Throughout the drawings, like reference numerals will be understood to refer to like parts, components, and structures.

DETAILED DESCRIPTION

Figure 1A:
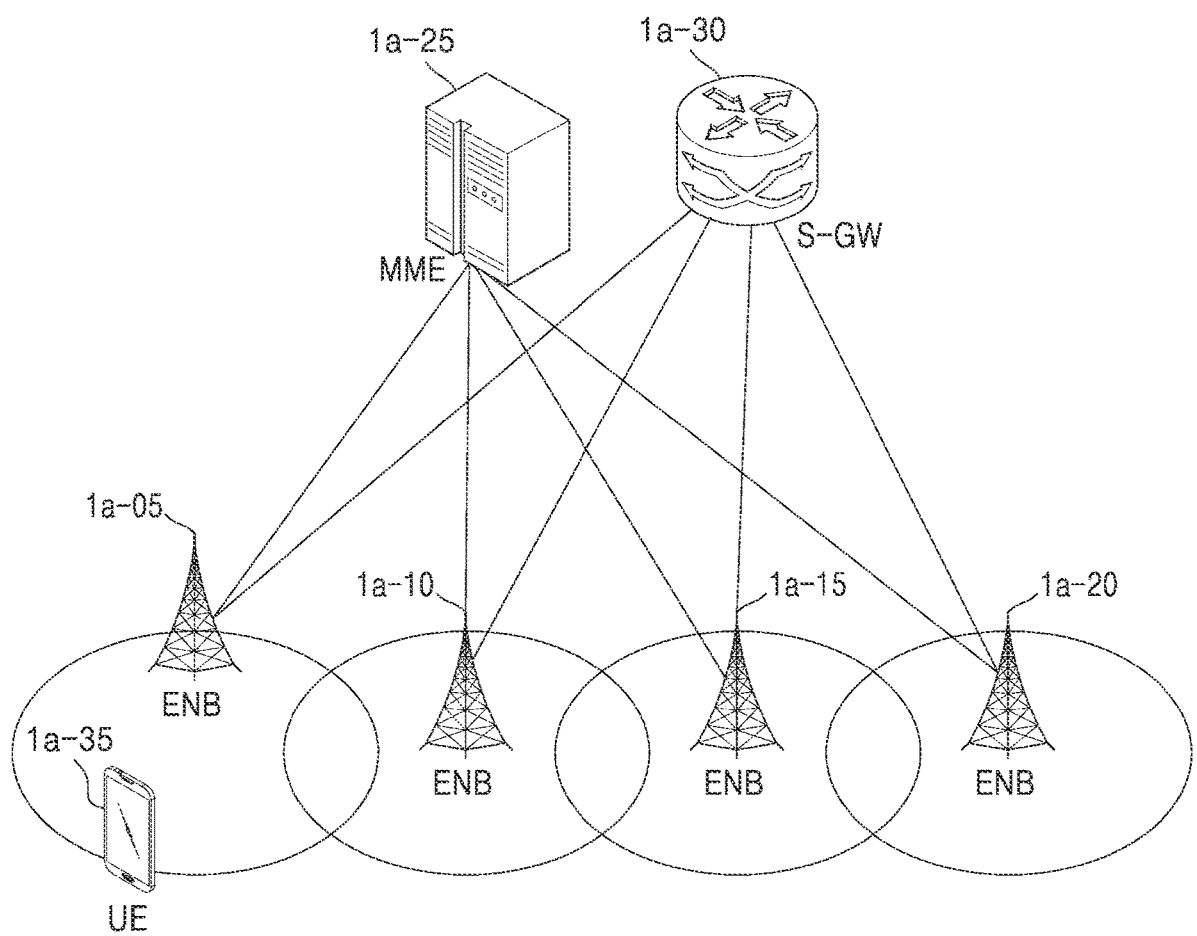
FIG. 1A is a diagram of a structure of a long term evolution (LTE) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

In describing the disclosure, when the detailed description of the relevant known functions or configurations is determined to unnecessarily obscure the gist of the disclosure, the detailed description thereof may be omitted. Hereinafter, embodiments of the disclosure are described by referring to the accompanying drawings.

The term for identifying an access node, the term referring to network entities, the term referring to messages, the term referring to an interface between network entities, the terms referring to a variety of identification information, and the like are exemplified for convenience of description. Therefore, the disclosure is not limited to the terms to be described later, and other terms referring to entities having an equivalent technical meaning may be used.

For convenience of description, the terms and names defined in the $3^{rd}$ Generation Partnership Project Long Term Evolution (3GPP LTE) standard are used herein. However, the disclosure is not limited by the terms and names and may be equally applied to systems conforming to other standards. The term "eNB" as used in the disclosure may be used interchangeably with the term "gNB" for convenience of description. That is, a base station described as the eNB may represent the gNB.

FIG. 1A is a diagram of a structure of a long term evolution (LTE) system, according to an embodiment of the disclosure.

Referring to FIG. 1A, a radio access network of the LTE system includes next-generation base stations (Evolved Node Bs, hereinafter eNBs, Node Bs, or BSs) 1a-05, 1a-10, 1a-15, and 1a-20, a mobility management entity (MME) 1a-25, and a serving-gateway (S-GW) 1a-30. A UE (or a terminal) 1a-35 accesses an external network through the eNBs 1a-05 to 1a-20 and the S-GW 1a-30.

Referring to FIG. 1A, the eNBs 1a-05 to 1a-20 may correspond to an existing Node B of a universal mobile telecommunication system (UMTS). The eNBs 1a-05 to 1a-20 may be connected to the UE 1a-35 through a radio channel and may perform a more complex role than the existing Node B. In the LTE system, all user traffics including real-time services such as voice over IP (VoIP) through an Internet protocol may be serviced through a shared channel. Therefore, an apparatus for collecting and scheduling status information such as buffer status, available transmission power status, and channel status of UEs may be required. This may be handled by the eNBs 1a-05 to 1a-20. One eNB may typically control a plurality of cells. For example, in order to implement a transmission rate of 100 Mbps, the LTE system may use, for example, an orthogonal frequency division multiplexing (hereinafter, referred to as OFDM) scheme in a 20-MHz bandwidth as a radio access technology. Also, an adaptive modulation & coding (hereinafter, referred to as AMC) scheme that determines a modulation scheme and a channel coding rate according to the channel status of the UE may be applied. The S-GW 1a-30 is an entity that provides data bearers and may add or release data bearers according to control by the MME 1a-25. The MME 1a-25 is an entity that is responsible for various control functions as well as mobility management functions for the UE and may be connected to a plurality of base stations.

Figure 1B:
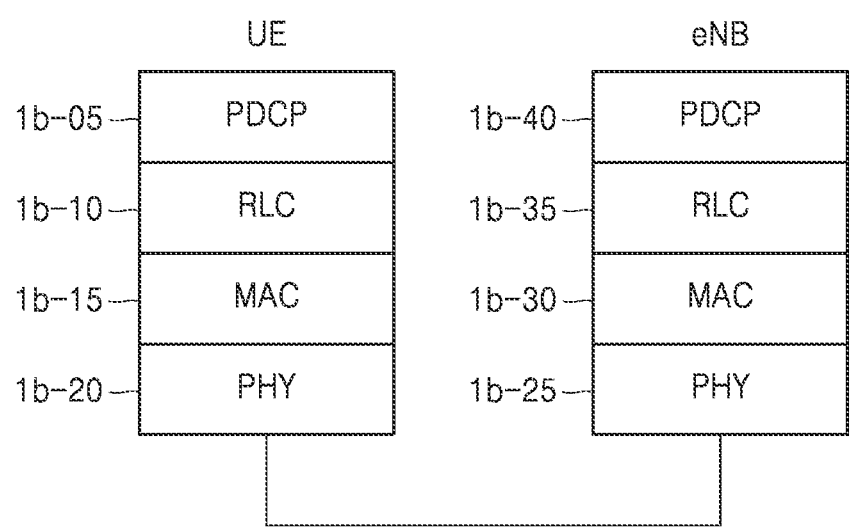
FIG. 1B is a diagram of a radio protocol architecture of an LTE system, according to an embodiment of the disclosure.

FIG. 1B is a diagram of a radio protocol architecture of an LTE system, according to an embodiment of the disclosure.

Referring to FIG. 1B, a wireless protocol of each of a UE and an eNB in the LTE system may include a packet data convergence protocol (PDCP) 1b-05 or 1b-40, a radio link control (RLC) 1b-10 or 1b-35, a medium access control (MAC) 1b-15 or 1b-30, and a physical entity (PHY) 1b-20 or 1b-25. The PDCPs 1b-05 and 1b-40 may be responsible for operations such as IP header compression/decompression. The main functions of the PDCP are summarized as follows.

Header compression and decompression function (Header compression and decompression: ROHC only).
    User data transfer function (Transfer of user data).
    In-sequence delivery function (In-sequence delivery of upper entity PDUs at PDCP re-establishment procedure for RLC AM).
    Reordering function (For split bearers in DC (only support for RLC AM): PDCP PDU routing for transmission and PDCP PDU reordering for reception).
    Duplicate detection function (Duplicate detection of lower layer SDUs at PDCP re-establishment procedure for RLC AM).
    Retransmission function (Retransmission of PDCP SDUs at handover and, for split bearers in DC, of PDCP PDUs at PDCP data-recovery procedure, for RLC AM).
    Ciphering and deciphering function (Ciphering and deciphering).
    Timer-based SDU discard function (Timer-based SDU discard in uplink).

The RLCs 1b-10 and 1b-35 may perform an automatic repeat request (ARQ) operation by reconfiguring a PDCP protocol data unit (PDU) to an appropriate size. The main functions of the RLC are summarized as follows.

Data transfer function (Transfer of upper entity PDUs).
    ARQ function (Error Correction through ARQ (only for AM data transfer)).
    Concatenation, segmentation, and reassembly function (Concatenation, segmentation and reassembly of RLC SDUs (only for UM and AM data transfer)).
    Re-segmentation function (Re-segmentation of RLC data PDUs (only for AM data transfer)).
    Reordering function (Reordering of RLC data PDUs (only for UM and AM data transfer)).
    Duplicate detection function (Duplicate detection (only for UM and AM data transfer)).
    Error detection function (Protocol error detection (only for AM data transfer)).
    RLC SDU discard function (RLC SDU discard (only for UM and AM data transfer)).
    RLC re-establishment function (RLC re-establishment).

The MACs 1b-15 and 1b-30 may be connected to the plurality of RLC entities configured in one UE and may perform an operation of multiplexing RLC PDUs into MAC PDUs and demultiplexing RLC PDUs from MAC PDUs. The main functions of the MAC are summarized as follows.

Mapping function (Mapping between logical channels and transport channels).
    Multiplexing/demultiplexing function (Multiplexing/demultiplexing of MAC SDUs belonging to one or different logical channels into/from transport blocks (TB) delivered to/from the physical entity on transport channels).
    Scheduling information reporting function (Scheduling information reporting).
    hybrid automatic repeat request (HARQ) function (Error correction through HARQ).
    Function of handling priority between logical channels (Priority handling between logical channels of one UE).
    Function of handling priority between UEs (Priority handling between UEs by means of dynamic scheduling).
    MBMS service identifying function (MBMS service identification).
    Transport format selecting function (Transport format selection).
    Padding function (Padding).

The PHYs entities 1b-20 and 1b-25 may perform an operation of channel-coding and modulating upper entity data, making the channel-coded and modulated upper entity data into OFDM symbols, and transmitting the OFDM symbols over a radio channel, or demodulating OFDM symbols received through a radio channel, channel-decoding the demodulated OFDM symbols, and transmitting the channel-decoded OFDM symbols to the upper entity.

Figure 1C:
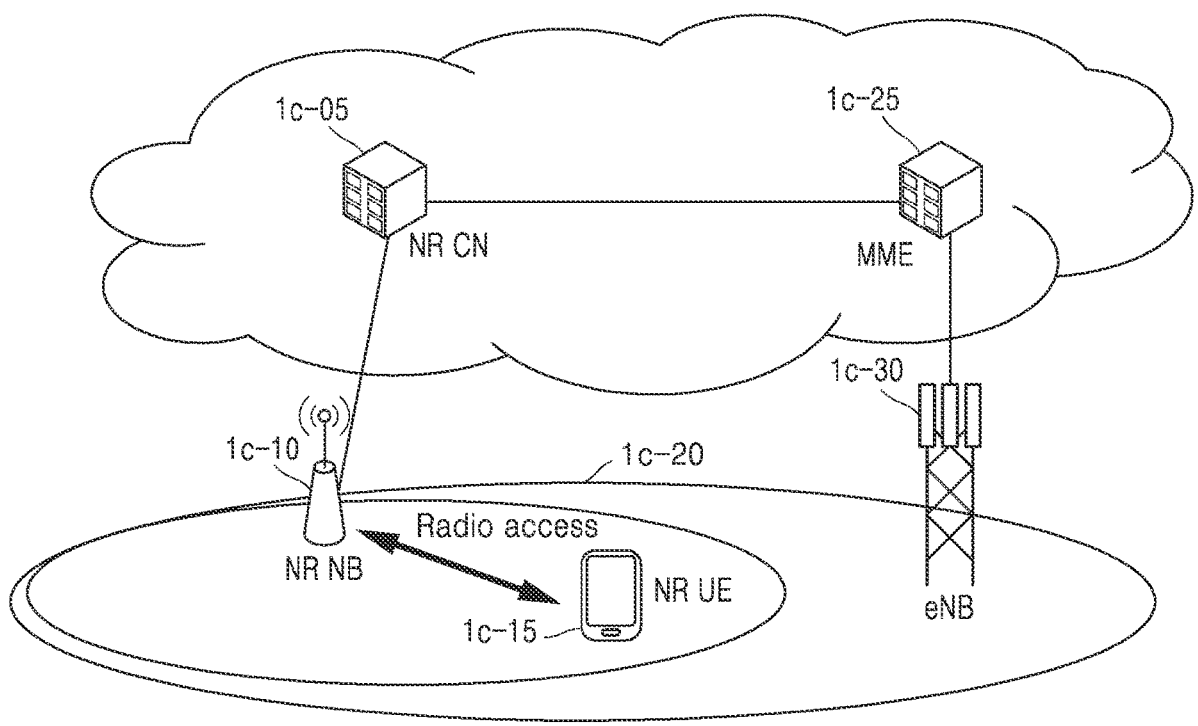
FIG. 1C is a diagram of an architecture of a next-generation mobile communication system, according to an embodiment of the disclosure.

FIG. 1C is a diagram of a structure of a next-generation mobile communication system, according to an embodiment of the disclosure.

Referring to FIG. 1C, a radio access network of the next-generation mobile communication system (hereinafter, a new radio (NR) system or a 5G system) includes a next-generation base station (a new radio Node B, hereinafter, an NR gNB or an NR BS) 1c-10 and a new radio core network (NR CN) 1c-05. A new radio user equipment (NR UE) (or a terminal) 1c-15 may access an external network through the NR gNB 1c-10 and the NR CN 1c-05.

Referring to FIG. 1C, the NR gNB 1c-10 corresponds to an eNB of an existing LTE system. The NR gNB 1c-10 may be connected to the NR UE 1c-15 through a radio channel and may provide a service superior to that of the existing Node B. In the next-generation mobile communication system, all user traffics may be serviced through a shared channel. Therefore, an apparatus for collecting and scheduling status information such as buffer status, available transmission power status, and channel status of NR UEs may be required. This may be handled by the NR gNB 1c-10. One NR gNB 1c-10 may typically control a plurality of cells. The next-generation mobile communication system may have more than the existing maximum bandwidth so as to implement ultra-high-speed data transmission compared to the existing LTE, and may additionally use a beamforming technology by using OFDM as a radio access technology. Also, an AMC scheme that determines a modulation scheme and a channel coding rate according to the channel status of the NR UE may be applied. The NR CN 1c-05 may perform functions such as mobility support, bearer configuration, and quality of service (QoS) configuration. The NR CN 1c-05 is an entity that is responsible for various control functions as well as a mobility management function for the NR UE, and may be connected to a plurality of base stations. Also, the next-generation mobile communication system may interoperate with the existing LTE system, and the NR CN 1c-05 may be connected to an MME 1c-25 through a network interface. The MME 1c-25 may be connected to an eNB 1c-30, which is the existing base station.

Figure 1D:
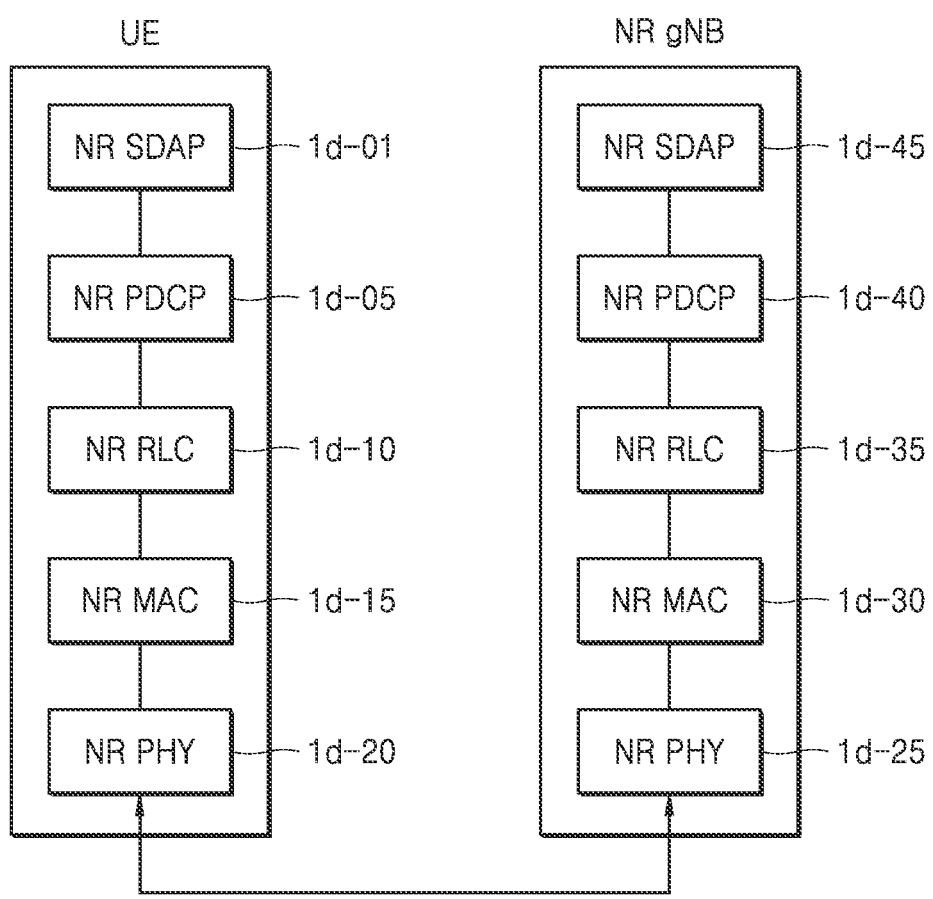
FIG. 1D is a diagram of a radio protocol architecture of a next-generation mobile communication system, according to an embodiment of the disclosure.

FIG. 1D is a diagram of a radio protocol architecture of a next-generation mobile communication system, according to an embodiment of the disclosure.

Referring to FIG. 1D, a wireless protocol of each of a UE and an NR gNB of the next-generation mobile communication system includes an NR SDAP 1d-01 or 1d-45, an NR PDCP entity 1d-05 or 1d-40, an NR RLC entity 1d-10 or 1d-35, an NR MAC 1d-15 or 1d-30, and a physical entity (PHY) 1d-20 or 1d-25.

The main function of the NR SDAP 1d-01 or 1d-45 may include one or a plural number of the following functions.

User data transfer function (transfer of user plane data).
    Function of mapping between QoS flow and data bearer for uplink (UL) and down link (DL) (mapping between a QoS flow and a data radio bearer (DRB) for both DL and UL).

Function of marking QoS flow ID in UL and DL (marking QoS flow ID in both DL and UL packets).

Function of mapping reflective QoS flow to data bearer for UL SDAP PDUs (reflective QoS flow to DRB mapping for the UL SDAP PDUs).

In regard to the SDAP entities, the UE may receive an RRC message to configure whether to use the header of the SDAP entity or whether to use the function of the SDAP entity for each PDCP entity, for each bearer, or for each logical channel. Also, when the SDAP header is configured, a 1-bit non-access stratum (NAS) reflective QoS indicator and a 1-bit access stratum (AS) reflective QoS indicator of the SDAP header may indicate the UE to update or reconfigure mapping information between a QoS flow and a data bearer for UL and DL. The SDAP header may include QoS flow ID information indicating QoS. The QoS information may be used as data processing priority, scheduling information, etc., for supporting efficient services.

The main functions of the NR PDCPs entities 1d-05 and 1d-40 may include some of the following functions.

Header compression and decompression function (Header compression and decompression: ROHC only).

User data transfer function (Transfer of user data).

In-sequence delivery function (In-sequence delivery of upper entity PDUs).

Out-of-sequence delivery function (Out-of-sequence delivery of upper entity PDUs).

Reordering function (PDCP PDU reordering for reception).

Duplicate detection function (Duplicate detection of lower layer SDUs).

Retransmission function (Retransmission of PDCP SDUs).

Ciphering and deciphering function (Ciphering and deciphering).

Timer-based SDU discard function (Timer-based SDU discard in uplink).

The reordering function of the NR PDCP entities 1d-05 and 1d-40 may refer to a function of reordering PDCP PDUs received from the lower layer in sequence based on a PDCP sequence number (SN). The reordering function of the NR PDCP entities 1d-05 and 1d-40 may include a function of transmitting data to the upper entity in reordered order, a function of immediately transmitting data without considering the order, a function of reordering PDCP PDUs and recording lost PDCP PDUs, a function of reporting the status of the lost PDCP PDUs to a sender, and a function of requesting retransmission of the lost PDCP PDUs.

The main functions of the NR RLCs entities 1d-10 and 1d-35 may include some of the following functions.

Data transfer function (Transfer of upper entity PDUs).

In-sequence delivery function (In-sequence delivery of upper entity PDUs).

Out-of-sequence delivery function (Out-of-sequence delivery of upper entity PDUs).

ARQ function (Error correction through ARQ).

Concatenation, segmentation, and reassembly function (Concatenation, segmentation and reassembly of RLC SDUs).

Re-segmentation function (Re-segmentation of RLC data PDUs).

Reordering function (Reordering of RLC data PDUs).

Duplicate detection function (Duplicate detection).

Error detection function (Protocol error detection).

RLC SDU discard function (RLC SDU discard).

RLC re-establishment function (RLC re-establishment).

The in-sequence delivery function of the NR RLC entities 1d-10 and 1d-35 may refer to a function of transmitting RLC SDUs received from the lower layer to the upper entity in sequence. When the RLC SDU, which is originally one, is segmented into a plurality of RLC SDUs, and the plurality of RLD SDUs are received, the in-sequence delivery function of the NR RLC entity may include a function of reassembling the received RLD SDUs and transmitting the reassembled RLD SDUs, a function of reordering received RLC PDUs based on an RLC SN or a PCDP SN, a function of reordering the RLC PDUs and recording the lost RLC PDUs, a function of reporting the status of the lost RLC PDUs to the sender, and a function of requesting retransmission of the lost RLC PDUs. When there is the lost RLC SDU, the in-sequence delivery function of the NR RLC entities 1d-10 and 1d-35 may include transmitting only RLC SDUs up to before the lost RLC SDU to the upper entity in sequence. Also, when there is the lost RLC SDU but a certain timer has expired, the in-sequence delivery function of the NR RLC entities 1d-10 and 1d-35 may include transmitting all RLC SDUs received before the start of the timer to the upper entity in sequence, or when there is the lost RLC SDU and a certain timer has expired, the in-sequence delivery function of the NR RLC entities 1d-10 and 1d-35 may include transmitting all RLC SDUs received so far to the upper entity in sequence. Also, the NR RLC entities 1d-10 and 1d-35 may process the RLC PDUs in the order of reception (in the order of arrival regardless of the order of serial number and sequence number) and transmit the processed RLC PDUs to the PDCP entity regardless of the order (out-of sequence delivery). When the received RLC PDUs are segments, segments stored in a buffer or to be received in the future may be received, reconfigured into one complete RLC PDU, and processed and transmitted to the PDCP entity. The NR RLC entities 1d-10 and 1d-35 may not include the concatenation function, and the concatenation function may be performed by the NR MAC entity, or may be replaced with the multiplexing function of the NR MAC entity.

The out-of-sequence delivery function of the NR RLC entities 1d-10 and 1d-35 may refer to a function of transmitting RLC SDUs received from the lower layer directly to the upper entity regardless of the order, and when one RLC SDU is received after being segmented into a plurality of RLC SDUs, may include a function of reassembling and transmitting the segmented and received RLC SDUs and a function of storing the RLC SN or PDCP SN of the received RLC PDUs, reordering the RLC PDUs, and recording the lost RLC PDUs.

The NR MACs 1d-15 and 1d-30 may be connected to a plurality of NR RLC entities configured in one UE, and the main functions of the NR MACs 1d-15 and 1d-30 may include some of the following functions.

Mapping function (Mapping between logical channels and transport channels).

Multiplexing and demultiplexing function (Multiplexing/demultiplexing of MAC SDUs).

Scheduling information reporting function (Scheduling information reporting).

HARQ function (Error correction through HARQ).

Function of handling priority between logical channels (Priority handling between logical channels of one UE).

Function of handling priority between UEs (Priority handling between UEs by means of dynamic scheduling).

MBMS service identifying function (MBMS service identification).

Transport format selecting function (Transport format selection).

Padding function (Padding).

The NR PHY layers 1d-20 and 1d-25 may channel-code and modulate upper entity data, make the channel-coded and modulated upper entity data into OFDM symbols, and transmit the OFDM symbols over a radio channel, or may demodulate OFDM symbols received through a radio channel, channel-decode the demodulated OFDM symbols, and transmit the channel-decoded OFDM symbols to the upper entity.

In the next-generation mobile communication system, a frequency in an ultrahigh frequency band may be used, and thus, a frequency bandwidth may also be significantly large. However, in terms of realization of a UE, it requires high realization complexity and incurs large costs to support all frequencies of a significantly large bandwidth. Thus, in a next-generation mobile communication system, a concept of a bandwidth part (BWP) may be introduced, and a plurality of BWPs may be configured in one cell (a special cell (SPCell) or a secondary cell (SCell)) and data may be transmitted and received in one or more BWPs according to an indication of a base station.

The disclosure provides a status transition method considering a status of a SCell and a plurality of BWPs configured in the SCell or a BWP switching method and its detailed operation, when a dormant BWP is adopted. Also, the disclosure provides a method of managing an idle mode in a BWP level and transitioning a status and a method of switching a BWP, as well as a detailed operation with respect to the BWP according to a status of each SCell, a status of each BWP, or a mode (active, inactive, or idle).

Also, according to an embodiment of the disclosure, a plurality of BWPs may be configured in one cell (an SPCell, a primary cell (PCell), a primary SCell (PSCell), or an SCell) for each DL or for each UL, and an active BWP (an active DL or UL BWP), a dormant BWP (a dormant DL BWP), or an inactive BWP (an inactive or deactivated DL/UL BWP) may be configured and operated via switching the BWPs. That is, a DL BWP or a UL BWP may be transitioned to an active state with respect to one cell, and thus, by using a similar method to a carrier integration technique, a data transmission rate may be increased. Also, by transitioning or switching the DL BWP to a dormant BWP, the UE may not perform physical downlink control channel (PDCCH) monitoring on the above cell to reduce battery consumption, and the UE may perform channel measurement on the DL BWP and report a result of the channel measurement to subsequently support a quick activation of the cell or the BWP. Also, by transitioning the DL (or UL) BWP to an inactive state in the cell, the battery consumption of the UE may be reduced. Status transition for each BWP with respect to each cell or switching of the BWP may be configured or indicated by using an RRC message, a MAC control element (CE), or downlink control information (DCI) of the PDCCH.

In this disclosure, the BWP may be used without distinguishing between a UL and a DL and may refer to each of a UL BWP and a DL BWP based on the context.

In this disclosure, a link may be used without distinguishing between a UL and a DL and may refer to each of the UL and the DL based on the context.

In this disclosure, a dormant BWP may be configured or adopted with respect to a SCell of a UE performing a carrier integration technique, and a PDCCH may not be monitored in the dormant BWP to reduce battery consumption. Also, in the dormant BWP, channel measurement may be performed and reported (for example, channel state information (CSI) or channel quality information (CQI) may be measured and reported), or beam measurement, beam tracing, or beam operation may be performed, and thus, when data transmission is required, the dormant BWP may be switched or activated into a normal BWP so that the data transmission may be rapidly started in the normal BWP. The dormant BWP may not be configured or applied with respect to an SPCell (a PCell of MCG or a PCell (or a PSCell) of SCG), or an SCell in which a PUCCH is configured that has to continually monitor a signal, transmit or receive feedback, or identify and maintain synchronization.

In the disclosure, various embodiments are provided, which operate based on DCI of a PDCCH, a MAC CE, or an RRC message to operate the dormant BWP with respect to the SCell for the UE.

A network or a base station may configure a SPCell (a PCell and a PSCell) and a plurality of SCells for a UE. A SPCell may refer to a PCell when a UE communicates with one base station and may refer to a PCell of a master base station or a PS Cell of a secondary base station when the UE communicates with two base stations (the master base station and the secondary base station). The PCell or the PSCell indicates a main cell used by each MAC entity when the UE and the base station communicate with each other, and denotes a cell that adjusts a timing for synchronization, performs random access, transmits HARQ ACK/NACK feedback via a PUCCH transport resource, and exchanges most of control signals. A technique in which a base station operates a plurality of SCells with the SPCell to increase a transport resource and increase a UL or DL data transport resource is referred to as a carrier integration technique.

When the UE is configured with a SPCell and a plurality of SCells via an RRC message, the UE may be configured with a state or a mode with respect to the SCell and a BWP of each of the SCells via the RRC message, the MAC CE, or the DCI of the PDCCH. The state or the mode of the SCells may be configured as an active mode, an activated state, a deactivated mode, or a deactivated state. That the SCell is in an active mode or an activated state may denote that in the SCell in the active mode or in the activated state, the UE, in a BWP of the SCell other than an activated BWP, an activated normal BWP, or an activated dormant BWP, may exchange UL data and DL data with the base station, may monitor a PDCCH to identify indications of the base station, may perform channel measurement on a DL of the SCell in the active mode or the activated state (or the BWP of the SCell, except for the activated BWP, the activated normal BWP, or the activated dormant BWP), may periodically report measurement information to the base station, and may periodically transmit a pilot signal (a sounding reference signal (SRS)) to the base station so that the base station may perform UL channel measurement.

However, that the SCell is in a deactivated mode or a deactivated state may denote that, because BWPs configured in the SCell are in deactivated states, the configured BWPs are not activated, or there is no activated BWP from among configured BWPs, the UE may not exchange data with the base station, may not monitor the PDCCH to identify indications of the base station, may not perform channel measurement, may not perform measurement reporting, and may not transmit a pilot signal.

Thus, to activate the SCells in the deactivated mode, first, the base station may configure, for the UE, frequency measurement configuration information by using an RRC message, and the UE may perform cell or frequency measurement based on the frequency measurement configuration information. Also, the base station may receive a report of the cell or frequency measurement from the UE, and then, may activate the deactivated SCells based on the frequency/channel measurement information. Thus, a large delay occurs, when the base station activates a carrier integration technique for the UE and starts data transmission and reception.

In the disclosure, to reduce battery of the UE and rapidly start data transmission or reception, an idle mode or a dormant state with respect to a BWP of each activated SCell (or active SCell) is provided, or configuration or adoption of a dormant BWP with respect to each activated SCell is provided.

In the BWP in the idle mode or the dormant BWP in the activated SCell, or when the dormant BWP is activated, the UE may not exchange data with the base station, may not monitor the PDCCH to identify indications of the base station, or may not transmit the pilot signal, but the UE may perform channel measurement and may report a measurement result with respect to a measured frequency/cell/channel, periodically, or when an event occurs according to a configuration of the base station. Thus, because the UE does not monitor the PDCCH and transmit the pilot signal in the dormant BWP in the activated SCell, battery may be reduced, compared to a normal BWP (or a BWP except for the dormant BWP) in the activated SCell or compared to when the normal BWP (or the BWP except for the dormant BWP) in the activated SCell is activated. Also, unlike when the SCell is deactivated, the UE may report the channel measurement, and thus, the base station may, based on the measurement repot or the measurement report of the dormant BWP in the activated SCell, quickly activate the normal BWP in the activated SCell to rapidly use the carrier integration technique, and thus, a transmission delay may be reduced.

Thus, in the disclosure, that the SCell is in an active mode or an activated state may denote that, in the SCell in the active mode or in the activated SCell, the UE, in the BWP of the SCell, except for the activated BWP, the activated normal BWP, or the activated dormant BWP, may exchange UL data and DL data with the base station, may monitor the PDCCH to identify indications of the base station, may perform channel measurement on the DL of the SCell in the active mode or the activated state (or the BWP of the SCell, except for the activated BWP, the activated normal BWP, or the activated dormant BWP), may periodically report measurement information to the base station, and may periodically transmit the pilot SRS to the base station so that the base station may perform UL channel measurement. Also, in the disclosure, that the SCell is in the active mode or the activated state may denote that the UE, in the activated dormant BWP in the Scell in the activated mode or in the activated state, may not exchange UL data or DL data with the base station and may not monitor the PDCCH to identify indications of the base station, but the UE may perform channel measurement on the DL of the activated dormant BWP in the SCell in the active mode or in the activated state and may periodically report measurement information to the base station.

Also, in the disclosure, the dormant BWP may indicate a state of the BWP, or the dormant BWP may be used as a term for a logical concept indicating a specific BWP. Thus, the dormant BWP may be activated, deactivated, or switched. For example, an indication to switch a second activated BWP in a first SCell to a dormant BWP, an indication to inactivate the first SCell or transition the first SCell to an idle mode, or an indication to activate the dormant BWP in the first SCell may be interpreted to have the same meaning.

Also, in the disclosure, the normal BWP may indicate BWPs other than the dormant BWP from among BWPs configured in each SCell for the UE via the RRC message. In the normal BWP, the UE may exchange UL data or DL data with the base station, may monitor the PDCCH to identify indications from the base station, may perform channel measurement on the DL, may periodically report measurement information to the base station, and may periodically transmit a pilot SRS to the base station so that the base station may perform UL channel measurement. Also, the normal BWP may denote a first activated BWP, a default BWP, a first activated BWP from a dormant state, or an initial BWP.

Also, only dormant BWP may be configured with respect to a DL, from among BWPs configured in each SCell for the UE. According to another method, one dormant BWP may be configured with respect to the UP or the DL from among the BWPs configured in each SCell for the UE.

FIG. 1E is a diagram of a procedure of providing service to a UE by efficiently using a large frequency bandwidth in a next-generation mobile communication system, according to an embodiment of the disclosure.

Referring to FIG. 1E, it is described how efficiently a next-generation mobile communication system uses a significantly large frequency bandwidth to provide services to UEs having different capabilities or categories and allow the UEs to reduce battery.

One cell to which a base station provides a service may receive a service of a significantly large frequency band 1e-05. However, in order to provide a service to UEs having different capabilities, a large frequency band may be segmented into a plurality of BWPs and managed as one cell.

First, a UE that is early turned on may search for the entire frequency band provided by an operator (PLMN) in units of a predetermined resource block (for example, in units of 12 resource blocks (RBs). That is, the UE may start to search for a primary synchronization sequence (PSS)/secondary synchronization sequence (SSS) in the entire system bandwidth in units of the RB 1e-10. When the UE searches for the PSS/SSS 1e-01 or 1e-02 in units of the RB and detects the signals, the UE may read and interpret (decode) the signals to identify a boundary between a sub-frame and a radio transport resource frame. Thus, the sub-frame may be identified in units of a 1 ms, and the base station may be synchronized with a DL signal. The RB may be defined as a two-dimensional unit based on sizes of a predetermined frequency resource and a predetermined time resource. For example, based on the time resource, the RB may be defined as the unit of a 1 ms, and based on the frequency resource, the RB may be defined as the unit of 12 sub-carriers (1 carrier×15 kHz=180 kHz). After completing synchronization, the UE may identify a master system information block (MIB) or minimum system information (MSI) to identify information of a control resource set (CORESEST) and identify initial access BWP information (1e-15 and 1e-20). The CORESET information refers to a location of a time/frequency transport resource through which a control signal is transmitted from the base station and for example indicates a location of a transport resource through which a PDCCH is transmitted. That is, the CORESET information may be information indicating from where first system information (system information block 1 (S1B1)) is transmitted, and the CORESET information may indicate via which frequency/time resource the PDCCH is transmitted. When the UE reads the first system information, the UE may identify information about the initial BWP. As described above, the UE may complete synchronization of a DL signal with the base station, and when the UE may receive the control signal, the UE may, in the initial BWP of a cell to which the UE is camped on, perform a random access process, request an RRC connection configuration, receive an RRC message, and perform the RRC connection configuration.

In the RRC connection configuration, a plurality of BWPs may be configured for each cell (PCell, PSCell, SPCell, or SCell). In one cell, a plurality of BWPs may be configured for the DL, and additionally, a plurality of BWPs may be configured for the UL.

The plurality of BWPs may be indicated or configured via a BWP identifier so as to be used as initial BWPs, default BWPs, first active BWPs, dormant BWPs, or first active BWPs from dormant states.

The initial BWP may be used as a BWP defined as cell specific that exists in each cell, and may be used as a BWP, which is used when a UE initially accessing a cell configures connection to the cell through a random access process or performs synchronization after configuring the connection. Also, the base station may configure each of an initial downlink BWP to be used in the DL and an initial uplink BWP to be used in the UL for each cell. Also, configuration information with respect to the initial BWP may be broadcast via the first system information (system information 1, S1B1) indicated by the CORESET, and the base station may reconfigure, to the UE accessing the connection, the initial UL BWP by using the RRC message. Also, the initial BWP may be used by being designated with the number 0 of a BWP identifier in each of the UL and the DL. That is, all UEs accessing the same cell may use the initial BWP by equally designating the initial BWP via the BWP identifier of number 0. That is because, when, in the performance of the random access process, the base station may transmit a random access response (RAR) message through the initial BWP which may be read by all UEs, a competition-based random access process may become simple.

The first active BWP may be differently configured for each UE (UE specific) and may be indicated from among a plurality of BWPs by being designated with a BWP identifier. The first active BWP may be configured for each of the DL and the UL, and each of a first active DL BWP and a first active UL BWP may be configured via a BWP identifier. The first active BWP may be used to indicate which BWP is to be first activated and used when a plurality of BWPs are configured in one cell. For example, when a PCell or a PSCell, and a plurality of SCells are configured for the UE, and a plurality of BWPs are configured in the PCell or the PSCell, or the SCells, the UE may activate and use the first active BWP from among the plurality of BWPs configured in the PCell or the PSCell, or the SCells, when the PCell or the PSCell, or the SCells are activated. That is, the UE may activate and use the first active DL BWP with respect to the DL and the first active UL BWP with respect to the UL.

An operation in which the UE switches a current DL BWP or an activated DL BWP in the SCell to activate the current DL BWP or the activated DL BWP in the Scell to the first active DL BWP (or a BWP configured or indicated via an RRC message) or switches a current UL BWP or an activated UL BWP in the SCell to activate the current UL BWP or the activated UL BWP in the Scell to the first active UL BWP (or a BWP configured or indicated via an RRC message), may be performed, when the UE receives an indication to activate the Scell or the BWP in a deactivated state, via an RRC message, MAC control information, or DCI. Also, the operation may be performed, when the UE receives an indication to transition the Scell or the BWP to a dormant state, via the RRC message, the MAC control information, or the DCI. That is because, when, in the activation of the Scell or the BWP, the current DL BWP or the activated DL BWP is switched to be activated to the first active DL BWP (or the BWP configured or indicated by using the RRC message) or the UL BWP is switched to be activated to the first active UL BWP (or the BWP configured or indicated by using the RRC message), even when channel measurement and report is performed in a dormant state, the frequency/channel measurement may have to be performed and reported with respect to the first active DL/UL BWP, for the base station to effectively use the carrier integration technique.

The default BWP may be differently configured for each UE (UE specific) and may be indicated from among a plurality of BWPs by being designated via a BWP identifier. The default BWP may be configured only with respect to the DL. The default BWP may be used as a BWP to which an activated BWP from among a plurality of downlink BWPs is to fall back after a predetermined time. For example, a BWP deactivation timer (BWP inactivity timer) may be configured for each cell or each BWP by using an RRC message, and the BWP deactivation timer may be started or re-started when data transmission and reception occur in an activated BWP other than the default BWP or may be started or re-started when the activated BWP is switched to other BWPs. When the BWP deactivation timer is expired, the UE may fall back or switch the active DL BWP in the cell to the default BWP. Switching may denote a process of inactivating a current active BWP and activating a BWP to which switching is indicated, and the switching may be triggered via an RRC message, MAC control information (MAC CE), or L1 signaling (DCI of the PDCCH). Switching may be triggered by indicating a BWP to be switched to or activated, and the BWP may be indicated by a BWP identifier (for example, 0, 1, 2, 3, or 4).

The reason that the default BWP is used by being applied only to the DL is because the base station may allow the UE to fall back to the default BWP after a certain period of time, for each cell, to receive an indication (for example, the DCI of the PDCCH) of the base station, and thus, scheduling of the base station may become simple. For example, when the base station configures the default BWP of the UEs accessing one cell as an initial BWP, after a certain period of time, the base station may perform scheduling indication only with respect to the initial BWP. When the default BWP is not configured in the RRC message, the initial BWP may be considered as the default BWP and the BWP may fall back to the initial BWP when the BWP deactivation timer is expired.

According to another method, in order to increase a degree of freedom of an embodiment of the base station, the default BWP may be defined and configured also with respect to the UL and may be used in the same method as the default BWP of the DL.

A dormant BWP denotes a BWP in an idle mode or a dormant BWP in an activated SCell, or when the dormant BWP is activated, the UE may not exchange data with the base station, may not monitor a PDCCH to identify an indication of the base station, or may not transmit a pilot signal, but may perform channel measurement and may report a measurement result with respect to a measured frequency/cell/channel periodically or when an event occurs, according to a configuration of the base station. Thus, because the UE does not monitor the PDCCH and transmit the pilot signal in the dormant BWP in the activated SCell, battery may be reduced, compared to a normal BWP (or a BWP except for the dormant BWP) in the activated SCell or compared to when the normal BWP (or the BWP except for the dormant BWP) in the activated SCell is activated. Also, unlike when the SCell is deactivated, the UE may report the channel measurement, and thus, the base station may, based on the measurement repot or the measurement report of the dormant BWP in the activated SCell, quickly activate the normal BWP in the activated SCell to rapidly use the carrier integration technique, and thus, a transmission delay may be reduced.

The first active BWP switched and activated from a dormant state or a dormant BWP (or a first active non-dormant BWP or a BWP configured or indicated by using an RRC message) may be a BWP that the UE has to activate by switching a current or active BWP in an activated SCell or a BWP that the UE has to activate from a dormant state configured via an RRC message, according to the following indication, which includes, when the UE operates a BWP in one activated SCell as a dormant BWP, an active BWP in an activated SCEll is a dormant BWP, or a BWP in an SCell is switched to a dormant BWP, an indication to the UE from the base station, via DCI of a PDCCH, an MAC CE, or an RRC message, to switch a BWP in an activated SCell from a dormant BWP to a normal BWP (or a BWP other than a dormant BWP), an indication to switch or convert an active BWP in a dormant BWP to a normal BWP, or an indication to switch, convert, or activate an active BWP in a dormant BWP to a normal BWP (for example, a first active BWP activated from a dormant state).

Figure 1F:
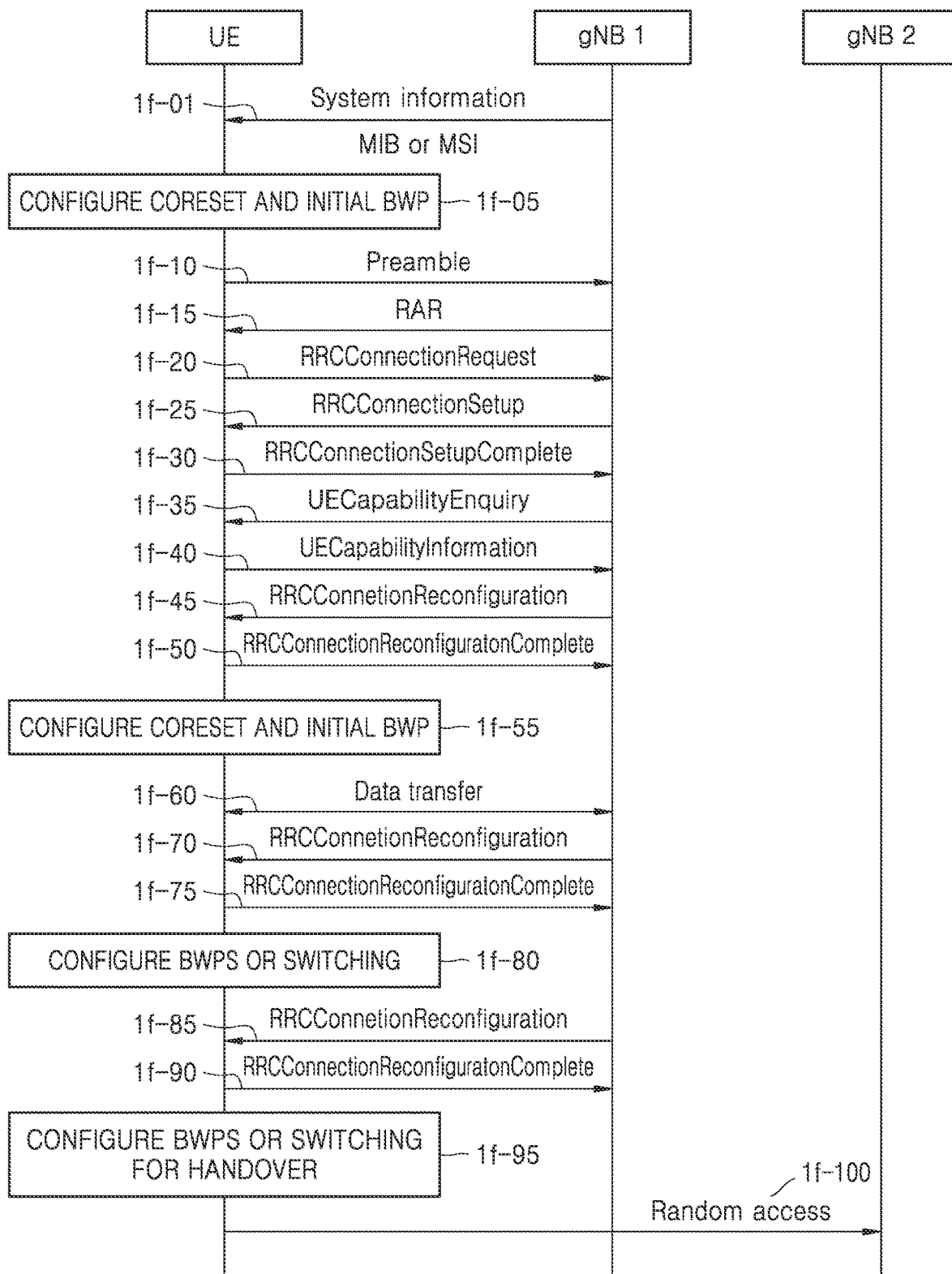
FIG. 1F illustrates a procedure in which a terminal is converted from a radio resource control (RRC) idle mode to an RRC connected mode in a next-generation mobile communication system, and is a diagram of a method of configuring a plurality of bandwidth parts (BWP) and configuring a default BWP or a first active BWP, according to an embodiment of the disclosure.

FIG. 1F illustrates a procedure in which a UE is converted from an RRC idle mode to an RRC connected mode in a next-generation mobile communication system and is a diagram of a method of configuring a plurality of BWPs and configuring a default BWP or a first active BWP, according to an embodiment of the disclosure.

One cell to which a base station provides a service may receive a service of a significantly large frequency band. First, the UE may search for the entire frequency band provided by an operator (PLMN) in units of a predetermined resource block (for example, in units of 12 RBs. That is, the UE may start to search for a PSS/SSS in the entire system bandwidth in units of the RB. When the UE searches for the PSS/SSS in units of the RB and detects the signals, the UE may read and interpret (decode) the signals to identify a boundary between a sub-frame and a radio transport resource frame. When the UE is completed with synchronization, the UE may read system information of a cell which is currently camped on. That is, the UE may identify an MIB or MSI to identify information of a CORESEST and read the system information, to identify information about an initial BWP (1f-01 and 1f-05). The CORESET information refers to a location of a time/frequency transport resource through which a control signal is transmitted from the base station and for example indicates a location of a transport resource through which a PDCCH is transmitted.

As described above, when the UE completes the DL synchronization with the base station and may receive the control signal, the UE may, in the initial BWP, perform a random access process, request an RRC connection configuration, receive an RRC message, and perform the RRC connection configuration (1f-10, 1f-15, 1f-20, 1f-25, and 1f-30).

After a default RRC connection configuration is completed, the base station may transmit, to the UE, an RRC message asking a capability of the UE for identifying the capability of the UE (UECapabilityEnquiry, 1f-35). According to another method, the base station may ask an MME or an AMF about the capability of the UE to identify the capability of the UE. That is because when the UE was previously connected, the MME or the AMF may store information about the capability of the UE. When the information about the capability of the UE desired by the base station does not exist, the base station may request the information about the capability of the UE from the UE.

The base station may transmit, to the UE, the RRC message to identify the UE capability, so as to identify the performance of the UE, for example, to identify an extent of a frequency band which the UE may read or to identify a domain of a frequency band which the UE may read. Also, after the base station identifies the performance of the UE, the base station may configure an appropriate BWP for the UE. When the UE receives the RRC message asking the capability of the UE, the UE may, in response to the RRC message, indicate a range of a bandwidth supported by the UE or an extent of a bandwidth supported by a current system bandwidth, via an offset from a reference central frequency, via directly indicating a start point and an end point of a supported frequency bandwidth, or via a central frequency and a bandwidth (1f-40).

The BWP may be configured via an RRCSetup message or an RRCResume message, or an RRCRreconfiguration message (1f-45) of the RRC connection configuration, the RRC message may include configuration information about a PCell, a PSCell, or a plurality of SCells, and a plurality of BWPs may be configured with respect to each cell (the PCell, the PSCell, or the SCell). When the plurality of BWPs are configured with respect to each cell, a plurality of BWPs which may be used in a DL of each cell may be configured, and in the case of an FDD system, a plurality of BWPs which may be used in a UL of each cell may be additionally configured, separately from the DL BWPs. In the case of a TDD system, a plurality of BWPs which may be commonly used by the DL and the UL of each cell may be configured.

Information for the configuration the BWP of each cell (the PCell, the PSCell, or the SCell) may include some of the following information.

DW BWP configuration information of the cell.
Initial DL BWP configuration information.
Information about configuration of a plurality of BWPs and a BWP identifier (ID) corresponding to each BWP.
Information about initial state configuration of the DL BWP of the cell (for example, an active state, a dormant state, or a deactivated state).
A BWP ID indicating a first active DL BWP.
A BWP ID indicating a default BWP.
Configuration information for PDCCH monitoring with respect to each BWP. For example, CORESET information, search space resource information, or information about a PDCCH transport resource, a cycle, or a sub-frame number.
A BWP ID indicating a dormant BWP or a 1-bit indicator indicating a dormant BWP for each BWP in the BWP configuration information.
A BWP ID indicating a first active BWP activated from a dormant state or a 1-bit indicator indicating a first active BWP activated from a dormant state for each BWP in the BWP configuration information.
BWP deactivation timer configuration and a timer value.
UL BWP configuration Information of the cell.
Initial UL BWP configuration information.
Configuration information of a plurality of BWPs and a BWP ID corresponding to each BWP.

Initial state configuration information of the DL BWP of the cell (for example, an active state, a dormant state, or a deactivated state).

A BWP ID indicating a dormant BWP or a 1-bit indicator indicating the dormant BWP for each BWP in the BWP configuration information.

A BWP ID indicating a first active UL BWP.

The configured initial BWP, the default BWP, or the first active BWP may be used for the following purpose and may operate according to the purpose as described below.

The initial BWP may be used as a BWP defined as cell specific that exists in each cell, and may be used as a BWP, which is used when a UE initially accessing a cell configures connection to the cell through a random access process or performs synchronization after configuring the connection. Also, the base station may configure each of an initial downlink BWP to be used in the DL and an initial uplink BWP to be used in the UL for each cell. Also, configuration information with respect to the initial BWP may be broadcast via the first system information (system information 1, S1B1) indicated by the CORESET, and the base station may reconfigure, to the UE accessing the connection, the initial UL BWP by using the RRC message. Also, the initial BWP may be used by being designated with the number 0 of a BWP identifier in each of the UL and the DL. That is, all UEs accessing the same cell may use the initial BWP by equally designating the initial BWP via the BWP identifier of number 0. That is because, when, in the performance of the random access process, the base station may transmit a random access response (RAR) message through the initial BWP which may be read by all UEs, a competition-based random access process may become simple.

The first active BWP may be differently configured for each UE (UE specific) and may be indicated from among a plurality of BWPs by being designated with a BWP identifier. The first active BWP may be configured for each of the DL and the UL, and each of a first active DL BWP and a first active UL BWP may be configured via a BWP identifier. The first active BWP may be used to indicate which BWP is to be first activated and used when a plurality of BWPs are configured in one cell. For example, when a PCell or a PSCell, and a plurality of SCells are configured for the UE, and a plurality of BWPs are configured in the PCell or the PSCell, or the SCells, the UE may activate and use the first active BWP from among the plurality of BWPs configured in the PCell or the PSCell, or the SCells, when the PCell or the PSCell, or the SCells are activated. That is, the UE may activate and use the first active DL BWP with respect to the DL and the first active UL BWP with respect to the UL.

An operation in which the UE switches a current DL BWP or an activated DL BWP in the SCell to activate the current DL BWP or the activated DL BWP in the Scell to the first active DL BWP (or a BWP configured or indicated via an RRC message) or switches a current UL BWP or an activated UL BWP in the SCell to activate the current UL BWP or the activated UL BWP in the Scell to the first active UL BWP (or a BWP configured or indicated via an RRC message), may be performed, when the UE receives an indication to activate a certain S cell or a BWP in a certain activated Scell in a deactivated state or a dormant state or an indication to switch or activate a deactivated or dormant BWP to a normal BWP, via an RRC message, MAC CE, or DCI of a PDCCH. Also, when the UE receives an indication to transition an activated SCell or BWP to a dormant state or to switch the activated SCell or BWP to a dormant BWP through the RRC message, the MAC CE, or the DCI of the PDCCH, the UE may switch or activate the BWP to the dormant BWP or may inactivate the BWP.

Inactivation, switching to the dormant BWP, or activation of the dormant BWP may denote that operations provided in a dormant state according to the disclosure are performed. That is, the UE may not perform monitoring of the PDCCH, and may perform channel measurement on the DL BWP (or the dormant BWP) and may report a measurement result to the base station. According to another method, when the activated SCell or BWP is activated or switched to a normal BWP, the initial active DL BWP may be activated by switching the DL BWP, and the initial active UL BWP may be activated by switching the UL BWP, and thus, the dormant BWP may be configured as the initial active DL BWP, the initial active UL BWP, or the default BWP. The default BWP may be differently configured for each UE (UE specific) and may be indicated from among a plurality of BWPs by being designated via a BWP ID. The default BWP may be configured only for the DL. The default BWP may be used as a BWP to which an activated BWP from among a plurality of downlink BWPs is to fall back after a predetermined time. For example, a BWP deactivation timer (BWP inactivity timer) may be configured for each cell or each BWP by using an RRC message, and the BWP deactivation timer may be started or re-started when data transmission and reception occur in an activated BWP other than the default BWP or may be started or re-started when the activated BWP is switched to other BWPs. When the BWP deactivation timer is expired, the UE may fall back or switch the active DL BWP in the cell to the default BWP. Switching may denote a process of inactivating a current active BWP and activating a BWP to which switching is indicated, and the switching may be triggered via an RRC message, MAC control information (MAC CE), or L1 signaling (DCI of the PDCCH). Switching may be triggered by indicating a BWP to be switched o or activated, and the BWP may be indicated by a BWP identifier (for example, 0, 1, 2, 3, or 4).

The reason that the default BWP is used by being applied only to the DL is because the base station may allow the UE to fall back to the default BWP after a certain period of time, for each cell, to receive an indication (for example, the DCI of the PDCCH) of the base station, and thus, scheduling of the base station may become simple. For example, when the base station configures the default BWP of the UEs accessing one cell as an initial BWP, after a certain period of time, the base station may perform scheduling indication only with respect to the initial BWP. When the default BWP is not configured in the RRC message, the initial BWP may be considered as the default BWP and the BWP may fall back to the initial BWP when the BWP deactivation timer is expired.

According to another method, in order to increase a degree of freedom of an embodiment of the base station, the default BWP may be defined and configured also with respect to the UL and may be used in the same method as the default BWP of the DL.

A dormant BWP denotes a BWP in an idle mode or a dormant BWP in an activated SCell, or when the dormant BWP is activated, the UE may not exchange data with the base station, may not monitor a PDCCH to identify an indication of the base station, or may not transmit a pilot signal, but may perform channel measurement and may report a measurement result with respect to a measured frequency/cell/channel periodically or when an event occurs, according to a configuration of the base station. Thus, because the UE does not monitor the PDCCH and transmit the pilot signal in the dormant BWP in the activated SCell, battery may be reduced, compared to a normal BWP (or a BWP except for the dormant BWP) in the activated SCell or compared to when the normal BWP (or the BWP except for the dormant BWP) in the activated SCell is activated. Also, unlike when the SCell is deactivated, the UE may report the channel measurement, and thus, the base station may, based on the measurement repot or the measurement report of the dormant BWP in the activated SCell, quickly activate the normal BWP in the activated SCell to rapidly use the carrier integration technique, and thus, a transmission delay may be reduced.

The first active BWP activated from a dormant state (or a first active non-dormant BWP) may be a BWP that the UE has to activate by switching a current or active BWP in an activated SCell or a BWP that the UE has to activate from a dormant state configured via an RRC message, according to the following indication, which includes, when the UE operates a BWP in one activated SCell as a dormant BWP, an active BWP in an activated SCEll is a dormant BWP, or a BWP in an SCell is switched to a dormant BWP, an indication to the UE from the base station, via DCI of a PDCCH, an MAC CE, or an RRC message, to switch a BWP in an activated SCell from a dormant BWP to a normal BWP (or a BWP other than a dormant BWP), an indication to switch or convert an active BWP in a dormant BWP to a normal BWP, or an indication to switch, convert, or activate an active BWP in a dormant BWP to a normal BWP (for example, a first active BWP activated from a dormant state).

In the disclosure, to switch a first BWP to a second BWP may denote to activate the second BWP or to deactivate the activated first BWP and to activate the second BWP.

Also, in the RRCSetup message or the RRCResume message 1*f*-25 or the RRCReconfiguration message 1*f*-45 in the RRC connection configuration, a status transition timer may be configured so that the UE may directly perform status transition even when the UE does not receive an indication from the base station via an RRC message, MAC control information, or DCI of the PDCCH. For example, a cell deactivation timer (ScellDeactivationTimer) is configured for each SCell, and when the cell deactivation timer is expired, the SCell may be transitioned to a deactivated state. Alternatively, a DL (or UL) BWP hibernation timer (DLBWPHibernationTimer or ULBWPHibernationTimer) may be configured for each SCell or a BWP of each SCell, and a SCell hibernation timer (SCellHibernationTimer) may be configured for each SCell, and thus, when the SCell hibernation timer or the DL (or UL) BWP hibernation timer is expired, the SCell or the DL (or UL) BWP may be transitioned to a dormant state or switched to a dormant BWP. For example, when the cell hibernation timer or the DL (or UL) BWP hibernation timer is expired, the SCell or the DL (or UL) BWP in an active state may be transitioned to a dormant state or switched to a dormant BWP, and the SCell or the DL (or UL) BWP in a dormant state may not be transitioned to the dormant state or the dormant BWP. Also, the BWP hibernation timer may be started when an indication to switch the BWP or an indication to activate the BWP is received through the RRC message, the MAC CE, or the DCI of the PDCCH, or may be stopped when an indication to switch the BWP to the dormant BWP, an indication to inactivate the BWP, or an indication to activate a dormant BWP is received through the RRC message, the MAC CE, or the DCI of the PDCCH. Also, a dormant state cell deactivation timer (dormantSCellDeactivationTimer) or a dormant state or DL (or UL) dormant BWP deactivation timer (dormantDLDeactivationTimer or dormantULDeactivationTimer) may be configured with respect to each SCell or the DL (or UL) BWP, and thus, the SCell or the DL (or UL) dormant BWP in the dormant state may be transitioned to a deactivated state. When the dormant state cell deactivation timer or the dormant state or DL (or UL) dormant BWP deactivation timer is expired, only the SCell or the DL (or UL) dormant BWP in the dormant state may be transitioned to a deactivated state, and the SCell or the DL (or UL) BWP in the active state or the deactivated state may not be transitioned to the deactivated state. Also, the dormant BWP hibernation timer may be started when an indication to switch the dormant BWP, an indication to inactivate the dormant BWP, or an indication to activate a dormant BWP is received through an RRC message, an MAC CE, or DCI of a PDCCH, or may be stopped when an indication to inactivate or activate the BWP or the SCell or an indication to activate a normal BWP (for example, a BWP other than a dormant BWP configured via RRC) is received through the RRC message, the MAC CE, or the DCI of the PDCCH. When the SCell deactivation timer (SCellDeactivationTimer) (or the DL (or UL) BWP hibernation timer), and the cell hibernation timer (SCellHybernationTimer) (or the DL (or UL) dormant BWP deactivation timer) are configured together, the SCell hibernation timer (SCellHibernationTimer) (or the DL (or UL) dormant BWP hibernation timer) may be prioritized. That is, when the SCell hibernation timer (SCellHibernationTimer) (or the DL (or UL) BWP hibernation timer) is configured, the SCell or the DL (or UL) BWP may not be deactivated, even when the SCell deactivation timer (SCellDeactivationTimer) (or the DL (UL) dormant BWP deactivation timer) is expired. In other words, when the cell hibernation timer (or the DL (or UL) BWP hibernation timer) is configured, the SCell or the DL (or UL) BWP may be initially transitioned from an active state to a dormant state or switched to a dormant BWP via the expiration of the timer, and the SCell or the BWP transitioned to the dormant state may be stepwise transitioned back to a deactivated state via the expiration of the dormant state SCell or BWP deactivation timer. Thus, when the SCell hibernation timer or the BWP hibernation timer is configured, the SCell deactivation timer or the dormant BWP deactivation timer does not affect the status transition of the SCell or the DL (or UL) BWP, and even when the SCell deactivation timer or the dormant BWP deactivation timer is expired, the SCell or the DL (or UL) BWP may not be directly transitioned to the deactivated state, when the SCell hibernation timer or the BWP hibernation timer is configured.

When the SCell deactivation timer (or the DL (or UL) BWP hibernation timer) is not configured in the RRC message, the UE may consider that the SCell deactivation timer (or the DL (or UL) BWP hibernation timer) is configured as an infinite value.

Also, the RRCSetup message or the RRCResume message 1*f*-25, or the RRCReconfiguration message 1*f*-45 of the RRC connection configuration may configure frequency measurement configuration information, frequency measurement gap configuration information, etc. and may include frequency measurement object information. Also, the RRCSetup message or the RRCResume message 1*f*-25, or the RRCReconfiguration message 1*f*-45 of the RRC connection configuration may configure a power saving mode for reducing power consumption of the UE, and together with the function of reducing the power consumption, may configure a discontinuous reception (DRX) cycle, an offset or on-duration section (a section in which the UE is to monitor the PDCCH), configuration information, such as time information, etc., time information about a time point at which the UE is to monitor the PDCCH from the base station before the on-duration section during the DRX cycle, short time cycle information, or the like. When the function for reducing the power consumption of the UE is configured, the UE may configure a DRX cycle and may detect a wake-up signal (WUS) in the section in which the UE is configured to monitor the PDCCH of the base station before the on-duration section, and the base station may indicate to the UE whether to skip (or not perform) or perform monitoring of the PDCCH in the very next on-duration section through DCI of the PDCCH of the WUS. The UE always has to monitor the PDCCH in the on-duration section. However, via the WUS described above, the base station may indicate to the UE not to perform monitoring of the PDCCH in the on-duration section, and thus, battery consumption of the UE may be reduced.

When the RRC connection configuration is completed as described above, the UE may configure a plurality of BWPs according to an indication configured by using an RRC message. Also, the UE may activate one or a small number of the configured plurality of BWPs, in order to reduce the battery. For example, one BWP may be indicated to be activated. Also, the base station may indicate activation of a BWP by using an RRC message, MAC CE or L1 signaling (a PHY layer control signal, such as DCI of a PDCCH) to indicate a switch of an initial access BWP to a new BWP. According to another method, new bitmap information may be defined in the DCI of the PDCCH and whether or not to activate, inactivate, or deactivate may be indicated. According to another method, whether or not to activate a normal BWP (for example, a first active BWP to be activated from hibernation), whether or not to activate a dormant BWP, or whether or not to switch a BWP to a dormant BWP, or whether or not to switch a BWP may be indicated by using the bitmap. In the initial access BWP, there may be many newly accessing users, and thus, in terms of scheduling, it may be much more advantageous to allocate a new BWP and separately manage connected users. That is because the initial access BWP is not configured for each UE and may be commonly shared by all UEs. Also, in order to reduce a signaling overhead, a default BWP may be dynamically indicated by using the MAC CE, the L1 signaling, or system information.

In the disclosure, when the base station or the network supports an MBS to the UE, the base station or the network may configure, for the UE, bearer configuration information for the MBS or transport resource information for the MBS (for example, a time resource, a frequency resource, a bandwidth, a frequency, a BWP (or a BWP ID), a bandwidth, a sub-carrier spacing, a transport resource cycle, a radio network temporary identifier (RNTI) for each MBS, or a logical channel ID for each MBS), by using system information, an RRC message (for example, RRCSetup, RRCResume, RRCReconfiguration, RRCRelease, or a newly defined new RRC message), or a control message for an MBS channel. According to another method, the bearer configuration information for the MBS may be appointed or designated with a default configuration. A bearer for the MBS may be considered as a multicast bearer or a unicast bearer from the perspective of the base station or the UE. According to another method, the base station or the network may configure a bearer for the UE, by distinguishing between a multicast bearer for the MBS and a unicast bearer for the MBS by configuring an additional ID or indicator by using system information, an RRC message (for example, RRCSetup, RRCResume, RRCReconfiguration, RRCRe-lease, or a newly defined new RRC message), or a control message for an MBS channel.

A DL-shared channel (DL-SCH) described in this disclosure may include or indicate a common control channel (CCCH), a dedicated control channel (DCCH), or a dedicated traffic channel (DTCH).

A bearer, a multicast bearer, or a unicast bearer for the MBS described in this disclosure may be interpreted as a multicast bearer or a unicast bearer.

In the disclosure, the bearer may denote a concept including a signaling radio bearer (SRB) and a data radio bearer (DRB). The SRB may be mainly used to transmit and receive an RRC message of an RRC entity, and the DRB may be mainly used to transmit and receive user layer data. Also, a UM DRB may denote a DRB using an RLC entity operating in an unacknowledged mode (UM), and an AM DRB may denote a DRB using an RLC entity operating in an acknowledged mode (AM).

MBS data for the MBS described in this disclosure may be interpreted as configuration information of an MBS channel, MBS control data (control plane data) for bearer configuration or service configuration, or MBS user data (user plane data) supporting the MBS.

An RNTI described in the disclosure is an identifier used when the UE, via a PHY layer, monitors a PDCCH, descrambles or checks a cyclic redundancy check (CRC) of the received PDCCH identifies whether the CRC of the PDCCH corresponds to an RNTI value configured for the UE or an RNTI value corresponding to a PDCCH to be received by the UE, and determines whether the CRC of the PDCCH is a PDCCH to be read by the UE.

FIG. 1G is a diagram of a structure of a bearer that is established when a base station or a network supports an MBS for a UE in an RRC connected mode, an RRC inactive mode, or an RRC idle mode by configuring the MBS by using system information, an RRC message, or a control message for an MBS channel or a structure of a bearer that is established for the UE to receive the MBS, according to an embodiment of the disclosure. Also, the bearer structures provided in FIG. 1G may also be applied or configured, via extension, to support a general data service.

FIG. 1G is a diagram for describing a structure of a bearer for supporting an MBS, the bearer being configured by using system information, an RRC message, or a control message for the MBS channel, when a base station or a network supports the MBS for a UE in an RRC connected mode, an RRC inactive mode, or an RRC idle mode, or the UE receives the MBS, according to an embodiment of the disclosure.

Referring to FIG. 1G, the structure of the bearer configured for the MBS may have one or a plural number of the following bearer structures. For bearer configuration information for the MBS, one or a plural number of the following bearer structures may be appointed or designated with a default configuration. Also, the following bearer structures may be configured in or applied to the UE or the base station.

A first bearer structure 1g-01: when a unicast bearer or a multicast bearer for the MBS is configured as the first bearer structures 1g-01 illustrated in FIG. 1G, the UE may configure, as a bearer for the MBS, a bearer structure directly connecting an MAC entity with an upper MBS application layer. In the first bearer structure, a process of transmitting HARQ ACK or NACK, retransmitting HARQ, or processing HARQ of the MAC entity may not be applied to the first bearer structure. Alternatively, in the first bearer structure, the UE may transmit MBS data (MBS control data or MBS user data) received through a PHY layer or a MAC entity to an upper MBS application layer. In the first bearer structure, the MBS data may not include a MAC header. For example, that is because, when an additional physical channel or transmission channel for the MBS is configured, and an additional transport resource (a frequency, a time resource, or a transmission cycle) is configured, the MBS data may be identified by the MAC entity without the MAC header. According to another method, for example, that is because, when an additional physical channel or transmission channel for the MBS is configured, and an additional transport resource (a frequency, a time resource, or a transmission cycle) is configured, and when a first RNTI for the MBS data is allocated or defined, the PHY layer or the MAC entity may identify the MBS data without the MAC header. The RNTI for the MBS data may be assigned or designated with each of a 1-$1^{st}$ RNTI for the MBS control data (or an MBS control data channel) and a 1-$2^{nd}$ RNTI for the MBS user data (or an MBS user data channel). In the first bearer structure, the MAC entity may not apply the process of transmitting HARQ ACK or NACK, retransmitting HARQ, or processing HARQ to the bearer supporting the MBS as default. Alternatively, configuration information of an SDAP entity may not be configured with respect to the first bearer structure, by using the system information, the RRC message (RRCSetup, RRCResume, RRCReconfiguration, RRCRelease, or the newly defined new RRC message), or the control message for the MBS channel, and the SDAP entity may not process (for example, bypassing) data of the first bearer and may directly transmit the data to the MBS application layer. According to another method, the configuration information of the SDAP entity with respect to the bearer may be configured by using the system information, the RRC message (RRCSetup, RRCResume, RRCReconfiguration, RRCRelease, or the newly defined new RRC message), or the control message for the MBS channel, and mapping information between a QoS flow and the bearer may be configured or reconfigured. Also, in the configuration information of the SDAP entity, whether or not to configure an SDAP header with respect to DL data and whether or not to configure an SDAP header with respect to UL data may be configured. Also, a reconfiguration process or a switching process between the unicast bearer and the multicast bearer may be supported by using the mapping information between the QoS flow and the bearer. Also, in the SDAP configuration information with respect to the bearer, the QoS flow with respect to the MBS may be mapped to the bearer to support MBSs. The MBS data to be received or transmitted in the first bearer structure may have a structure of 1g-11 or 1g-12. For example, according to the configuration information of the system information, the RRC message (RRCSetup, RRCResume, RRCReconfiguration, RRCRelease, or the newly defined new RRC message), or the control message for the MBS channel, the MBS data to be received or transmitted in the first bearer structure may have the structure of 1g-11 or 1g-12. Based on this configuration, an overhead due to a header may be reduced.

A second bearer structure 1g-02: when a unicast bearer or a multicast bearer for the MBS is configured as the second bearer structure 1g-02 illustrated in FIG. 1G, the UE may configure an RLC entity corresponding to an MBS control data channel, an MBS user data channel, or a logical channel ID (or an MBS) of the MBS user data channel which is connected to an MAC entity. Also, the UE may configure, as a bearer for the MBS, a bearer structure directly connecting the RLC entity with an upper MBS application layer. In the second bearer structure, a process of transmitting HARQ ACK or NACK, retransmitting HARQ, or processing HARQ of the MAC entity may not be applied to a second bearer. Alternatively, in the second bearer structure, the UE may transmit MBS data (MBS control data or MBS user data) received through a PHY layer or the MAC entity to the upper MBS application layer through the RLC entity. In the second bearer structure, the MBS data may not include a MAC header. For example, that is because, when an additional physical channel or transmission channel for the MBS is configured, and an additional transport resource (a frequency, a time resource, or a transmission cycle) is configured, the MBS data may be identified by the MAC entity without the MAC header. According to another method, for example, that is because, when an additional physical channel or transmission channel for the MBS is configured, and an additional transport resource (a frequency, a time resource, or a transmission cycle) is configured, and when a first RNTI for the MBS data is allocated or defined, the PHY layer or the MAC entity may identify the MBS data without the MAC header. The RNTI for the MBS data may be assigned or designated with each of a 1-$1^{st}$ RNTI for the MBS control data (or an MBS control data channel) and a 1-$2^{nd}$ RNTI for the MBS user data (or an MBS user data channel, a logical channel ID, or an MBS). According to another method, in the second bearer structure, when an additional physical channel or transmission channel for the MBS is configured, when the MBS is supported by a DL-SCH used for a general data service, or when an additional transport resource (a frequency, a time resource, or a transmission cycle) is configured, the MBS data may include an MAC header, and the PHY layer or the MAC entity may identify, based on a logical channel ID included in the MAC header, the MBS control data (or the MBS control data channel), the MBS user data (or the MBS user data channel, the logical channel ID, or each MBS), or the MBS, or may demultiplex the identified MBS control data, MBS user data, or MBS and transmit the demultiplexed MBS control data, MBS user data, or MBS to the RLC entity. According to another method, in the second bearer structure, when an additional physical channel or transmission channel for the MBS is configured, when the MBS is supported by a DL-SCH used for a general data service, or when an additional transport resource (a frequency, a time resource, or a transmission cycle) is configured, the MBS data may be received via the transport resource. When a first RNTI for the MBS data is assigned or defined, the MBS data may be received via the transport resource according to an indication of the PDCCH through the RNTI. The MBS data may include an MAC header, and the MBS control data (or the MBS control data channel), the MBS user data (or the MBS user data channel, the logical channel ID, or each MBS), or the MBS may be identified based on the logical channel ID included in the MAC header, or the identified MBS control data, MBS user data, or MBS may be demultiplexed and transmitted to each RLC entity. That is, to support the MBS, a different logical channel ID may be configured or defined for each of the MBS control data channel, the MBS user data channel, and the MBS. In the second bearer structure, the configured RLC entity may be configured to be in a transparent mode TM, and MBS data may not include an RLC header. Alternatively, in the RLC entity, an RLC serial number length may not be configured. Alternatively, the RLC entity may not apply a data processing process to the MBS data. Also, the RLC entity configured in the second bearer structure may not apply, in the TM mode, a process of segmenting data or reassembling data with respect to the MBS data. Alternatively, in the second bearer structure, the configured RLC entity may configure a size of an RLC reception window as 0 or may not operate the RLC reception window. In the second bearer structure, the MAC entity may not apply the process of transmitting HARQ ACK or NACK, retransmitting HARQ, or processing HARQ to the bearer supporting the MBS as default. Alternatively, configuration information of the SDAP entity may not be configured with respect to the second bearer structure, by using the system information, the RRC message (the RRCSetup, the RRCResume, the RRCReconfiguration, the RRCRelease, or the newly defined new RRC message), or the control message for the MBS channel, and the SDAP entity may not process (for example, bypassing) data of the second bearer and may directly transmit the data to the MBS application layer. According to another method, the configuration information of the SDAP entity with respect to the bearer may be configured by using the RRC message (the RRCSetup, the RRCResume, the RRCReconfiguration, the RRCRelease, or the newly defined new RRC message), or the control message for the MBS channel, and mapping information between a QoS flow and the bearer may be configured or reconfigured. Also, in the configuration information of the SDAP entity, whether or not to configure an SDAP header with respect to DL data and whether or not to configure an SDAP header with respect to UL data may be configured. Also, a reconfiguration process or a switching process between a unicast bearer and a multicast bearer may be supported by using the mapping information between the QoS flow and the bearer. Also, in the SDAP configuration information with respect to the bearer, the QoS flow with respect to the MBS may be mapped to the bearer to support MBSs. The MBS data to be received or transmitted in the second bearer structure may have a structure of 1g-21. Based on this configuration, an overhead due to a header may be reduced. For example, according to the configuration information of the system information, the RRC message (the RRCSetup, the RRCResume, the RRCReconfiguration, the RRCRelease, or the newly defined new RRC message), or the control message for the MBS channel, the MBS data to be received or transmitted in the second bearer structure may have the structure of 1g-21.

A third bearer structure 1g-03: when a unicast bearer or a multicast bearer for the MBS is configured as the third bearer structure 1g-03 illustrated in FIG. 1G, the UE may configure an RLC entity corresponding to an MBS control data channel, an MBS user data channel, or a logical channel ID (or an MBS) of the MBS user data channel which is connected to an MAC entity. Also, the UE may configure, as a bearer for the MBS, a bearer structure directly connecting the RLC entity with an upper MBS application layer. In the third bearer structure, the process of transmitting HARQ ACK or NACK, retransmitting HARQ, or processing HARQ of the MAC entity may not be applied to a third bearer. According to another method, whether to perform or not to perform the process of transmitting HARQ ACK or NACK, retransmitting HARQ, or processing HARQ of the MAC entity may be configured by an indicator via the system information, the RRC message (the RRCSetup, the RRCResume, the RRCReconfiguration, the RRCRelease, or the newly defined new RRC message), or the control message for the MBS channel. For example, when an indicator to perform the process of transmitting HARQ ACK or NACK, retransmitting HARQ, or processing HARQ of the MAC entity is configured (when a value of the indicator indicates a specific value or there is no indicator field) in the system information, the RRC message (the RRCSetup, the RRCResume, the RRCReconfiguration, the RRCRelease, or the newly defined new RRC message), or the control message for the MBS channel, the process of transmitting HARQ ACK or NACK, retransmitting HARQ, or processing HARQ of the MAC entity may be performed. Alternatively, when an indicator not to perform the process of transmitting HARQ ACK or NACK, retransmitting HARQ, or processing HARQ of the MAC entity is configured (when a value of the indicator indicates a specific value or there is no indicator field), the corresponding process may not be performed, or the corresponding process (the process of transmitting HARQ ACK or NACK, retransmitting HARQ, or processing HARQ of the MAC entity) may not be applied to the bearer supporting the MBS as default. Alternatively, the indicator may be configured with respect to each of the MBS control data channel, the MBS user data channel, the logical channel ID (or the MBS) of the MBS user data channel, or the bearer ID. According to another method, when the process of transmitting HARQ ACK or NACK, retransmitting HARQ, or processing HARQ of the MAC entity is to be performed or configured to be performed, or configured with respect to a specific logical channel ID, an MBS, or a bearer, an indicator may be configured (an indicator value may indicate a specific value or there may be no indicator field) to perform HARQ reordering or RLC reordering (or in-order delivery) with respect to the RLC entity configured with respect to the MBS control data channel, the MBS user data channel, or the logical channel ID (or an MBS) of the MBs user data channel, via the RRC message (the RRCSetup, the RRCResume, the RRCReconfiguration, the RRCRelease, or the newly defined new RRC message), or the control message for the MBS channel. Alternatively, a size of an RLC reception window may be configured and operated as a value greater than 0 (for example, value=2^ (RLC serial number length−1)). That is because, when the processing or retransmitting of the HARQ is performed with respect to the MBS data, the order of data may be mixed, and thus, reordering of the MBS data may have to be performed based on the RLC reception window or the RLC serial number, or a reordering timer may have to run, to support the MBS in sequence. According to another method, when the process of transmitting HARQ ACK or NACK, retransmitting HARQ, or processing HARQ of the MAC entity is not performed or is configured not to be performed, an indicator may be configured (an indicator value may indicate a specific value or there may be no indicator field) not to perform HARQ reordering or RLC reordering (or in-order delivery) with respect to the RLC entity configured with respect to the MBS control data channel, the MBS user data channel, or the logical channel ID (or an MBS) of the MBs user data channel, via the RRC message (the RRCSetup, the RRCResume, the RRCReconfiguration, the RRCRelease, or the newly defined new RRC message), or the control message for the MBS channel, so that the HARQ reordering or the RLC reordering (or in-order delivery) may not be performed. Alternatively, the process of transmitting HARQ ACK or NACK, retransmitting HARQ, or processing HARQ of the MAC entity may not be applied to the bearer supporting the MBS as default, so that the RLC entity configured in the bearer supporting the MBS may not perform HARQ reordering or RLC reordering (or in-order delivery) as default. Alternatively, a size of an RLC reception window may be configured as 0, and thus the reception RLC window may not be operated. For example, when the configuration information does not exist, or as default, the UE may always transmit data, via the RLC entity, to an upper entity via a non-order delivery regardless of an order. Alternatively, in the third bearer structure, the UE may transmit the MBS data (the MBS control data or the MBS user data) received through the PHY layer or the MAC entity to an upper MBS application layer through the RLC entity. In the third bearer structure, the MBS data may include a MAC header. Alternatively, the logical channel ID included in the MAC header may be configured or defined to indicate the MBS control data channel, the MBS user data channel, or each MBS. For example, when an additional physical channel or transmission channel for the MBS is configured, and an additional transport resource (a frequency, a time resource, or a transmission cycle) is configured, and when a first RNTI for the MBS data is assigned or defined, the PHY layer or the MAC entity may, based on the RNTI or the logical channel ID, identify whether the MBS data is MBS control data or MBS user data or identify to which MBS the data corresponds, or may demultiplex the identified data and transmit the demultiplexed data to each RLC entity. The RNTI for the MBS data may be assigned or designated with each of a $1\text{-}1^{st}$ RNTI for the MBS control data (or an MBS control data channel) and a $1\text{-}2^{nd}$ RNTI for the MBS user data (or an MBS user data channel, a logical channel ID, or each MBS). According to another method, in the third bearer structure, when an additional physical channel or transmission channel for the MBS is configured, when the MBS is supported by a DL-SCH used for a general data service, or when an additional transport resource (a frequency, a time resource, or a transmission cycle) is configured, the MBS data may include an MAC header, and based on a logical channel ID included in the MAC header, the MBS control data (or the MBS control data channel), the MBS user data (or the MBS user data channel, the logical channel ID, or each MBS), or the MBS may be identified, or the identified MBS control data, MBS user data, or MBS may be demultiplexed and transmitted to each RLC entity. According to another method, in the third bearer structure, when an additional physical channel or transmission channel for the MBS is configured, when the MBS is supported by a DL-SCH used for a general data service, or when an additional transport resource (a frequency, a time resource, or a transmission cycle) is configured, the PHY layer or the MAC entity may receive the MBS data via the transport resource. When a first RNTI for the MBS data is assigned or defined, the MBS data may be received via the transport resource according to an indication of the PDCCH through the RNTI. The MBS data may include an MAC header, and the MBS control data (or the MBS control data channel), the MBS user data (or the MBS user data channel, the logical channel ID, or each MBS), or the MBS may be identified based on the logical channel ID included in the MAC header, or the identified MBS control data, MBS user data, or MBS may be demultiplexed and transmitted to each RLC entity. That is, to support the MBS, a different logical channel ID may be configured or defined for each of the MBS control data channel, the MBS user data channel, and the MBS. In the third bearer structure, the configured RLC entity may be configured to be in a TM, a UM, a unidirectional mode of the UM, a bidirectional mode of the UM, or an AM. In the RLC TM, the MBS data may not include an RLC header, and in the RLC UM or the AM, the MBS data may include an RLC header. Also, in the RLC TM, the RLC entity may not apply a data processing process with respect to the MBS data (for example, a data segmenting or reassembling process). In the RLC UM or the AM, the RLC entity may apply the data processing process with respect to the MBS data. Alternatively, configuration information of the SDAP entity may not be configured with respect to the third bearer structure, by using the system information, the RRC message (the RRCSetup, the RRCResume, the RRCReconfiguration, the RRCRelease, or the newly defined new RRC message), or the control message for the MBS channel, and the SDAP entity may not process (for example, bypassing) data of the third bearer and may directly transmit the data to the MBS application layer. According to another method, the configuration information of the SDAP entity with respect to the bearer may be configured by using the RRC message (the RRCsetup, the RRCResume, the RRCReconfiguration, the RRCRelease, or the newly defined new RRC message), or the control message for the MBS channel, and mapping information between a QoS flow and the bearer may be configured or reconfigured. Also, in the configuration information of the SDAP entity, whether or not to configure an SDAP header with respect to DL data and whether or not to configure an SDAP header with respect to UL data may be configured. Also, a reconfiguration process or a switching process between a unicast bearer and a multicast bearer may be supported by using the mapping information between the QoS flow and the bearer. Also, in the SDAP configuration information with respect to the bearer, the QoS flow with respect to the MBS may be mapped to the bearer to support MBSs. The MBS data to be received or transmitted in the third bearer structure may have a structure of $1g\text{-}31$ or $1g\text{-}32$. Based on this configuration, an overhead due to a header may be reduced. For example, according to the configuration information of the system information, the RRC message (the RRCSetup, the RRCResume, the RRCReconfiguration, the RRCRelease, or the newly defined new RRC message), or the control message for the MBS channel, the MBS data to be received or transmitted in the third bearer structure may have the structure of $1g\text{-}31$ or $1g\text{-}32$. When it is configured or configured via an indicator to perform a process of transmitting HARQ ACK or NACK, retransmitting HARQ, or processing HARQ of the MAC entity, via the system information, the RRC message (the RRCsetup, the RRCResume, the RRCReconfiguration, the RRCRelease, or the newly defined new RRC message), or the control message for the MBS channel, information of the transport resource (for example, a time, a frequency resource, a transmission channel, a frequency spacing, etc.) to transmit HARQ ACK or NACK may also be transmitted. When the UE in the RRC connected mode, the RRC inactive mode, or the RRC idle mode is configured to process the process of transmitting HARQ ACK or NACK, retransmitting HARQ, or processing HARQ of the MAC entity, the UE may transmit HARQ ACK or NACK via a transport resource (for example, a physical transport resource) configured after receiving DL MBS data. When the base station detects at least one NACK or detects that at least one UE transmits NACK in the transport resource, the base station may perform retransmission with respect to the MBS. Alternatively, the base station may perform retransmission such that all UEs may receive the MBS data through the MBS channel. According to another method, after the UE in the RRC connected mode, the RRC inactive mode, or the RRC idle mode receives the DL MBS data, the UE may define MAC control information (or RLC control information, PDCP control information, or an RRC message), and may transmit the MAC control information (or the RLC control information, the PDCP control information, or the RRC message) by including a UE ID, an MBS ID, a logical channel ID, an RNTI, or a bearer ID, so as to indicate to the base station which UE has not successfully received data (for example, may transmit the MAC control information (or the RLC control information, the PDCP control information, or the RRC message) via the configured transport resource. The base station may perform retransmission of the MBS data only for the UE in the RRC connected mode, the RRC idle mode, or the RRC inactive mode, which transmits NACK or indicates an unsuccessful reception through the transport resource. According to another method, when the base station detects at least one NACK or detects that at least one UE transmits NACK in the transport resource, the base station may perform retransmission with respect to the MBS. Alternatively, the base station may perform retransmission such that all UEs may receive the MBS data through the MBS channel.

A fourth bearer structure 1g-04: when a unicast bearer or a multicast bearer for the MBS is configured as the fourth bearer structure 1g-04 illustrated in FIG. 1G, the UE may configure an RLC entity corresponding to an MBS control data channel, an MBS user data channel, or a logical channel ID (or an MBS) of the MBS user data channel which is connected to an MAC entity. Also, a PDCP entity connected to the RLC entity may be configured, and a bearer structure directly connecting the PDCP entity with an upper MBS application layer may be configured as a bearer for the MBS. In the fourth bearer structure, the process of transmitting HARQ ACK or NACK, retransmitting HARQ, or processing HARQ of the MAC entity may not be applied to a fourth bearer. According to another method, whether to perform or not to perform the process of transmitting HARQ ACK or NACK, retransmitting HARQ, or processing HARQ of the MAC entity may be configured by an indicator via the system information, the RRC message (the RRCSetup, the RRCResume, the RRCReconfiguration, the RRCRelease, or the newly defined new RRC message), or the control message for the MBS channel. For example, when an indicator to perform the process of transmitting HARQ ACK or NACK, retransmitting HARQ, or processing HARQ of the MAC entity is configured (when a value of the indicator indicates a specific value or there is no indicator field) in the system information, the RRC message (the RRCSetup, the RRCResume, the RRCReconfiguration, the RRCRelease, or the newly defined new RRC message), or the control message for the MBS channel, the process of transmitting HARQ ACK or NACK, retransmitting HARQ, or processing HARQ of the MAC entity may be performed. Alternatively, when an indicator not to perform the process of transmitting HARQ ACK or NACK, retransmitting HARQ, or processing HARQ of the MAC entity is configured (when a value of the indicator indicates a specific value or there is no indicator field), the corresponding process may not be performed, or the corresponding process (the process of transmitting HARQ ACK or NACK, retransmitting HARQ, or processing HARQ of the MAC entity) may not be applied to the bearer supporting the MBS as default. Alternatively, the indicator may be configured with respect to each of the MBS control data channel, the MBS user data channel, the logical channel ID (or the MBS) of the MBS user data channel, or the bearer ID. According to another method, when the process of transmitting HARQ ACK or NACK, retransmitting HARQ, or processing HARQ of the MAC entity is to be performed or configured to be performed, or configured with respect to a specific logical channel ID, an MBS, or a bearer, an indicator may be configured (an indicator value may indicate a specific value or there may be no indicator field) to perform HARQ reordering or RLC reordering (or in-order delivery) with respect to the RLC entity configured with respect to the MBS control data channel, the MBS user data channel, or the logical channel ID (or an MBS) of the MBs user data channel, via the RRC message (the RRCSetup, the RRCResume, the RRCReconfiguration, the RRCRelease, or the newly defined new RRC message), or the control message for the MBS channel. Alternatively, a size of an RLC reception window may be configured and operated as a value greater than 0 (for example, value=$2^{\wedge}$ (RLC serial number length−1)). That is because, when the processing or retransmitting of the HARQ is performed with respect to the MBS data, the order of data may be mixed, and thus, reordering of the MBS data may have to be performed based on the RLC reception window or the RLC serial number, or a reordering timer may have to run, to support the MBS in sequence. According to another method, when the process of transmitting HARQ ACK or NACK, retransmitting HARQ, or processing HARQ of the MAC entity is not performed or is configured not to be performed, an indicator may be configured (an indicator value may indicate a specific value or there may be no indicator field) not to perform HARQ reordering or RLC reordering (or in-order delivery) with respect to the RLC entity configured with respect to the MBS control data channel, the MBS user data channel, or the logical channel ID (or an MBS) of the MBs user data channel, via the RRC message (the RRCSetup, the RRCResume, the RRCReconfiguration, the RRCRelease, or the newly defined new RRC message), or the control message for the MBS channel, so that the HARQ reordering or the RLC reordering (or in-order delivery) may not be performed. Alternatively, the process of transmitting HARQ ACK or NACK, retransmitting HARQ, or processing HARQ of the MAC entity may not be applied to the bearer supporting the MBS as default, so that the RLC entity configured in the bearer supporting the MBS may not perform HARQ reordering or RLC reordering (or in-order delivery) as default. Alternatively, a size of an RLC reception window may be configured as 0, and thus the reception RLC window may not be operated. For example, when the configuration information does not exist, or as default, the UE may always transmit data, via the RLC entity, to an upper entity via a non-order delivery regardless of an order. Alternatively, in the fourth bearer structure, the UE may transmit the MBS data (the MBS control data or the MBS user data) received through the PHY layer or the MAC entity to an upper MBS application layer through the RLC entity or the PDCP entity. In the fourth bearer structure, the MBS data may include a MAC header. Alternatively, the logical channel ID included in the MAC header may be configured or defined to indicate the MBS control data channel, the MBS user data channel, or each MBS. For example, when an additional physical channel or transmission channel for the MBS is configured, and an additional transport resource (a frequency, a time resource, or a transmission cycle) is configured, and when a first RNTI for the MBS data is assigned or defined, the PHY layer or the MAC entity may, based on the RNTI or the logical channel ID, identify whether the MBS data is MBS control data or MBS user data or identify to which MBS the data corresponds, or may demultiplex the identified data and transmit the demultiplexed data to each RLC entity. The RNTI for the MBS data may be assigned or designated with each of a 1-$1^{st}$ RNTI for the MBS control data (or an MBS control data channel) and a 1-$2^{nd}$ RNTI for the MBS user data (or an MBS user data channel, a logical channel ID, or each MBS). According to another method, in the fourth bearer structure, when an additional physical channel or transmission channel for the MBS is configured, when the MBS is supported by a DL-SCH used for a general data service, or when an additional transport resource (a frequency, a time resource, or a transmission cycle) is configured, the MBS data may include an MAC header, and the MAC entity may identify, based on a logical channel ID included in the MAC header, the MBS control data (or the MBS control data channel), the MBS user data (or the MBS user data channel, the logical channel ID, or each MBS), or the MBS, or may demultiplex and transmit the identified MBS control data, MBS user data, or MBS to each RLC entity. According to another method, in the third bearer structure, when an additional physical channel or transmission channel for the MBS is configured, when the MBS is supported by a DL-SCH used for a general data service, or when an additional transport resource (a frequency, a time resource, or a transmission cycle) is configured, the PHY layer or the MAC entity may receive the MBS data via the transport resource. When a first RNTI for the MBS data is assigned or defined, the MBS data may be received via the transport resource according to an indication of the PDCCH through the RNTI. The MBS data may include an MAC header, and the MAC entity may identify, based on the logical channel ID included in the MAC header, the MBS control data (or the MBS control data channel), the MBS user data (or the MBS user data channel, the logical channel ID, or each MBS), or the MBS, or may demultiplex and transmit the identified MBS control data, MBS user data, or MBS to each RLC entity. That is, to support the MBS, a different logical channel ID may be configured or defined for each of the MBS control data channel, the MBS user data channel, and the MBS. In the fourth bearer structure, the configured RLC entity may be configured to be in a TM, a UM, a unidirectional mode of the UM, a bidirectional mode of the UM, or an AM. In the RLC TM, the MBS data may not include an RLC header, and in the RLC UM or the AM, the MBS data may include an RLC header. Also, in the RLC TM, the RLC entity may not apply a data processing process with respect to the MBS data (for example, a data segmenting or reassembling process). In the RLC UM or the AM, the RLC entity may apply the data processing process with respect to the MBS data. With respect to the fourth bearer structure, the RLC entity may be configured to be in the TM by using the system information, the RRC message (the RRCSetup, the RRCResume, the RRCReconfiguration, the RRCRelease, or the newly defined new RRC message), or the control message for the MBS channel), and thus, an overhead of the MBS data may be reduced (for example, an overhead may be reduced by no using an RLC header). Alternatively, with respect to the fourth bearer structure, a non-order delivery function may be configured in the PDCP entity, by using the system information, the RRC message (the RRCSetup, the RRCResume, the RRCReconfiguration, the RRCRelease, or the newly defined new RRC message), or the control message for the MBS channel, and thus, a delay in transmission of the MBS data may be prevented. According to another method, in the fourth bearer structure with respect to the MBS bearer, the PDCP entity may perform the non-order delivery function as default (for example, an indicator for non-order delivery is always configured as True), and thus, a delay in transmission of the MBS data may be prevented. That is because, when the process of retransmitting or processing HARQ is not performed, and the process of retransmitting RLC is not performed with respect to the MBS data, the reordering function of the PDCP entity may cause a transmission delay when a data loss occurs. According to another method, the PDCP entity may perform the reordering function of the PDCP as default, may determine a size of a reception window (for example, a 16-bit of the PDCP serial number length, a window size of $2^{(16-1)}$) based on a PDCP serial number length, and may run a reordering timer. Alternatively, in the fourth bearer structure, the configuration information of the SDAP entity with respect to the bearer may be configured by using the RRC message (the RRCsetup, the RRCResume, the RRCReconfiguration, the RRCRelease, or the newly defined new RRC message), or the control message for the MBS channel, and mapping information between a QoS flow and the bearer may be configured or reconfigured. Also, in the configuration information of the SDAP entity, whether or not to configure an SDAP header with respect to DL data and whether or not to configure an SDAP header with respect to UL data may be configured. Also, a reconfiguration process or a switching process between a unicast bearer and a multicast bearer may be supported by using the mapping information between the QoS flow and the bearer. Alternatively, configuration information of an SDAP entity may not be configured with respect to the fourth bearer structure, by using the system information, the RRC message (RRCSetup, RRCResume, RRCReconfiguration, RRCRelease, or the newly defined new RRC message), or the control message for the MBS channel, and the SDAP entity may not process (for example, bypassing) data of the fourth bearer and may directly transmit the data to the MBS application layer. Also, in the SDAP configuration information with respect to the bearer, the QoS flow with respect to the MBS may be mapped to the bearer to support MBSs. The MBS data to be received or transmitted in the fourth bearer structure may have a structure of 1g-41, 1g-42, 1g-43, or 1g-44. For example, according to the configuration information of the system information, the RRC message (RRCSetup, RRCResume, RRCReconfiguration, RRCRelease, or the newly defined new RRC message), or the control message for the MBS channel, the MBS data to be received or transmitted in the fourth bearer structure may have the structure of 1g-41 or 1g-42, 1g-43, or 1g-44. Based on this configuration, an overhead due to a header may be reduced. When it is configured or configured via an indicator to perform a process of transmitting HARQ ACK or NACK, retransmitting HARQ, or processing HARQ of the MAC entity, via the system information, the RRC message (the RRCsetup, the RRCResume, the RRCReconfiguration, the RRCRelease, or the newly defined new RRC message), or the control message for the MBS channel, information of the transport resource (for example, a time, a frequency resource, a transmission channel, a frequency spacing, etc.) to transmit HARQ ACK or NACK may also be transmitted. When the UE in the RRC connected mode, the RRC inactive mode, or the RRC idle mode is configured to process the process of transmitting HARQ ACK or NACK, retransmitting HARQ, or processing HARQ of the MAC entity, the UE may transmit HARQ ACK or NACK via a transport resource (for example, a physical transport resource) configured after receiving DL MBS data. When the base station detects at least one NACK or detects that at least one UE transmits NACK in the transport resource, the base station may perform retransmission with respect to the MBS. Alternatively, the base station may perform retransmission such that all UEs may receive the MBS data through the MBS channel. According to another method, after the UE in the RRC connected mode, the RRC inactive mode, or the RRC idle mode receives the DL MBS data, the UE may define MAC control information (or RLC control information, PDCP control information, or an RRC message), and may transmit the MAC control information (or the RLC control information, the PDCP control information, or the RRC message) by including a UE ID, an MBS ID, a logical channel ID, an RNTI, or a bearer ID, so as to indicate to the base station which UE has not successfully received data (for example, may transmit the MAC control information (or the RLC control information, the PDCP control information, or the RRC message) via the configured transport resource. The base station may perform retransmission of the MBS data only for the UE in the RRC connected mode, the RRC idle mode, or the RRC inactive mode, which transmits NACK or indicates an unsuccessful reception through the transport resource. According to another method, when the base station detects at least one NACK or detects that at least one UE transmits NACK in the transport resource, the base station may perform retransmission with respect to the MBS. Alternatively, the base station may perform retransmission such that all UEs may receive the MBS data through the MBS channel.

When the UE receives the system information, is to receive an interesting service, has an interesting service, or determines an interesting system, when the UE is or enters into in a cell or a domain supporting the MBS in the system information, when the MBS (or session) is configured or connected, or when configuration information for the MBS or bearer configuration information is received or broadcast via the system information, the RRC message (the RRCSetup, the RRCResume, the RRCReconfiguration, the RRCRelease, or the newly defined new RRC message), or the control message for the MBS channel (for example, transmitted from the MBS control data channel), the UE may configure a unicast bearer, a multicast bearer, or an MBS bearer for receiving the MBS having the provided bearer structure.

Figure 1H:
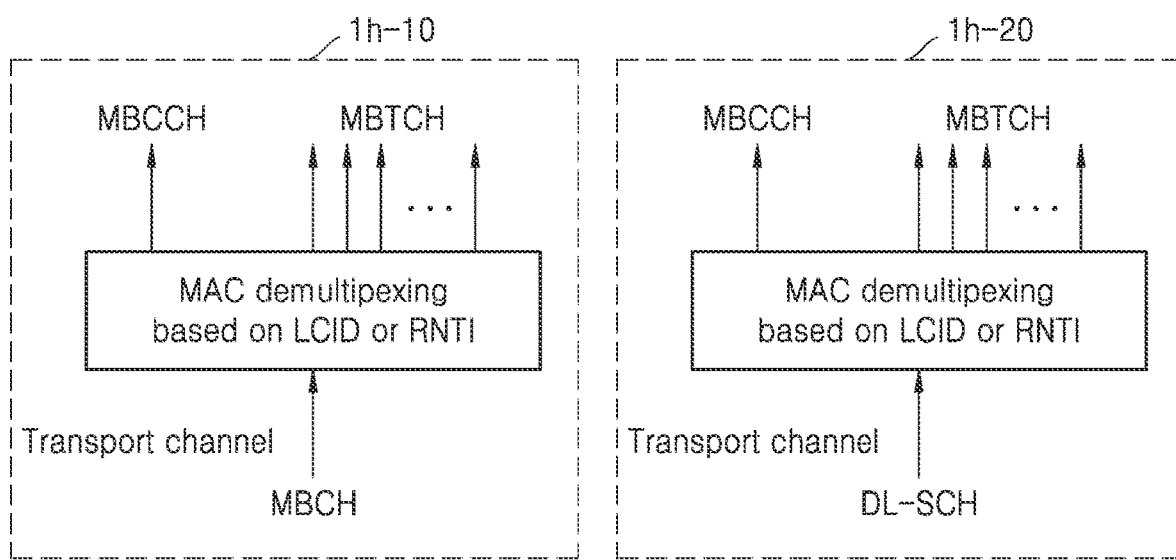
FIG. 1H is a diagram of a method of demultiplexing received MBS data via an medium access control (MAC) layer, when a terminal in an RRC connected mode, an RRC inactive mode, or an RRC idle mode receives the MBS data (for example, MBS control data, MBS user data, or general data other than the MBS data) via a multicast bearer or a unicast bearer supporting the MBS, according to an embodiment of the disclosure.

FIG. 1H is a diagram of a method of demultiplexing received MBS data via an MAC entity, when a UE in an RRC connected mode, an RRC inactive mode, or an RRC idle mode receives the MBS data (for example, MBS control data, MBS user data, or general data other than the MBS data) via a multicast bearer or a unicast bearer supporting the MBS, according to an embodiment of the disclosure.

Also, FIG. 1H may be one of the bearer structures provided in FIG. 1G. Also, a method, performed by the UE, of transmitting UL MBS data (for example, MBS control data, MBS user data, or general data other than the MBS data) is provided.

Referring to FIG. 1H, the method of receiving the MBS data or the method of receiving the MBS data and demultiplexing the MBS data may use one or a plural number of the following methods. According to another method, different methods from among the methods below may be applied according to whether the UE is in an RRC connected mode, an RRC inactive mode, or an RRC idle mode.

A 1-1$^{st}$ method of receiving an MBS 1h-10: In the 1-1$^{st}$ method of receiving the MBS 1h-10 in FIG. 1H, an additional physical channel or transmission channel (for example, an MBS channel (MBCH)) for the MBS may be configured, and an additional transport resource (a frequency, a time resource, a transmission cycle, a BWP (or a BWP ID), a bandwidth, an exclusive frequency (frequency information or an SCell ID), or a sub-carrier spacing) may be configured or defined, in the system information, the RRC message (the RRCSetup, the RRCResume, the RRCReconfiguration, the RRCRelease, or the newly defined new RRC message), or the control message for the MBS channel (for example, transmitted from the MBS control data channel). An MAC header may always be attached to the MBS data to be transmitted for the MBS, and a logical channel ID included in the MAC header may be differently assigned for each of the MBS control data channel (for example, an MBS control channel (MBCCH)) and an MBS user data channel (for example, an MBS traffic channel (MBTCH)). Also, a different logical channel ID may be assigned with respect to each MBS provided through the MBS user data channel. A first ID or a second ID for each MBS may be configured or broadcast, and each logical channel ID corresponding to the first ID or the second ID of each MBS may be configured or broadcast, in the system information, the RRC message (the RRCSetup, the RRCResume, the RRCReconfiguration, the RRCRelease, or the newly defined new RRC message), or the control message for the MBS channel (for example, transmitted from the MBS control data channel). The first ID may indicate a public land mobile network (PLMN) providing the MBS, a type of MBS, or a session. The second ID may indicate a more detailed session or type of the MBS. In a DL-SCH, a logical channel ID which may be assigned to a bearer for a general data service (a voice, the Internet, or a video service) may be assigned with a certain combination of bits (for example, 6 bits) in a logical channel ID space which may be generated in certain bits (for example, 6 bits). A logical channel ID with respect to the MBS control data channel, the MBS user data channel, or each service of the MBS user data channel may be assigned with a certain combination of bits (for example, 6 bits) in the first logical channel ID space. Alternatively, MBS control information (an MAC CE, for example, an MAC CE for a network to indicate a suspension of the BMS or for the UE to indicate stopping of receiving the MBS) for supporting the MBS or a logical channel ID with respect to padding for inserting the padding to the MBS data for supporting the MBS may also be assigned with a certain combination of bits (for example, 6 bits) in the first logical channel ID space. According to another method, in order to double the logical channel ID space, the logical channel ID with respect to the MBS control data channel, the MBS user data channel, or each service of the MBS user data channel may be assigned with a certain combination of bits (for example, 6 bits) in a new second logical channel ID space. Alternatively, the MBS control information (the MAC CE, for example, the MAC CE for the network to indicate a suspension of the BMS or for the UE to indicate stopping of receiving the MBS) for supporting the MBS or the logical channel ID with respect to padding for inserting the padding to the MBS data for supporting the MBS may also be assigned with a certain combination of bits (for example, 6 bits) in the new second logical channel ID space. The first logical channel ID space and the second logical channel ID space may be distinguished from each other in the MAC entity via the MBS channel, the DL-SCH channel, or the transport resource (a frequency, a time transmission resource, frequency information, a BWP ID, BWP configuration information, an exclusive carrier or exclusive SCell ID, or exclusive cell information), or may be distinguished from each other by using different RNTIs from each other. Thus, when the MAC entity of the UE receives the MBS data through a channel or a transport resource via which the MBS is received, the MAC entity may, based on the received transmission channel (for example, the MBCH, the DL-SCH, the BCH, etc.), the BWP ID, the SCell ID, the logical channel ID, or the RNTI, identify the MBS data or demultiplex the identified MBS data and transmit the data to a corresponding upper entity. The 1-$1^{st}$ MBS receiving method may be applied to a UE in an RRC connected mode, an RRC inactive mode, or an RRC idle mode.

A 1-$2^{nd}$ method of receiving an MBS 1$h$-10: In the 1-$2^{nd}$ method of receiving the MBS 1$h$-10 in FIG. 1H, an additional physical channel or transmission channel (for example, an MBCH) for the MBS may be configured, and an additional transport resource (a frequency, a time resource, a transmission cycle, a BWP (or a BWP ID), a bandwidth, an exclusive frequency (frequency information or an SCell ID), or a sub-carrier spacing) may be configured or defined, in the system information, the RRC message (the RRCSetup, the RRCResume, the RRCReconfiguration, the RRCRelease, or the newly defined new RRC message), or the control message for the MBS channel (for example, transmitted from the MBS control data channel). An MAC header may be attached to the MBS data to be transmitted for the MBS, and a logical channel ID included in the MAC header may be differently assigned for each of the MBS control data channel (for example, an MBCCH) and an MBS user data channel (for example, an MBTCH). Also, a different logical channel ID may be assigned with respect to each MBS provided through the MBS user data channel. Also, an RNTI may be differently assigned for each of the MBS control data channel (for example, an MBCCH) and the MBS user data channel (for example, an MBTCH). Also, a different RNTI may be assigned to each MBS provided in the MBS user data channel. Thus, because the MBS control data channel (for example, the MBCCH), the MBS user data channel, or each MBS provided in the MBS user data channel may be identified by the RNTIs, the logical channel ID may be assigned with the same logical channel ID with respect to the MBS control data channel, the MBS user data channel, or each MBS provided in the MBS user data channel. According to another method, the same RNTI may be assigned to the MBS control data channel (for example, the MBCCH), the MBS user data channel, or each MBS provided in the MBS user data channel, and a further specific identification may be performed by assigning a different logical channel ID to the MBS control data channel (for example, the MBCCH), the MBS user data channel, or each MBS provided in the MBS user data channel. The RNTI for the MBS may be differently configured from an RNTI for a DL-SCH (for example, a C-RNTI, an MCS-C-RNTI, or a CS-RNTI). According to another method, the RNTI for the MBS may be configured to be the same as the RNTI for the DL-SCH (for example, the C-RNTI, the MCS-C-RNTI, or the CS-RNTI) and a further identification may be performed by logical channel IDs. Also, with respect to each MBS provided in the MBS user data channel, a first ID or a second ID for each MBS may be configured or broadcast, and each logical channel ID or each RNTI corresponding to the first ID or the second ID of each MBS may be configured or broadcast, in the system information, the RRC message (the RRCSetup, the RRCResume, the RRCReconfiguration, the RRCRelease, or the newly defined new RRC message), or the control message for the MBS channel (for example, transmitted from the MBS control data channel). The first ID may indicate a PLMN providing the MBS, a type of MBS, or a session. The second ID may indicate a more detailed session or type of the MBS. In the DL-SCH, a logical channel ID which may be assigned to a bearer for a general data service (a voice, the Internet, or a video service) may be assigned with a certain combination of bits (for example, 6 bits) in a logical channel ID space which may be generated in certain bits (for example, 6 bits). A logical channel ID with respect to the MBS control data channel, the MBS user data channel, or each service of the MBS user data channel may be assigned with a certain combination of bits (for example, 6 bits) in the first logical channel ID space. Alternatively, MBS control information (an MAC CE, for example, an MAC CE for a network to indicate a suspension of the BMS or for the UE to indicate stopping of receiving the MBS) for supporting the MBS or a logical channel ID with respect to padding for inserting the padding to the MBS data for supporting the MBS may also be assigned with a certain combination of bits (for example, 6 bits) in the first logical channel ID space. According to another method, in order to double the logical channel ID space, the logical channel ID with respect to the MBS control data channel, the MBS user data channel, or each service of the MBS user data channel may be assigned with a certain combination of bits (for example, 6 bits) in a new second logical channel ID space. Alternatively, the MBS control information (the MAC CE, for example, the MAC CE for the network to indicate a suspension of the BMS or for the UE to indicate stopping of receiving the MBS) for supporting the MBS or the logical channel ID with respect to padding for inserting the padding to the MBS data for supporting the MBS may also be assigned with a certain combination of bits (for example, 6 bits) in the new second logical channel ID space. The first logical channel ID space and the second logical channel ID space may be distinguished from each other in the MAC entity via the MBS channel, the DL-SCH channel, or the transport resource (a frequency, a time transmission resource, frequency information, a BWP ID, BWP configuration information, an exclusive carrier or exclusive SCell ID, or exclusive cell information), or may be distinguished from each other by using different RNTIs from each other. Thus, when the MAC entity of the UE receives the MBS data through a channel or a transport resource via which the MBS is received, the MAC entity may, based on the received transmission channel (for example, the MBCH, the DL-SCH, the BCH, etc.), the BWP ID, the SCell ID, the logical channel ID, or the RNTI, identify the MBS data or demultiplex the identified MBS data and transmit the data to a corresponding upper entity. The 1-$2^{nd}$ MBS receiving method may be applied to a UE in an RRC connected mode, an RRC inactive mode, or an RRC idle mode.

A 1-$3^{rd}$ method of receiving an MBS 1$h$-10: In the 1-$3^{rd}$ method of receiving the MBS 1$h$-10 in FIG. 1H, an additional physical channel or transmission channel (for example, an MBCH) for the MBS may be configured, and an additional transport resource (a frequency, a time resource, a transmission cycle, a BWP (or a BWP ID), a bandwidth, an exclusive frequency (frequency information or an SCell ID), or a sub-carrier spacing) may be configured or defined, in the system information, the RRC message (the RRCSetup, the RRCResume, the RRCReconfiguration, the RRCRelease, or the newly defined new RRC message), or the control message for the MBS channel (for example, transmitted from the MBS control data channel). In the MBS data transmitted for the MBS, a MAC header may not be attached, and each of the MBS control data channel (for example, an MBCCH) and an MBS user data channel (for example, an MBTCH) may be differently identified based on the RNTI. Also, an RNTI may be differently assigned for each of the MBS control data channel (for example, an MBCCH) and the MBS user data channel (for example, an MBTCH). Also, a different RNTI may be assigned for each MBS provided in the MBS user data channel. Thus, because the MBS control data channel (for example, the MBCCH), the MBS user data channel, or each MBS provided in the MBS user data channel may be identified by the RNTIs, the logical channel ID may not have to be configured with respect to the MBS control data channel, the MBS user data channel, or each MBS provided in the MBS user data channel, and the MAC header may not have to be included in the MBS data. Also, with respect to each MBS provided in the MBS user data channel, a first ID or a second ID for each MBS may be configured or broadcast, and each RNTI corresponding to the first ID or the second ID of each MBS may be configured or broadcast, in the system information, the RRC message (the RRCSetup, the RRCResume, the RRCReconfiguration, the RRCRelease, or the newly defined new RRC message), or the control message for the MBS channel (for example, transmitted from the MBS control data channel). The first ID may indicate a PLMN providing the MBS, a type of MBS, or a session. The second ID may indicate a more detailed session or type of the MBS. Thus, when the MAC entity of the UE receives the MBS data through a channel or a transport resource via which the MBS is received, the MAC entity may, based on the received transmission channel (for example, the MBCH, the DL-SCH, the BCH, etc.), the BWP ID, the SCell ID, the logical channel ID, or the RNTI, identify the MBS data or demultiplex the identified MBS data and transmit the data to a corresponding upper entity. The 1-$3^{rd}$ MBS receiving method may be applied to a UE in an RRC connected mode, an RRC inactive mode, or an RRC idle mode.

A 2-$1^{st}$ method of receiving an MBS 1$h$-20: In the 2-$1^{st}$ method of receiving the MBS 1$h$-20 in FIG. 1H, an additional physical channel or transmission channel (for example, an MBCH) for the MBS may be configured, and an additional transport resource (a frequency, a time resource, a transmission cycle, a BWP (or a BWP ID), a bandwidth, an exclusive frequency (frequency information or an SCell ID), or a sub-carrier spacing) may be configured or defined, in the system information, the RRC message (the RRCSetup, the RRCResume, the RRCReconfiguration, the RRCRelease, or the newly defined new RRC message), or the control message for the MBS channel (for example, transmitted from the MBS control data channel). In the MBS data transmitted for the MBS, an MAC header may always be attached, and a logical channel ID included in the MAC header may be differently assigned for each of the MBS control data channel (for example, an MBCCH) and an MBS user data channel (for example, an MBTCH). Also, a different logical channel ID may be assigned with respect to each MBS provided through the MBS user data channel. A first ID or a second ID for each MBS may be configured or broadcast, and each logical channel ID corresponding to the first ID or the second ID of each MBS may be configured or broadcast, in the system information, the RRC message (the RRCSetup, the RRCResume, the RRCReconfiguration, the RRCRelease, or the newly defined new RRC message), or the control message for the MBS channel (for example, transmitted from the MBS control data channel). The first ID may indicate a PLMN providing the MBS, a type of MBS, or a session. The second ID may indicate a more detailed session or type of the MBS. In the DL-SCH, a logical channel ID which may be assigned to a bearer for a general data service (a voice, the Internet, or a video service) may be assigned with a certain combination of bits (for example, 6 bits) in a logical channel ID space which may be generated in certain bits (for example, 6 bits). A logical channel ID with respect to the MBS control data channel, the MBS user data channel, or each service of the MBS user data channel may be assigned with a certain combination of bits (for example, 6 bits) in the first logical channel ID space. Alternatively, MBS control information (an MAC CE, for example, an MAC CE for a network to indicate a suspension of the BMS or for the UE to indicate stopping of receiving the MBS) for supporting the MBS or a logical channel ID with respect to padding for inserting the padding to the MBS data for supporting the MBS may also be assigned with a certain combination of bits (for example, 6 bits) in the first logical channel ID space. According to another method, in order to double the logical channel ID space, the logical channel ID with respect to the MBS control data channel, the MBS user data channel, or each service of the MBS user data channel may be assigned with a certain combination of bits (for example, 6 bits) in a new second logical channel ID space. Alternatively, the MBS control information (the MAC CE, for example, the MAC CE for the network to indicate a suspension of the BMS or for the UE to indicate stopping of receiving the MBS) for supporting the MBS or the logical channel ID with respect to padding for inserting the padding to the MBS data for supporting the MBS may also be assigned with a certain combination of bits (for example, 6 bits) in the new second logical channel ID space. The first logical channel ID space and the second logical channel ID space may be distinguished from each other in the MAC entity via the MBS channel, the DL-SCH channel, or the transport resource (a frequency, a time transmission resource, frequency information, a BWP ID, BWP configuration information, an exclusive carrier or exclusive SCell ID, or exclusive cell information), or may be distinguished from each other by using different RNTIs from each other. Thus, when the MAC entity of the UE receives the MBS data through a channel or a transport resource via which the MBS is received, the MAC entity may, based on the received transmission channel (for example, the MBCH, the DL-SCH, the BCH, etc.), the BWP ID, the SCell ID, the logical channel ID, or the RNTI, identify the MBS data or demultiplex the identified MBS data and transmit the data to a corresponding upper entity. The 2-$1^{st}$ MBS receiving method may be applied to a UE in an RRC connected mode, an RRC inactive mode, or an RRC idle mode.

A 2-$2^{nd}$ method of receiving an MBS 1*h*-20: In the 2-$2^{nd}$ method of receiving the MBS 1*h*-20 in FIG. 1H, an additional physical channel or transmission channel (for example, an MBCH) for the MBS may be configured, and an additional transport resource (a frequency, a time resource, a transmission cycle, a BWP (or a BWP ID), a bandwidth, an exclusive frequency (frequency information or an SCell ID), or a sub-carrier spacing) may be configured or defined, in the system information, the RRC message (the RRCSetup, the RRCResume, the RRCReconfiguration, the RRCRelease, or the newly defined new RRC message), or the control message for the MBS channel (for example, transmitted from the MBS control data channel). In the MBS data transmitted for the MBS, an MAC header may be attached, and a logical channel ID included in the MAC header may be differently assigned for each of the MBS control data channel (for example, an MBCCH) and an MBS user data channel (for example, an MBTCH). Also, a different logical channel ID may be assigned with respect to each MBS provided through the MBS user data channel. Also, an RNTI may be differently assigned for each of the MBS control data channel (for example, an MBCCH) and the MBS user data channel (for example, an MBTCH). Also, a different RNTI may be assigned for each MBS provided in the MBS user data channel. Thus, because the MBS control data channel (for example, the MBCCH), the MBS user data channel, or each MBS provided in the MBS user data channel may be identified by the RNTIs, the logical channel ID may be assigned with the same logical channel ID with respect to the MBS control data channel, the MBS user data channel, or each MBS provided in the MBS user data channel. According to another method, the same RNTI may be assigned to the MBS control data channel (for example, the MBCCH), the MBS user data channel, or each MBS provided in the MBS user data channel, and a further specific identification may be performed by assigning a different logical channel ID to the MBS control data channel (for example, the MBCCH), the MBS user data channel, or each MBS provided in the MBS user data channel. The RNTI for the MBS may be differently configured from an RNTI for a DL-SCH (for example, a C-RNTI, an MCS-C-RNTI, or a CS-RNTI). According to another method, the RNTI for the MBS may be configured to be the same as the RNTI for the DL-SCH (for example, the C-RNTI, the MCS-C-RNTI, or the CS-RNTI) and a further identification may be performed by logical channel IDs. Also, with respect to each MBS provided in the MBS user data channel, a first ID or a second ID for each MBS may be configured or broadcast, and each logical channel ID or each RNTI corresponding to the first ID or the second ID of each MBS may be configured or broadcast, in the system information, the RRC message (the RRCSetup, the RRCResume, the RRCReconfiguration, the RRCRelease, or the newly defined new RRC message), or the control message for the MBS channel (for example, transmitted from the MBS control data channel). The first ID may indicate a PLMN providing the MBS, a type of MBS, or a session. The second ID may indicate a more detailed session or type of the MBS. In the DL-SCH, a logical channel ID which may be assigned to a bearer for a general data service (a voice, the Internet, or a video service) may be assigned with a certain combination of bits (for example, 6 bits) in a logical channel ID space which may be generated in certain bits (for example, 6 bits). A logical channel ID with respect to the MBS control data channel, the MBS user data channel, or each service of the MBS user data channel may be assigned with a combination of certain bits (for example, 6 bits) in the first logical channel ID space. Alternatively, MBS control information (an MAC CE, for example, an MAC CE for a network to indicate a suspension of the BMS or for the UE to indicate stopping of receiving the MBS) for supporting the MBS or a logical channel ID with respect to padding for inserting the padding to the MBS data for supporting the MBS may also be assigned with a certain combination of bits (for example, 6 bits) in the first logical channel ID space. According to another method, in order to double the logical channel ID space, the logical channel ID with respect to the MBS control data channel, the MBS user data channel, or each service of the MBS user data channel may be assigned with a certain combination of bits (for example, 6 bits) in a new second logical channel ID space. Alternatively, the MBS control information (the MAC CE, for example, the MAC CE for the network to indicate a suspension of the BMS or for the UE to indicate stopping of receiving the MBS) for supporting the MBS or the logical channel ID with respect to padding for inserting the padding to the MBS data for supporting the MBS may also be assigned with a certain combination of bits (for example, 6 bits) in the new second logical channel ID space. The first logical channel ID space and the second logical channel ID space may be distinguished from each other in the MAC entity via the MBS channel, the DL-SCH channel, or the transport resource (a frequency, a time transmission resource, frequency information, a BWP ID, BWP configuration information, an exclusive carrier or exclusive SCell ID, or exclusive cell information), or may be distinguished from each other by using different RNTIs from each other. Thus, when the MAC entity of the UE receives the MBS data through a channel or a transport resource via which the MBS is received, the MAC entity may, based on the received transmission channel (for example, the MBCH, the DL-SCH, the BCH, etc.), the BWP ID, the SCell ID, the logical channel ID, or the RNTI, identify the MBS data or demultiplex the identified MBS data and transmit the data to a corresponding upper entity. The 2-2$^{nd}$ MBS receiving method may be applied to a UE in an RRC connected mode, an RRC inactive mode, or an RRC idle mode.

A 2-3$^{rd}$ method of receiving an MBS 1$h$-20: In the 2-3$^{rd}$ method of receiving the MBS 1$h$-20 in FIG. 1H, an additional physical channel or transmission channel (for example, an MBCH) for the MBS may be configured, and an additional transport resource (a frequency, a time resource, a transmission cycle, a BWP (or a BWP ID), a bandwidth, an exclusive frequency (frequency information or an SCell ID), or a sub-carrier spacing) may be configured or defined, in the system information, the RRC message (the RRCSetup, the RRCResume, the RRCReconfiguration, the RRCRelease, or the newly defined new RRC message), or the control message for the MBS channel (for example, transmitted from the MBS control data channel). In the MBS data transmitted for the MBS, a MAC header may not be attached, and each of the MBS control data channel (for example, an MBCCH) and an MBS user data channel (for example, an MBTCH) may be differently identified based on the RNTI. Also, an RNTI may be differently assigned for each of the MBS control data channel (for example, an MBCCH) and the MBS user data channel (for example, an MBTCH). Also, a different RNTI may be assigned for each MBS provided in the MBS user data channel. Thus, because the MBS control data channel (for example, the MBCCH), the MBS user data channel, or each MBS provided in the MBS user data channel may be identified by the RNTIs, the logical channel ID may not have to be configured with respect to the MBS control data channel, the MBS user data channel, or each MBS provided in the MBS user data channel, and the MAC header may not have to be included in the MBS data.

Also, with respect to each MBS provided in the MBS user data channel, a first ID or a second ID for each MBS may be configured or broadcast, and each RNTI corresponding to the first ID or the second ID of each MBS may be configured or broadcast, in the system information, the RRC message (the RRCSetup, the RRCResume, the RRCReconfiguration, the RRCRelease, or the newly defined new RRC message), or the control message for the MBS channel (for example, transmitted from the MBS control data channel). The first ID may indicate a PLMN providing the MBS, a type of MBS, or a session. The second ID may indicate a more detailed session or type of the MBS. Thus, when the MAC entity of the UE receives the MBS data through a channel or a transport resource via which the MBS is received, the MAC entity may, based on the received transmission channel (for example, the MBCH, the DL-SCH, the BCH, etc.), the BWP ID, the SCell ID, the logical channel ID, or the RNTI, identify the MBS data or demultiplex the identified MBS data and transmit the data to a corresponding upper entity. The 2-3$^{rd}$ MBS receiving method may be applied to a UE in an RRC connected mode, an RRC inactive mode, or an RRC idle mode.

Figure 1I:
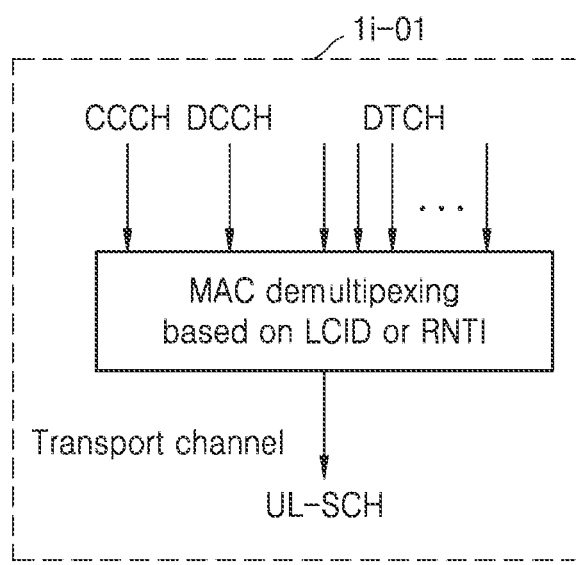
FIG. 1I is a diagram of a method of multiplexing, via a MAC entity, MBS data to be transmitted, when a terminal in an RRC connected mode, an RRC inactive mode, or an RRC idle mode transmits the MBS data (for example, MBS control data, MBS user data, or general data other than the MBS data) via a multicast bearer or a unicast bearer supporting the MBS, according to an embodiment of the disclosure.

FIG. 1I is a diagram of a method of multiplexing, via an MAC entity, MBS data to be transmitted, when a UE in an RRC connected mode, an RRC inactive mode, or an RRC idle mode transmits the MBS data (for example, MBS control data, MBS user data, or general data other than the MBS data) via a multicast bearer or a unicast bearer supporting the MBS, according to an embodiment of the disclosure.

Referring to FIG. 1I, it is based on the bearer structures provided in FIG. 1G described above, and the method of transmitting the MBS data or the method of transmitting and multiplexing the MBs data may use one or a plural number of the following methods. According to another method, different methods from among the following methods may be applied according to whether a UE is in an RRC connected mode, an RRC inactive mode, or an RRC idle mode.

A first method of transmitting an MBS 1$i$-01: when the UE receiving the MBS according to the methods provided in FIG. 1H has to transmit UL MBS data in response to a request of a network or according to the need of the UE, the UE or the UE in an RRC connected mode, an RRC inactive mode, or an RRC idle mode may transmit the UL MBS data to a base station or the network. The network or the base station may transmit, to the UE, a network request by including the network request in the MBS data (for example, MBS control data, MBS user data, an RRC message, RLC control data (RLC control PDU), PDCP control data (PDCP control PDU), MAC control data (MAC CE), or a newly defined message) and may transmit or configure an indication with respect to a state of the MBS (for example, suspension or resuming of a service) or information (or an indicator) requesting a response with respect to the MBS (for example, whether the UE is receiving a specific MBS, whether the UE wants to receive a specific MBS, whether the UE is interested in a specific MBS, a preference between a multicast bearer and a unicast bearer, or a preference with respect to conversion of a bearer (whether the UE wants to receive the MBS through a multicast bearer or receive the MBS through a unicast bearer)). The base station or the network may transmit the MBS data including the request of the network through an additional DL channel, a physical channel for the MBS, a transmission channel (for example, an MBCH), or an additional transport resource (a frequency, a time resource, a transmission cycle, a BWP (or a BWP ID), a bandwidth, an exclusive frequency (frequency information or an SCell ID), or a sub-carrier spacing), configured in the system information, the RRC message (for example, the RRCSetup, the RRCResume, the RRCReconfiguration, the RRCRelease, or the newly defined new RRC message), or the control message for the MBS channel (for example, transmitted from the MBS control data channel) as described in FIG. 1H, so that the UEs in the RRC connected mode, the RRC inactive mode, or the RRC idle mode may receive the MBS. As described above, the MBS data may be transmitted via one transport resource, and the plurality of UEs may receive the MBS data, and thus, the waste of the transport resource may be prevented, and the transport resource may be efficiently used. According to another method, the base station or the network may transmit the MBS data including the request of the network through a DL channel (for example, a DL-SCH, a CCCH, or a DDCH), an additional transport resource (a frequency, a time resource, a transmission cycle, a BWP (or a BWP ID), a bandwidth, an exclusive frequency (frequency information or an SCell ID), or a sub-carrier spacing), SRB0 (a CCCH), or SRB1 (a DCCH), configured in the system information or the RRC message (for example, the RRCSetup, the RRCResume, the RRCReconfiguration, the RRCRelease, or the newly defined new RRC message) as described in FIG. 1H, so that only the UEs in the RRC connected mode may receive the MBS. The UL MBS data may be MBS control data, MBS user data, an RRC message, RLC control data (RLC control PDU), PDCP control data (PDCP control PDU), MAC control data (an MAC CE), or a newly defined message. In the first method of transmitting the MBS, the UE may transmit the UL MBS data through an additional UL channel, a physical channel for the MBS, a transmission channel (for example, a UL-MBCH), or an additional transport resource (a frequency, a time resource, a transmission cycle, a BWP (or a BWP ID), a bandwidth, an exclusive frequency (frequency information or an SCell ID), or a sub-carrier spacing), configured in the system information, the RRC message (for example, the RRCSetup, the RRCResume, the RRCReconfiguration, the RRCRelease, or the newly defined new RRC message), or the control message for the MBS channel (for example, transmitted from the MBS control data channel). For example, the UE may include an MAC header in the UL MBS data, may configure a logical channel ID of the MAC header as a logical channel ID (a logical channel ID configured or assigned with respect to (an) MBS control data (channel), (an) MBS user data (channel), (an) MBS user data (channel) with respect to a specific MBS, SRB0 (a CCCH), SRB1 (a DCCH), a DRB, or MAC control information) according to a purpose of the UL MBS data (the MBS control data, the MBS user data, or MBS user data with respect to a specific MBS), and may transmit the UL MBS data. According to a bearer structure configured from among the bearer structures provided in FIG. 1G, an RLC header, a PDCP header, or an SDAP header may also be included. According to another method, the UE may transmit the UL MBS data through a UL transport resource indicated by a PDCCH via an RNTI (an RNTI configured with respect to (an) MBS user data (channel) or (an) MBS user data (channel) with respect to a specific MBS) suitable for the purpose of the UL MBS data (the MBS control data, the MBS user data, or the MBS user data with respect to a specific MBS). The UL MBS data may be identified by the RNTI, and thus, may not include a MAC header or a logical channel ID. According to another method, the UL MBS data may include the MAC header, the logical channel ID of the MAC header may be configured as the logical channel ID (the logical channel ID configured or assigned with respect to the MBS control data (channel), the MBS user data (channel), the MBS user data (channel) with respect to a specific MBS, the SRB0 (the CCCH), the SRB1 (the DCCH), the DRB, or the MAC control information) according to the purpose of the UL MBS data (the MBS control data, the MBS user data, or the MBS user data with respect to a specific MBS), and the UL MBS data may be transmitted. According to a bearer structure configured from among the bearer structures provided in FIG. 1G, the RLC header, the PDCP header, or the SDAP header may also be included.

A second method of transmitting an MBS 1*i*-01: when the UE receiving the MBS according to the methods provided in FIG. 1H has to transmit UL MBS data in response to a request of a network or according to the need of the UE, only the UE in an RRC connected mode may transmit the UL MBS data to a base station or the network. The network or the base station may transmit, to the UE, a network request by including the network request in the MBS data (for example, MBS control data, MBS user data, an RRC message, RLC control data (RLC control PDU), PDCP control data (PDCP control PDU), MAC control data (MAC CE), or a newly defined message) and may transmit or configure an indication with respect to a state of the MBS (for example, suspension or resuming of a service) or information (or an indicator) requesting a response with respect to the MBS (for example, whether the UE is receiving a specific MBS, whether the UE wants to receive a specific MBS, whether the UE is interested in a specific MBS, a preference between a multicast bearer and a unicast bearer, or a preference with respect to conversion of a bearer (whether the UE wants to receive the MBS through a multicast bearer or receive the MBS through a unicast bearer)). The base station or the network may transmit the MBS data including the request of the network through an additional DL channel, a physical channel for the MBS, a transmission channel (for example, an MBCH), or an additional transport resource (a frequency, a time resource, a transmission cycle, a BWP (or a BWP ID), a bandwidth, an exclusive frequency (frequency information or an SCell ID), or a sub-carrier spacing), configured in the system information, the RRC message (for example, the RRCSetup, the RRCResume, the RRCReconfiguration, the RRCRelease, or the newly defined new RRC message), or the control message for the MBS channel (for example, transmitted from the MBS control data channel) as described in FIG. 1H, so that the UEs in the RRC connected mode, the RRC inactive mode, or the RRC idle mode may receive the MBS. By transmitting the MBS data as described above, the MBS data may be transmitted via one transport resource, and the plurality of UEs may receive the MBS data. Thus, the waste of the transport resource may be prevented, and the transport resource may be efficiently used. According to another method, the base station or the network may transmit the MBS data including the request of the network through a DL channel (for example, a DL-SCH, a CCCH, or a DDCH), an additional transport resource (a frequency, a time resource, a transmission cycle, a BWP (or a BWP ID), a bandwidth, an exclusive frequency (frequency information or an SCell ID), or a sub-carrier spacing), SRB0 (a CCCH), or SRB1 (a DCCH), configured in the system information or the RRC message (for example, the RRCSetup, the RRCResume, the RRCReconfiguration, the RRCRelease, or the newly defined new RRC message) as described in FIG. 1H, so that only the UEs in the RRC connected mode may receive the MBS. The UL MBS data may be MBS control data, MBS user data, an RRC message, RLC control data (RLC control PDU), PDCP control data (PDCP control PDU), MAC control data (a MAC CE), or a newly defined message. In the second method of transmitting the MBS, the UE in the RRC connected mode may transmit the UL MBS data through an additional UL channel, a physical channel for the MBS, a transmission channel (for example, a UL-SCH, a channel for a general data service), an additional transport resource (a frequency, a time resource, a transmission cycle, a BWP (or a BWP ID), a bandwidth, an exclusive frequency (frequency information or an SCell ID), or a sub-carrier spacing), or a transport resource assigned to a PDCCH scrambled by an RNTI (for example, a C-RNTI) assigned to the UE in the RRC connected mode, configured in the system information, the RRC message (for example, the RRCSetup, the RRCResume, the RRCReconfiguration, the RRCRelease, or the newly defined new RRC message), or the control message for the MBS channel (for example, transmitted from the MBS control data channel). When the UE in the RRC connected mode transmits the UL MBS data through the transport resource assigned to the PDCCH scrambled by the RNTI (for example, the C-RNTI) assigned to the UE in the RRC connected mode, the UE in the RRC connected mode may transmit the UL MBS through SRB0 (a CCH), SRB1 (a DCCH), or a DRB. For example, the UE in the RRC connected mode may include an MAC header in the UL MBS data, may configure a logical channel ID of the MAC header as a logical channel ID (a logical channel ID configured or assigned with respect to (an) MBS control data (channel), (an) MBS user data (channel), (an) MBS user data (channel) with respect to a specific MBS, SRB0 (a CCCH), SRB1 (a DCCH), a DRB, or MAC control information) according to a purpose of the UL MBS data (the MBS control data, the MBS user data, or MBS user data with respect to a specific MBS), and may transmit the UL MBS data. According to a bearer structure configured from among the bearer structures provided in FIG. 1G, an RLC header, a PDCP header, or an SDAP header may also be included. According to another method, the UE in the RRC connected mode may transmit the UL MBS data through a UL transport resource indicated by a PDCCH via an RNTI (an RNTI configured with respect to (an) MBS user data (channel) or (an) MBS user data (channel) with respect to a specific MBS) suitable for the purpose of the UL MBS data (the MBS control data, the MBS user data, or the MBS user data with respect to a specific MBS). The UL MBS data may be identified by the RNTI, and thus, may not include a MAC header or a logical channel ID. According to another method, the UL MBS data may include the MAC header, the logical channel ID of the MAC header may be configured as the logical channel ID (the logical channel ID configured or assigned with respect to the MBS control data (channel), the MBS user data (channel), the MBS user data (channel) with respect to a specific MBS, the SRB0 (the CCCH), the SRB1 (the DCCH), the DRB, or the MAC control information) according to the purpose of the UL MBS data (the MBS control data, the MBS user data, or the MBS user data with respect to a specific MBS), and the UL MBS data may be transmitted. According to a bearer structure configured from among the bearer structures provided in FIG. 1G, the RLC header, the PDCP header, or the SDAP header may also be included.

Next, signaling procedures for a base station or a network to support an MBS to a UE and for the UE to receive the MBS are provided according to the disclosure. As described hereinafter according to the disclosure, through one signaling procedure from among various signaling procedures, the base station may provide the MBS to the UE, or the UE may receive the MBS.

Figure 1J:
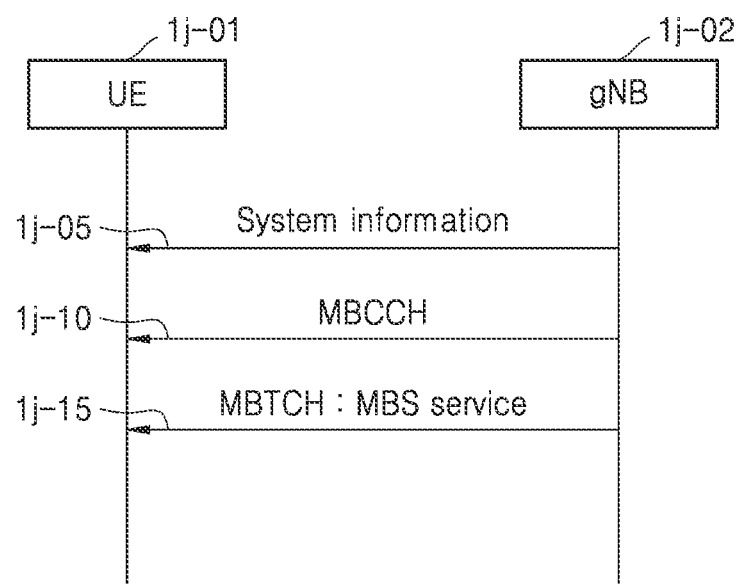
FIG. 1J is a diagram of a first signaling procedure for supporting an MBS, according to an embodiment of the disclosure.

FIG. 1J is a diagram of a first signaling procedure for supporting an MBS, according to an embodiment of the disclosure.

The first signaling procedure for supporting the MBS, according to the disclosure, may support the MBS to the UE based on system information.

Referring to FIG. 1J, a UE 1j-01 may perform cell selection or reselection in an RRC idle mode or an RRC inactive mode, may select a suitable cell, and may camp-on the cell. Then, the UE 1j-01 may receive system information 1j-05 from a gNB 1j-02 in the RRC idle mode, the RRC inactive mode, or the RRC connected mode and may identify pieces of configuration information for the MBS from the system information. The configuration information for the MBS may include the following configuration information. That is, for supporting the MBS, the network may transmit the system information including some of the following configuration information.

Whether or not the MBS is supported.

Configuration information with respect to a physical channel or a DL or UL transmission channel (for example, an MBCH, an MBCCH, an MBTCH, or a DL-SCH) for the MBS.

Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.

Configuration information about the MBS supported by a current cell For example, a list of the MBSs, or a first ID (for example, a temporary mobile group identity (TMGI)) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or a bearer ID), each logical channel, each piece of RLC configuration information, or each piece of PDCP configuration information. According to another method, the first ID (for example, the TMGI) or the second ID (for example, the session identity) or the RNTI for the MBS may be configured or broadcast for each bearer (or a bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.

Indicator configuration information indicating whether a bearer or a bearer ID supporting (transmitting or receiving) the MBS is a unicast bearer or a multicast bearer.

Information (for example, a frequency, a time resource, or a cell ID) about an MBS-exclusive carrier or a cell (Cell, SCell, or PCell) for the MBS.

MBS-exclusive BWP information (for example, DL BWP information or UL BWP information) or BWP ID information for the MBS.

Indicator information configuring a header compression function or procedure with respect to a bearer supporting the MBS (in this disclosure, a header compression procedure (for example, robust header compression (ROHC), Ethernet header compression (EHC), or a data compression procedure may be configured and supported), or configuration information for a header compression procedure or a data compression procedure (for example, an indicator indicating whether or not to further use a header compression context).

In the above configuration information, a length of a PDCP serial number or an RLC serial number may also be configured, and according to another method, a default length of the RLC serial number or the PDCP serial number may be defined.

In the above configuration information, an indicator to indicate whether an RLC entity of the bearer supporting the MBS is to support or allow unidirectional communication or support or allow bidirectional communication may also be configured.

When the configuration information for the MBS in a cell that is camped on is not broadcast via system information, the UE may transmit, to the base station, the cell, or the network, a message or an indicator requesting broadcasting of the system information for the MBS in the cell that is camped on. When the base station or the network receives the message or the indicator, the base station or the network may broadcast or transmit the configuration information for the MBS by using the system information. By doing so, the base station may prevent a waste of the transport resource, which may occur when the MBS-related system information is unnecessarily and constantly broadcast.

The UE receiving the system information 1j-05 may store or apply the MBS configuration information, may search for or determine an MBS in which the UE is interested or which the UE wants to receive, and may receive MBS data (MBS control data or MBS user data) through a transport resource through which an MBS control data channel or an MBS user data channel with respect to the MBS in which the UE is interested is transmitted. When the UE receives the system information, is to receive an interesting service, has an interesting service, or determines an interesting system, when the UE is or enters into in a cell or a domain supporting the MBS in the system information, when the MBS (or session) is configured or connected, or when configuration information for the MBS or bearer configuration information is received or broadcast via the system information, the RRC message (the RRCSetup, the RRCResume, the RRCReconfiguration, the RRCRelease, or the newly defined new RRC message), or the control message for the MBS channel (for example, transmitted from the MBS control data channel), the UE may configure a unicast bearer, a multicast bearer, or an MBS bearer for receiving the MBS having the provided bearer structure.

The UE may receive MBS configuration data by receiving the MBS data (for example, the MBS control data) through an MBCCH or a transport resource with respect to the MBS in which the UE is interested (1j-10).

The MBS configuration information may be transmitted by including some of the following configuration information for supporting the MBS.

Whether or not the MBS is supported.

Configuration information about a physical channel, or a DL or UL transmission channel (for example, an MBCH, an MBCCH, an MBTCH, or a DL-SCH) for the MBS.

Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.

Configuration information about the MBS supported by a current cell For example, a list of the MBSs, or a first ID (for example, a TMGI) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or a bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.

Indicator configuration information indicating whether a bearer or a bearer ID supporting (transmitting or receiving) the MBS is a unicast bearer or a multicast bearer.

Information (for example, a frequency, a time resource, or a cell ID) about an MBS-exclusive carrier or a cell (Cell, SCell, or PCell) for the MBS.

MBS-exclusive BWP information (for example, DL BWP information or UL BWP information) or BWP ID information for the MBS.

Indicator information configuring a header compression function or procedure with respect to a bearer supporting the MBS (in this disclosure, a header compression procedure (for example, ROHC, EHC, or a data compression procedure may be configured and supported), or configuration information for a header compression procedure or a data compression procedure (for example, an indicator indicating whether or not to further use a header compression context).

In the above configuration information, a length of a PDCP serial number or an RLC serial number may also be configured, and according to another method, a default length of the RLC serial number or the PDCP serial number may be defined.

In the above configuration information, an indicator to indicate whether an RLC entity of the bearer supporting the MBS is to support or allow unidirectional communication or support or allow bidirectional communication may also be configured.

When the UE receives the MBS configuration information, in order to receive the MBS in which the UE is interested or which the UE is to receive, the UE may identify the first ID, the second ID, the RNTI, or the logical channel ID configured or assigned with respect to the MBS in which the UE is interested or which the UE is to receive, and, by using the identified IDs, may receive the MBS data through the MBS user data channel and receive the MBS, by applying the methods provided in FIG. 1G or 1H of the disclosure (1j-15).

Figure 1K:
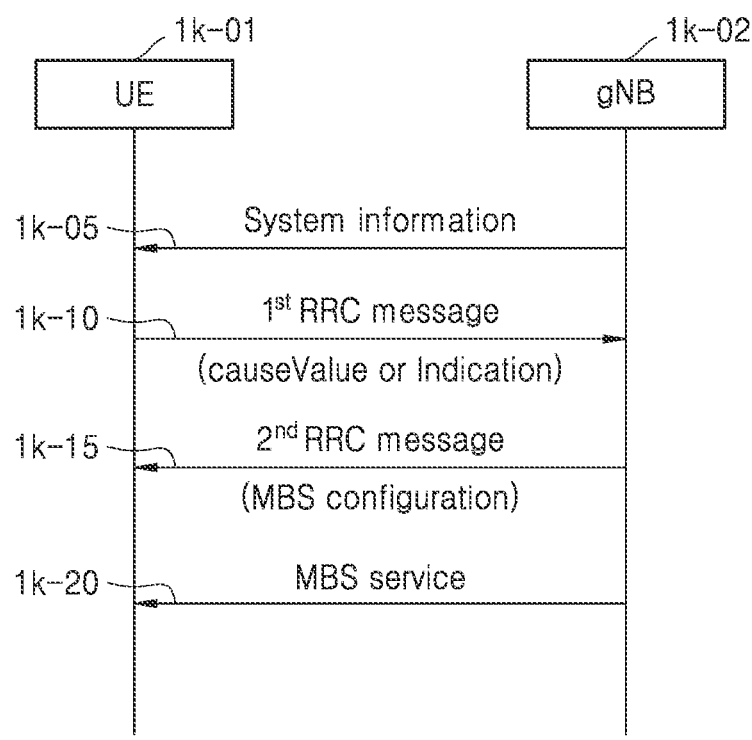
FIG. 1K is a diagram of a second signaling procedure for supporting an MBS, according to an embodiment of the disclosure.

FIG. 1K is a diagram of a second signaling procedure for supporting the MBS, according to an embodiment of the disclosure.

In the second signaling procedure for supporting the MBS, according to the disclosure, the UE may, based on system information, identify an MBS, in which the UE is interested, or which is broadcast, establish a connection with a network and indicate, to a base station (or the network), an MBS in which the UE is interested or which the UE is to receive, or an intention to receive the MBS, receive MBS-related configuration information from the base station (or the network), and receive the MBS. In the second signaling procedure, the UE may maintain an RRC idle mode, an RRC connected mode, or an RRC inactive mode (for example, the UE may receive the MBS without conversion of the RRC mode). According to another method, the UE may enter into an RRC connected mode from an RRC idle mode or an RRC inactive mode, in order to indicate, to the base station (or the network), the MBS in which the UE is interested or which the UE is to receive, or an intention to receive the MBS, and receive the MBS configuration information from the base station (or the network). Alternatively, after the UE receives the MBS configuration information, the UE may receive the MBS in the RRC connected mode or may receive the MBS in the RRC idle mode or the RRC inactive mode.

Referring to FIG. 1K, a UE 1k-01 may perform cell selection or reselection in an RRC idle mode or an RRC inactive mode, may select a suitable cell, and may camp-on the cell. Then, the UE 1k-01 may receive system information 1k-05 from a gNB 1k-02 in the RRC idle mode, the RRC inactive mode, or the RRC connected mode and may receive pieces of configuration information for the MBS from the system information. The configuration information for the MBS may include the following configuration information. That is, for supporting the MBS, the network may transmit the system information including some of the following configuration information.

Whether or not the MBS is supported.

Configuration information with respect to a physical channel or a DL or UL transmission channel (for example, an MBCH, an MBCCH, an MBTCH, or a DL-SCH) for the MBS.

Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.

Configuration information about the MBS supported by a current cell For example, a list of the MBSs, or a first ID (for example, a TMGI) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or a bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.

Indicator configuration information indicating whether a bearer or a bearer ID supporting (transmitting or receiving) the MBS is a unicast bearer or a multicast bearer.

Information (for example, a frequency, a time resource, or a cell ID) about an MBS-exclusive carrier or a cell (Cell, SCell, or PCell) for the MBS.

MBS-exclusive BWP information (for example, DL BWP information or UL BWP information) or BWP ID information for the MBS.

Indicator information configuring a header compression function or procedure with respect to a bearer supporting the MBS (in this disclosure, a header compression procedure (for example, ROHC, EHC, or a data compression procedure may be configured and supported), or configuration information for a header compression procedure or a data compression procedure (for example, an indicator indicating whether or not to further use a header compression context).

In the above configuration information, a length of a PDCP serial number or an RLC serial number may also be configured, and according to another method, a default length of the RLC serial number or the PDCP serial number may be defined.

In the above configuration information, an indicator to indicate whether an RLC entity of the bearer supporting the MBS is to support or allow unidirectional communication or support or allow bidirectional communication may also be configured.

When the configuration information for the MBS in a cell that is camped on is not broadcast via system information, the UE may transmit, to the base station, the cell, or the network, a message or an indicator requesting broadcasting of the system information for the MBS in the cell that is camped on. When the base station or the network receives the message or the indicator, the base station or the network may broadcast or transmit the configuration information for the MBS by using the system information. By doing so, the base station may prevent a waste of the transport resource, which may occur when the MBS-related system information is unnecessarily and constantly broadcast.

The UE receiving or identifying the MBS-related information via the system information, the UE identifying, via the system information, that the MBS in which the UE is interested is being broadcast in a current cell, or the UE which is to request the MBS in which the UE is interested from the network may perform a random access process and transmit a first RRC message to the network. The first RRC message may be a newly defined RRC message for an MBS, or may be defined as an RRCSetupRequest message, an RRCResumeRequest message, previous other RRC messages, MAC control information, RLC control information, or PDCP control information. The UE may include, in the first RRC message, an indicator indicating that the UE is to receive the MBS, an indicator indicating a reception of the MBS for establishing an RRC connection with the network, or a first ID, a second ID, a logical channel ID, an RNTI, or a bearer ID of the MBS in which the UE is interested or which the UE is to receive. The UE may include, in the first RRC message, an indicator indicating a type of bearer (for example, a unicast bearer or a multicast bearer) or a structure of a bearer to apply, establish, or use for the MBS, or a preferred type of bearer (for example, a unicast bearer or a multicast bearer) or a preferred structure of a bearer, or an indicator indicating in which RRC mode (an RRC connected mode, an RRC idle mode, or an RRC inactive mode) the UE wants to receive the MBS. Alternatively, the UE may transmit the first RRC message by including, in the first RRC message, an indicator with respect to an MBS in which the UE is not interested any further, which the UE is to stop receiving, or which the UE has stopped receiving, or an indicator indicating a switch of an MBS to another MBS. The indicator included in the first RRC message by the UE may be determined or indicated based on the system information received in 1k-05. Also, the first RRC message may include UE capability information. For example, when the UE is to receive an MBS, the UE may include, in the first RRC message, configuration information about a function or a configuration supported by a UE capability or configuration information about a function or a configuration implemented in the UE and may transmit the first RRC message to notify the base station. When the UE previously configured a connection, stores a UE ID assigned from the network, or is indicated with a UE ID by an upper entity (for example, a NAS entity or an RRC entity), the UE may include the UE ID in the first RRC message and transmit the first RRC message so that the network may distinguish or identify the UE. For example, the base station or the network may identify the UE based on the UE ID included in the first RRC message, may identify the UE by retrieving the UE capability information from a core network, or may identify the UE by retrieving the configuration information of the UE from a base station to which the UE was previously connected. When the UE receives the system information, is to receive an interesting service, has an interesting service, or determines an interesting system, when the UE is or enters into in a cell or a domain supporting the MBS in the system information, or when the MBS (or a session) is configured or connected, the UE may configure a connection with the network and may transmit the first RRC message (1k-10).

In the process of 1k-10, when the base station receives the first RRC message, the base station may identify the MBS in which the UE is interested or which the UE is to receive, or the UE capability information.

The base station or the network may transmit a second RRC message 1k-15 to the UE in order to support or configure the MBS, for the UE (1k-15). The second RRC message may be a newly defined RRC message for an MBS, or may be defined as an RRCRelease message, an RRCReconfiguration message, or previous other RRC messages.

The second RRC message may include configuration information for the MBS, MBS configuration information or bearer configuration information indicated by the UE in the first RRC message, or configuration information about a unicast bearer, a multicast bearer, or an MBS bearer for receiving the MBS.

The second RRC message may be transmitted by including some of the following configuration information for supporting the MBS.
- Whether or not the MBS is supported.
- Configuration information about a physical channel, or a DL or UL transmission channel (for example, an MBCH, an MBCCH, an MBTCH, or a DL-SCH) for the MBS.
- Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.
- Configuration information about the MBS supported by a current cell For example, a list of the MBSs, or a first ID (for example, a TMGI) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or a bearer ID), each logical channel, each piece of RLC configuration information, or each piece of PDCP configuration information The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.
- Indicator configuration information indicating whether a bearer or a bearer ID supporting (transmitting or receiving) the MBS is a unicast bearer or a multicast bearer.
- Indicator or configuration information indicating to transition to an RRC idle mode, an RRC inactive mode, or an RRC connected mode.
- MBS configuration information or bearer configuration information provided for reception of an MBS in the RRC idle mode.

MBS configuration information or bearer configuration information provided for reception of an MBS in the RRC inactive mode.

Information (for example, a frequency, a time resource, or a cell ID) about an MBS-exclusive carrier or a cell (Cell, SCell, or PCell) for the MBS.

MBS-exclusive BWP information (for example, DL BWP information or UL BWP information) or BWP ID information for the MBS.

Information about an indicator configuring a header compression function or procedure with respect to a bearer supporting the MBS (in this disclosure, a header compression procedure (for example, an ROHC, an EHC, or a data compression procedure may be configured and supported), or configuration information for a header compression procedure or a data compression procedure (for example, an indicator indicating whether or not to further use a header compression context).

In the above configuration information, a length of a PDCP serial number or an RLC serial number may also be configured, and according to another method, a default length of the RLC serial number or the PDCP serial number may be defined.

In the above configuration information, an indicator to indicate whether an RLC entity of the bearer supporting the MBS is to support or allow unidirectional communication or support or allow bidirectional communication may also be configured.

The UE receiving the second RRC message may store or apply the MBS-related configuration information, may search for or determine an MBS in which the UE is interested or which the UE wants to receive, and may receive MBS data (MBS control data or MBS user data) through a transport resource through which an MBS control data channel or an MBS user data channel with respect to the MBS in which the UE is interested is transmitted. When the UE receives the system information, is to receive an interesting service, has an interesting service, or determines an interesting system, when the UE is or enters into in a cell or a domain supporting the MBS in the system information, when the MBS (or session) is configured or connected, or when configuration information for the MBS or bearer configuration information is received or broadcast via the system information, the RRC message (the RRCSetup, the RRCResume, the RRCReconfiguration, the RRCRelease, or the newly defined new RRC message), or the control message for the MBS channel (for example, transmitted from the MBS control data channel), the UE may configure a unicast bearer, a multicast bearer, or an MBS bearer for receiving the MBS having the provided bearer structure.

The UE may receive MBS configuration data by receiving the MBS data (for example, the MBS control data) through an MBCCH or a transport resource with respect to the MBS in which the UE is interested.

When the UE receives the MBS configuration information, in order to receive the MBS in which the UE is interested or which the UE is to receive, the UE may identify the first ID, the second ID, the RNTI, or the logical channel ID configured or assigned with respect to the MBS in which the UE is interested or which the UE is to receive, and, by using the identified IDs, may receive the MBS data through the MBS user data channel and receive the MBS, by applying the methods provided in FIG. 1G or 1H of the disclosure (1k-20).

A ciphering process or an integrity protection process may not be applied to the first RRC message or the second RRC message. According to another method, in order to enhance the security, a ciphering process or an integrity protection process may not be applied to the first RRC message or the second RRC message, and a ciphering process or an integrity protection process may be applied to the first RRC message or the second RRC message. According to another method, in order to further enhance the security, a ciphering process or an integrity protection process may be applied to the first RRC message or the second RRC message, and a ciphering process or an integrity protection process may be applied to the first RRC message or the second RRC message.

Figure 1L:
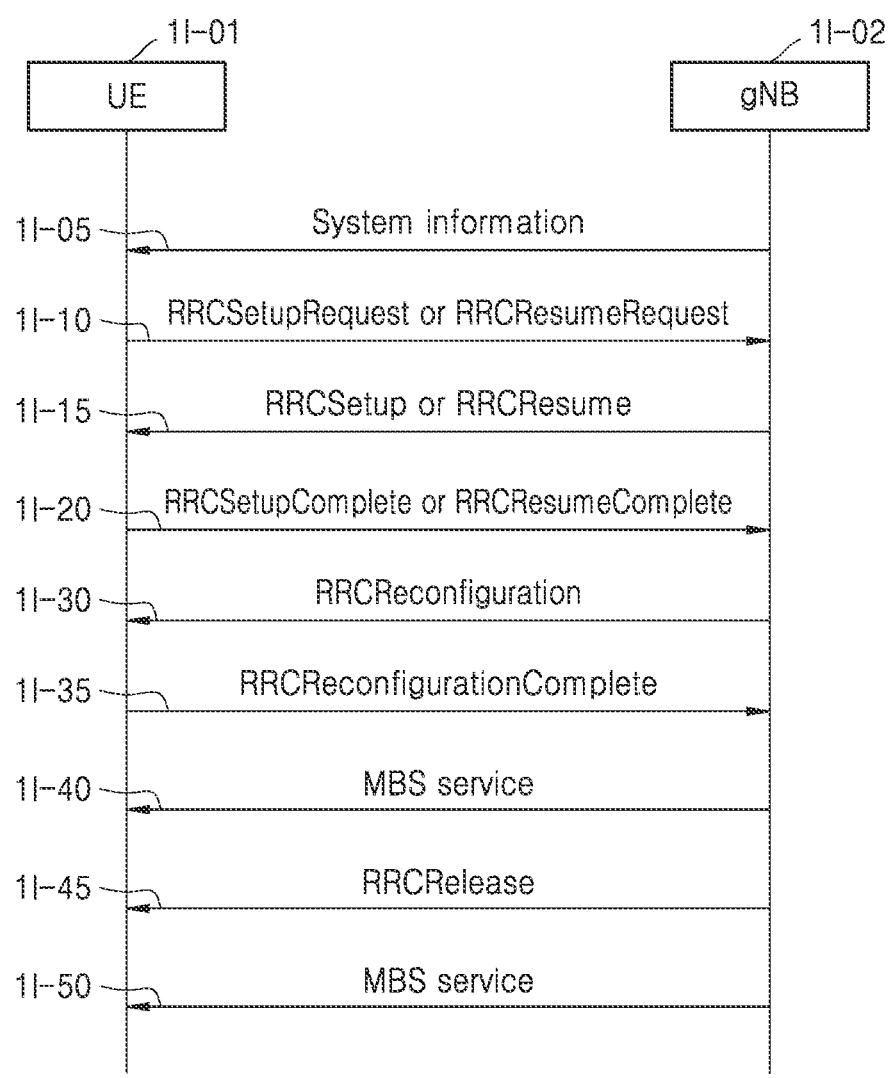
FIG. 1L is a diagram of a third signaling procedure for supporting an MBS, according to an embodiment of the disclosure.

FIG. 1L is a diagram of a third signaling procedure for supporting the MBS, according to an embodiment of the disclosure.

In the third signaling procedure for supporting the MBS, according to the disclosure, the UE may, based on system information, identify an MBS, in which the UE is interested, or which is broadcast, establish a connection with a network and indicate, to a base station (or the network), an MBS in which the UE is interested or which the UE is to receive, or an intention to receive the MBS, receive MBS-related configuration information from the base station (or the network), and receive the MBS. In the third signaling procedure, the UE may maintain an RRC idle mode, an RRC connected mode, or an RRC inactive mode. According to another method, the UE may enter into an RRC connected mode from an RRC idle mode or an RRC inactive mode, in order to indicate, to the base station (or the network), the MBS in which the UE is interested or which the UE is to receive, or an intention to receive the MBS, and receive the MBS configuration information from the base station (or the network). Alternatively, after the UE receives the MBS configuration information, the UE may receive the MBS in the RRC connected mode or may receive the MBS in the RRC idle mode or the RRC inactive mode.

Referring to FIG. 1L, a UE 1l-01 may perform cell selection or reselection in an RRC idle mode or an RRC inactive mode, may select a suitable cell, and may camp-on the cell. Then, the UE 1l-01 may receive system information 1l-05 from the gNB 1l-02 in the RRC idle mode, the RRC inactive mode, or the RRC connected mode and may receive pieces of configuration information for the MBS from the system information. The configuration information for the MBS may include some of the following configuration information. That is, for supporting the MBS, the network may transmit the system information including some of the following configuration information.

Whether or not the MBS is supported.

Configuration information with respect to a physical channel or a DL or UL transmission channel (for example, an MBCH, an MBCCH, an MBTCH, or a DL-SCH) for the MBS.

Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.

Configuration information about the MBS supported by a current cell For example, a list of the MBSs, or a first ID (for example, a TMGI) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.

Indicator configuration information indicating whether a bearer or a bearer ID supporting (transmitting or receiving) the MBS is a unicast bearer or a multicast bearer.

Information (for example, a frequency, a time resource, or a cell ID) about an MBS-exclusive carrier or a cell (Cell, SCell, or PCell) for the MBS.

MBS-exclusive BWP information (for example, DL BWP information or UL BWP information) or BWP ID information for the MBS.

Indicator information configuring a header compression function or procedure with respect to a bearer supporting the MBS (in this disclosure, a header compression procedure (for example, ROHC, EHC, or a data compression procedure may be configured and supported), or configuration information for a header compression procedure or a data compression procedure (for example, an indicator indicating whether or not to further use a header compression context).

In the above configuration information, a length of a PDCP serial number or an RLC serial number may also be configured, and according to another method, a default length of the RLC serial number or the PDCP serial number may be defined.

In the above configuration information, an indicator to indicate whether an RLC entity of the bearer supporting the MBS is to support or allow unidirectional communication or support or allow bidirectional communication may also be configured.

When the configuration information for the MBS in a cell that is camped on is not broadcast via system information, the UE may transmit, to the base station, the cell, or the network, a message or an indicator requesting broadcasting of the system information for the MBS in the cell that is camped on. When the base station or the network receives the message or the indicator, the base station or the network may broadcast or transmit the configuration information for the MBS by using the system information. By doing so, the base station may prevent a waste of the transport resource, which may occur when the MBS-related system information is unnecessarily and constantly broadcast.

The UE receiving or identifying the MBS-related information via the system information, the UE identifying, via the system information, that the MBS in which the UE is interested is being broadcast in a current cell, or the UE which is to request the MBS in which the UE is interested from the network may perform a random access process and transmit a first RRC message to the network. The first RRC message may be a newly defined RRC message for an MBS, or may be defined as an RRCSetupRequest message, an RRCResumeRequest message, or previous other RRC messages. The UE may include, in the first RRC message, an indicator indicating that the UE is to receive the MBS, or an indicator indicating a reception of the MBS for establishing an RRC connection with the network, or when the UE previously configured connection, when the UE stores a UE ID assigned from the network (for example, a UE ID (5G-S-TMSI) assigned from a core network or a UE ID (short I-RNTI or I-RNTI) assigned from the base station for resumption of the RRC connection), or when the UE ID is indicated by an upper entity (for example, an NAS entity or an RRC entity), the UE may transmit the first RRC message by including the UE ID in the first RRC message so that the network may distinguish or identify the UE. For example, the base station or the network may identify the UE based on the UE ID included in the first RRC message, may identify the UE by retrieving the UE capability information from a core network, or may identify the UE by retrieving the configuration information of the UE from a base station to which the UE was previously connected. When the UE receives the system information, is to receive an interesting service, has an interesting service, or determines an interesting system, when the UE is or enters into in a cell or a domain supporting the MBS in the system information, or when the MBS (or a session) is configured or connected, the UE may configure a connection with the network and may transmit the first RRC message.

In the process of 1*l*-10, when the base station receives the first RRC message, the base station may identify the MBS in which the UE is interested or which the UE is to receive, or the UE capability information.

The base station or the network may transmit a second RRC message 1*l*-15 to the UE in order to support or configure the MBS, for the UE. The second RRC message may be a newly defined RRC message for an MBS, or may be defined as an RRCRelease message, an RRCReconfiguration message, or previous other RRC messages.

The second RRC message may include configuration information for the MBS, MBS configuration information or bearer configuration information indicated by the UE in the first RRC message, or configuration information about a unicast bearer, a multicast bearer, or an MBS bearer for receiving the MBS.

The second RRC message may be transmitted by including some of the following configuration information for supporting the MBS.

- Whether or not the MBS is supported.
- Configuration information about a physical channel, or a DL or UL transmission channel (for example, an MBCH, an MBCCH, an MBTCH, or a DL-SCH) for the MBS.
- Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.
- Configuration information about the MBS supported by a current cell For example, a list of the MBSs, or a first ID (for example, a temporary mobile group identity (TMGI)) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.

- Indicator configuration information indicating whether a bearer or a bearer ID supporting (transmitting or receiving) the MBS is a unicast bearer or a multicast bearer.
- Information (for example, a frequency, a time resource, or a cell ID) about an MBS-exclusive carrier or a cell (Cell, SCell, or PCell) for the MBS.
- MBS-exclusive BWP information (for example, DL BWP information or UL BWP information) or BWP ID information for the MBS.
- Information about an indicator configuring a header compression function or procedure with respect to a bearer supporting the MBS (in this disclosure, a header compression procedure (for example, an ROHC, an EHC, or a data compression procedure may be configured and supported), or configuration information for a header compression procedure or a data compression procedure (for example, an indicator indicating whether or not to further use a header compression context).
- In the above configuration information, a length of a PDCP serial number or an RLC serial number may also be configured, and according to another method, a default length of the RLC serial number or the PDCP serial number may be defined.
- In the above configuration information, an indicator to indicate whether an RLC entity of the bearer supporting the MBS is to support or allow unidirectional communication or support or allow bidirectional communication may also be configured.

When the UE receives the system information, is to receive an interesting service, has an interesting service, or determines an interesting system, when the UE is or enters into in a cell or a domain supporting the MBS in the system information, when the MBS (or session) is configured or connected, or when configuration information for the MBS or bearer configuration information is received or broadcast via the system information, the RRC message (the RRCSetup, the RRCResume, the RRCReconfiguration, the RRCRelease, or the newly defined new RRC message), or the control message for the MBS channel (for example, transmitted from the MBS control data channel), the UE may configure a unicast bearer, a multicast bearer, or an MBS bearer for receiving the MBS having the provided bearer structure.

When the UE receives the second RRC message, the UE may apply the configuration information included in the second RRC message, and in response thereto, may transmit a third RRC message (for example, RRCSetupComplete or RRCResumecomplete) to the base station or the network (1*l*-20).

The UE may include, in the third RRC message, an indicator indicating that the UE is to receive the MBS, an indicator indicating a reception of the MBS for establishing an RRC connection with the network, or a first ID, a second ID, a logical channel ID, an RNTI, or a bearer ID of the MBS in which the UE is interested or which the UE is to receive.

The UE may include, in the first RRC message or the third RRC message, an indicator indicating a type of bearer (for example, a unicast bearer or a multicast bearer) or a structure of a bearer to apply, establish, or use for the MBS, or a preferred type of bearer (for example, a unicast bearer or a multicast bearer) or a preferred structure of a bearer, or an indicator indicating in which RRC mode (an RRC connected mode, an RRC idle mode, or an RRC inactive mode) the UE wants to receive the MBS. Alternatively, the UE may transmit the first RRC message or the third RRC message by including, in the first RRC message or the third RRC message, an indicator with respect to an MBS in which the UE is not interested any further, which the UE is to stop receiving, or which the UE has stopped receiving, or an indicator indicating a switch of an MBS to another MBS. The indicator included in the first RRC message or the third RRC message by the UE may be determined or indicated based on the system information received in 1*l*-05.

The base station may transmit, based on the preference reported by the UE, the indicator indicated by the UE, or an embodiment of the base station, a fourth RRC message (for example, RRCReconfiguration 1*l*-30) to the UE, to support the MBS, to configure or reconfigure the bearer through which the UE receives the MBS, or to configure or reconfigure the MBS-related configuration information. For example, the fourth RRC message may include configuration information for changing a type of bearer (for example, an indicator to convert a unicast bearer to a multicast bearer, an indicator to convert a multicast bearer to a unicast bearer, or bearer configuration information corresponding thereto), or logical channel ID information, RNTI information, or first ID or second ID information for the MBS, which is changed or updated with respect to each MBS.

The fourth RRC message include some of the following information.
- Whether or not the MBS is supported.
- Configuration information about a physical channel, or a DL or UL transmission channel (for example, an MBCH, an MBCCH, an MBTCH, or a DL-SCH) for the MBS.
- Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.
- Configuration information about the MBS supported by a current cell For example, a list of the MBSs, or a first ID (for example, a temporary mobile group identity (TMGI)) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or a bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.
- The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.
- Indicator configuration information indicating whether a bearer or a bearer ID supporting (transmitting or receiving) the MBS is a unicast bearer or a multicast bearer.
- Indicator configuration information indicating whether a bearer or a bearer ID supporting (transmitting or receiving) the MBS is a unicast bearer or a multicast bearer.
- Indicator or configuration information indicating to transition to an RRC idle mode, an RRC inactive mode, or an RRC connected mode.
- MBS configuration information or bearer configuration information provided for reception of an MBS in the RRC idle mode.
- MBS configuration information or bearer configuration information provided for reception of an MBS in the RRC inactive mode.
- Information (for example, a frequency, a time resource, or a cell ID) about an MBS-exclusive carrier or a cell (Cell, SCell, or PCell) for the MBS.
- MBS-exclusive BWP information (for example, DL BWP information or UL BWP information) or BWP ID information for the MBS.
- Information about an indicator configuring a header compression function or procedure with respect to a bearer supporting the MBS (in this disclosure, a header compression procedure (for example, an ROHC, an EHC, or a data compression procedure may be configured and supported), or configuration information for a header compression procedure or a data compression procedure (for example, an indicator indicating whether or not to further use a header compression context).

In the above configuration information, a length of a PDCP serial number or an RLC serial number may also be configured, and according to another method, a default length of the RLC serial number or the PDCP serial number may be defined.

In the above configuration information, an indicator to indicate whether an RLC entity of the bearer supporting the MBS is to support or allow unidirectional communication or support or allow bidirectional communication may also be configured.

After the UE receives the fourth RRC message and stores or apply the MBS-related configuration information, the UE may configure a fifth RRC message (for example, RRCReconfigurationComplete 1*l*-35) for indicating a successful configuration or reconfiguration and transmit the fifth RRC message to the base station.

When the UE receives the MBS configuration information, in order to receive, in the RRC connected mode, the MBS in which the UE is interested or which the UE is to receive, the UE may identify the first ID, the second ID, the RNTI, or the logical channel ID configured or assigned with respect to the MBS in which the UE is interested or which the UE is to receive, and, by using the identified IDs, may receive the MBS data through the MBS user data channel and receive the MBS, by applying the methods provided in FIG. 1G or 1H of the disclosure (1*l*-40).

The UE may receive MBS configuration data by receiving the MBS data (for example, the MBS control data) through an MBCCH or a transport resource with respect to the MBS in which the UE is interested.

When the base station is to transition the UE to an RRC inactive mode or an RRC idle mode (for example, according to an embodiment of the base station, a request of the UE, or an indication of the UE), the base station may configure a sixth RRC message (for example, RRCRelease 1*l*-45) and transmit the sixth RRC message to the UE to transition the UE to the RRC idle mode or the RRC inactive mode. The sixth RRC message 1*l*-45 may include the following information or some of the following information so that the UE may continually receive the MBS even in the RRC idle mode or the RRC inactive mode.

Whether or not the MBS is supported.

Configuration information about a physical channel, or a DL or UL transmission channel (for example, an MBCH, an MBCCH, an MBTCH, or a DL-SCH) for the MBS.

Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.

Configuration information about the MBS supported by a current cell For example, a list of the MBSs, or a first ID (for example, a TMGI) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or a bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.

Indicator configuration information indicating whether a bearer or a bearer ID supporting (transmitting or receiving) the MBS is a unicast bearer or a multicast bearer.

Indicator configuration information indicating whether a bearer or a bearer ID supporting (transmitting or receiving) the MBS is a unicast bearer or a multicast bearer.

Indicator or configuration information indicating to transition to an RRC idle mode, an RRC inactive mode, or an RRC connected mode.

MBS configuration information or bearer configuration information provided for reception of an MBS in the RRC idle mode.

MBS configuration information or bearer configuration information provided for reception of an MBS in the RRC inactive mode.

Information (for example, a frequency, a time resource, or a cell ID) about an MBS-exclusive carrier or a cell (Cell, SCell, or PCell) for the MBS.

MBS-exclusive BWP information (for example, DL BWP information or UL BWP information) or BWP ID information for the MBS.

Information about an indicator configuring a header compression function or procedure with respect to a bearer supporting the MBS (in this disclosure, a header compression procedure (for example, an ROHC, an EHC, or a data compression procedure may be configured and supported), or configuration information for a header compression procedure or a data compression procedure (for example, an indicator indicating whether or not to further use a header compression context).

In the above configuration information, a length of a PDCP serial number or an RLC serial number may also be configured, and according to another method, a default length of the RLC serial number or the PDCP serial number may be defined.

In the above configuration information, an indicator to indicate whether an RLC entity of the bearer supporting the MBS is to support or allow unidirectional communication or support or allow bidirectional communication may also be configured.

When the UE receives the MBS configuration information, in order to receive, in the RRC idle mode or the RRC inactive mode, the MBS in which the UE is interested or which the UE is to receive, the UE may identify the first ID, the second ID, the RNTI, or the logical channel ID configured or assigned with respect to the MBS in which the UE is interested or which the UE is to receive, and, by using the identified IDs, may receive the MBS data through the MBS user data channel and receive the MBS, by applying the methods provided in FIG. 1G or 1H of the disclosure (1*l*-50).

In order to receive the MBS, the UE may transmit the first RRC message 1*l*-10, may receive the second RRC message 1*l*-15, may retransmit a message of the third RRC message 1*l*-20, may receive the fourth RRC message, may transmit the fifth RRC message, and may receive the MBS in the RRC connected mode. Alternatively, thereafter, the UE may receive the sixth RRC message 1*l*-45 and may receive the MBS in the RRC idle mode or the RRC inactive mode.

According to another method, in order to receive the MBS, the UE may transmit the first RRC message 1*l*-10, may receive the second RRC message 1*l*-15 (converted to the RRC connected mode), may retransmit the message of the third RRC message 1*l*-20, may receive the sixth RRC message 1*l*-45, and may be converted to the RRC idle mode or the RRC inactive mode to receive the MBS in the RRC idle mode or the RRC inactive mode.

A ciphering process or an integrity protection process may not be applied to the first RRC message or the second RRC message. According to another method, in order to enhance the security, a ciphering process or an integrity protection process may not be applied to the first RRC message or the second RRC message, and a ciphering process or an integrity protection process may be applied to the first RRC message or the second RRC message. According to another method, in order to further enhance the security, a ciphering process or an integrity protection process may be applied to the first RRC message or the second RRC message, and a ciphering process or an integrity protection process may be applied to the first RRC message or the second RRC message. A ciphering process or an integrity protection process may be applied to the third RRC message. Also, a ciphering process or an integrity protection process may also be applied to the fourth RRC message, the fifth RRC message, or the sixth RRC message.

Figure 1M:
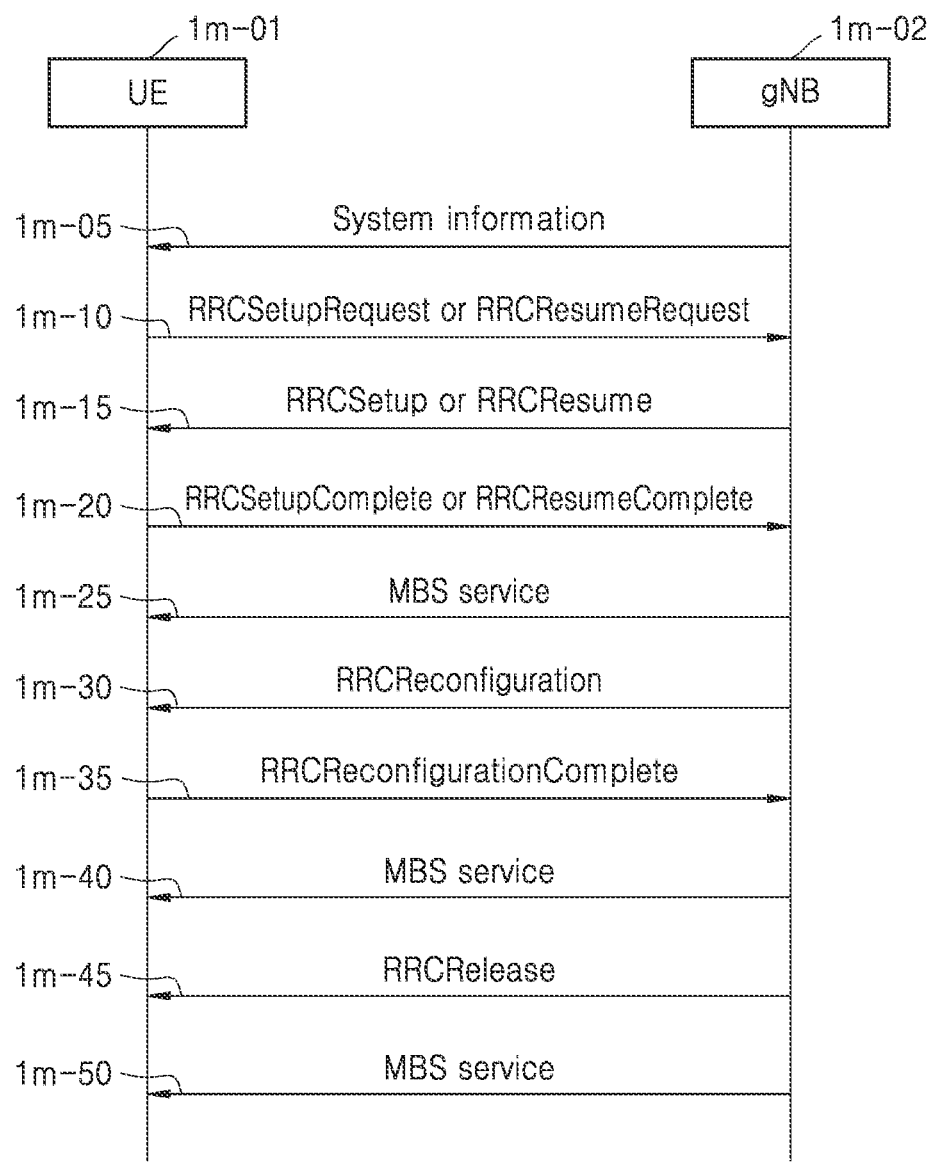
FIG. 1M is a diagram of a fourth signaling procedure for supporting an MBS, according to an embodiment of the disclosure.

FIG. 1M is a diagram of a fourth signaling procedure for supporting the MBS, according to an embodiment of the disclosure.

In the fourth signaling procedure for supporting the MBS, according to the disclosure, the UE may, based on system information, identify an MBS, in which the UE is interested, or which is broadcast, establish a connection with a network and indicate, to a base station (or the network), an MBS in which the UE is interested or which the UE is to receive, or an intention to receive the MBS, receive MBS-related configuration information from the base station (or the network), and receive the MBS. In the third signaling procedure, the UE may maintain an RRC idle mode, an RRC connected mode, or an RRC inactive mode. According to another method, the UE may enter into an RRC connected mode from an RRC idle mode or an RRC inactive mode, in order to indicate, to the base station (or the network), the MBS in which the UE is interested or which the UE is to receive, or an intention to receive the MBS, and receive the MBS configuration information from the base station (or the network). Alternatively, after the UE receives the MBS configuration information, the UE may receive the MBS in the RRC connected mode or may receive the MBS in the RRC idle mode or the RRC inactive mode.

Referring to FIG. 1M, a UE 1*m*-01 may perform cell selection or reselection in an RRC idle mode or an RRC inactive mode, may select a suitable cell, and may camp-on the cell. Then, the UE 1*m*-01 may receive system information 1*m*-05 from a gNB 1*m*-02 in the RRC idle mode, the RRC inactive mode, or the RRC connected mode and may receive pieces of configuration information for the MBS from the system information. The configuration information for the MBS may include one or a plural number of the following pieces of configuration information. That is, for supporting the MBS, the network may transmit the system information including one or a plural number of the following pieces of configuration information.

Whether or not the MBS is supported.

Configuration information with respect to a physical channel or a DL or UL transmission channel (for example, an MBCH, an MBCCH, an MBTCH, or a DL-SCH) for the MBS.

Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.

Configuration information about the MBS supported by a current cell For example, a list of the MBSs, or a first ID (for example, a TMGI) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.

Indicator configuration information indicating whether a bearer or a bearer ID supporting (transmitting or receiving) the MBS is a unicast bearer or a multicast bearer.

Information (for example, a frequency, a time resource, or a cell ID) about an MBS-exclusive carrier or a cell (Cell, SCell, or PCell) for the MBS.

MBS-exclusive BWP information (for example, DL BWP information or UL BWP information) or BWP ID information for the MBS.

Indicator information configuring a header compression function or procedure with respect to a bearer supporting the MBS (in this disclosure, a header compression procedure (for example, ROHC, EHC, or a data compression procedure may be configured and supported), or configuration information for a header compression procedure or a data compression procedure (for example, an indicator indicating whether or not to further use a header compression context).

In the above configuration information, a length of a PDCP serial number or an RLC serial number may also be configured, and according to another method, a default length of the RLC serial number or the PDCP serial number may be defined.

In the above configuration information, an indicator to indicate whether an RLC entity of the bearer supporting the MBS is to support or allow unidirectional communication or support or allow bidirectional communication may also be configured.

When the configuration information for the MBS in a cell that is camped on is not broadcast via system information, the UE may transmit, to the base station, the cell, or the network, a message or an indicator requesting broadcasting of the system information for the MBS in the cell that is camped on. When the base station or the network receives the message or the indicator, the base station or the network may broadcast or transmit the configuration information for the MBS by using the system information. By doing so, the base station may prevent a waste of the transport resource, which may occur when the MBS-related system information is unnecessarily and constantly broadcast.

The UE receiving or identifying the MBS-related information via the system information, the UE identifying, via the system information, that the MBS in which the UE is interested is being broadcast in a current cell, or the UE which is to request the MBS in which the UE is interested from the network may perform a random access process and transmit a first RRC message to the network (1$m$-10). The first RRC message may be a newly defined RRC message for an MBS, or may be defined as an RRCSetupRequest message, an RRCResumeRequest message, or previous other RRC messages. The UE may include, in the first RRC message, an indicator indicating that the UE is to receive the MBS, an indicator indicating a reception of the MBS for establishing an RRC connection with the network, or a first ID, a second ID, a logical channel ID, an RNTI, or a bearer ID of the MBS in which the UE is interested or which the UE is to receive. The UE may include, in the first RRC message, an indicator indicating a type of bearer (for example, a unicast bearer or a multicast bearer) or a structure of a bearer to apply, establish, or use for the MBS, or a preferred type of bearer (for example, a unicast bearer or a multicast bearer) or a preferred structure of a bearer, or an indicator indicating in which RRC mode (an RRC connected mode, an RRC idle mode, or an RRC inactive mode) the UE wants to receive the MBS. Alternatively, the UE may transmit the first RRC message by including, in the first RRC message, an indicator with respect to an MBS in which the UE is not interested any further, which the UE is to stop receiving, or which the UE has stopped receiving, or an indicator indicating a switch of an MBS to another MBS. The indicator included in the first RRC message by the UE may be determined or indicated based on the system information received in 1$m$-05. Also, the UE may report to the base station or the network UE capability information with respect to the MBS, through an additional RRC message. For example, when the base station transmits, to the UE, an RRC message requiring the UE capability information, the UE, in response to the RRC message requiring the UE capability information, may include, in a UE capability response RRC message, configuration information about a function or a configuration supported by a UE capability when the UE is to receive the MBS, or configuration information about a function or a configuration embodied in the UE, and may transmit the UE capability response RRC message to the base station or the network. When the UE previously configured connection, when the UE stores a UE ID assigned from the network (for example, a UE ID (5G-S-TMSI) assigned from a core network or a UE ID (short I-RNTI or I-RNTI) assigned from the base station for resumption of the RRC connection), or when the UE ID is indicated by an upper entity (for example, an NAS entity or an RRC entity), the UE may transmit the first RRC message by including the UE ID in the first RRC message so that the network may distinguish or identify the UE. For example, the base station or the network may identify the UE based on the UE ID included in the first RRC message, may identify the UE by retrieving the UE capability information from a core network, or may identify the UE by retrieving the configuration information of the UE from a base station to which the UE was previously connected. When the UE receives the system information, is to receive an interesting service, has an interesting service, or determines an interesting system, when the UE is or enters into in a cell or a domain supporting the MBS in the system information, or when the MBS (or a session) is configured or connected, the UE may configure a connection with the network and may transmit the first RRC message.

In the process of 1m-10, when the base station receives the first RRC message, the base station may identify the MBS in which the UE is interested or which the UE is to receive, or the UE capability information.

The base station or the network may transmit a second RRC message 1m-15 to the UE in order to support or configure the MBS, for the UE (1m-15). The second RRC message may be a newly defined RRC message for an MBS, or may be defined as an RRCRelease message, an RRCReconfiguration message, or previous other RRC messages.

The second RRC message may include configuration information for the MBS, MBS configuration information or bearer configuration information indicated by the UE in the first RRC message, or configuration information about a unicast bearer, a multicast bearer, or an MBS bearer for receiving the MBS.

The second RRC message may be transmitted by including one or a plural number of the following pieces of configuration information for supporting the MBS.

Whether or not the MBS is supported.
Configuration information about a physical channel, or a DL or UL transmission channel (for example, an MBCH, an MBCCH, an MBTCH, or a DL-SCH) for the MBS.
Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.
Configuration information about the MBS supported by a current cell For example, a list of the MBSs, or a first ID (for example, a TMGI) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.

Indicator configuration information indicating whether a bearer or a bearer ID supporting (transmitting or receiving) the MBS is a unicast bearer or a multicast bearer
Information (for example, a frequency, a time resource, or a cell ID) about an MBS-exclusive carrier or a cell (Cell, SCell, or PCell) for the MBS.
MBS-exclusive BWP information (for example, DL BWP information or UL BWP information) or BWP ID information for the MBS.
Information about an indicator configuring a header compression function or procedure with respect to a bearer supporting the MBS (in this disclosure, a header compression procedure (for example, an ROHC, an EHC, or a data compression procedure may be configured and supported), or configuration information for a header compression procedure or a data compression procedure (for example, an indicator indicating whether or not to further use a header compression context).
In the above configuration information, a length of a PDCP serial number or an RLC serial number may also be configured, and according to another method, a default length of the RLC serial number or the PDCP serial number may be defined.
In the above configuration information, an indicator to indicate whether an RLC entity of the bearer supporting the MBS is to support or allow unidirectional communication or support or allow bidirectional communication may also be configured.

The UE receiving the second RRC message may store or apply the MBS-related configuration information, may search for or determine an MBS in which the UE is interested or which the UE wants to receive, and may receive MBS data (MBS control data or MBS user data) through a transport resource through which an MBS control data channel or an MBS user data channel with respect to the MBS in which the UE is interested is transmitted. When the UE receives the system information, is to receive an interesting service, has an interesting service, or determines an interesting system, when the UE is or enters into in a cell or a domain supporting the MBS in the system information, when the MBS (or session) is configured or connected, or when configuration information for the MBS or bearer configuration information is received or broadcast via the system information, the RRC message (the RRCSetup, the RRCResume, the RRCReconfiguration, the RRCRelease, or the newly defined new RRC message), or the control message for the MBS channel (for example, transmitted from the MBS control data channel), the UE may configure a unicast bearer, a multicast bearer, or an MBS bearer for receiving the MBS having the provided bearer structure.

When the UE receives the second RRC message, the UE may apply the configuration information included in the second RRC message, and in response thereto, may transmit a third RRC message (for example, RRCSetupComplete or RRCResumecomplete) to the base station or the network (1m-20).

The UE may receive MBS configuration data by receiving the MBS data (for example, the MBS control data) through an MBCCH or a transport resource with respect to the MBS in which the UE is interested.

When the UE receives the MBS configuration information, in order to receive the MBS in which the UE is interested or which the UE is to receive, the UE may identify the first ID, the second ID, the RNTI, or the logical channel ID configured or assigned with respect to the MBS in which the UE is interested or which the UE is to receive, and, by using the identified IDs, may receive the MBS data through the MBS user data channel and receive the MBS, by applying the methods provided in FIG. 1G or 1H of the disclosure (1m-25).

The base station may transmit, based on the preference reported by the UE, the indicator indicated by the UE, or an embodiment of the base station, a fourth RRC message (for example, RRCReconfiguration 1m-30) to the UE, to support the MBS, to configure or reconfigure the bearer through which the UE receives the MBS, or to configure or reconfigure the MBS-related configuration information. For example, the fourth RRC message may include configuration information for changing a type of bearer (for example, an indicator to convert a unicast bearer to a multicast bearer, an indicator to convert a multicast bearer to a unicast bearer, or bearer configuration information corresponding thereto), or logical channel ID information, RNTI information, or first ID or second ID information for the MBS, which is changed or updated with respect to each MBS.

After the UE receives the fourth RRC message and stores or apply the MBS-related configuration information, the UE may configure a fifth RRC message (for example, RRCReconfigurationComplete 1m-35) for indicating a successful reconfiguration and transmit the fifth RRC message to the base station.

The UE may receive MBS configuration data by receiving the MBS data (for example, the MBS control data) through an MBCCH or a transport resource with respect to the MBS in which the UE is interested.

When the UE receives the MBS configuration information, in order to receive the MBS in which the UE is interested or which the UE is to receive, the UE may identify the first ID, the second ID, the RNTI, or the logical channel ID configured or assigned with respect to the MBS in which the UE is interested or which the UE is to receive, and, by using the identified IDs, may receive the MBS data through the MBS user data channel and receive the MBS, by applying the methods provided in FIG. 1G or 1H of the disclosure (1m-40).

When the base station is to transition the UE to an RRC inactive mode or an RRC idle mode (for example, according to an embodiment of the base station, a request of the UE, or an indication of the UE), the base station may configure a sixth RRC message (for example, RRCRelease 1m-45) and transmit the sixth RRC message to the UE to transition the UE to the RRC idle mode or the RRC inactive mode. The sixth RRC message 1m-45 may include the following information or some of the following information so that the UE may continually receive the MBS even in the RRC idle mode or the RRC inactive mode (1m-50).

Whether or not the MBS is supported.

Configuration information about a physical channel, or a DL or UL transmission channel (for example, an MBCH, an MBCCH, an MBTCH, or a DL-SCH) for the MBS.

Information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which the physical channel or the DL or UL transmission channel (for example, the MBCH, the MBCCH, or the MBTCH) is transmitted.

Configuration information about the MBS supported by a current cell For example, a list of the MBSs, or a first ID (for example, a TMGI) or a second ID (for example, a session identity) for each MBS may be configured or broadcast, and information about a logical channel ID, a bearer ID, or an RNTI corresponding to the first ID or the second ID of each MBS may be configured or broadcast. According to another method, the first ID (for example, the TMGI) or the second ID (for example, the session identity) or the RNTI for the MBS may be configured or broadcast for each bearer (or a bearer ID), each logical channel, each piece of RLC configuration information, or each piece of PDCP configuration information. The first ID may indicate a PLMN providing the MBS, a type of MBS, or a session. The second ID may indicate a more detailed session or type of the MBS. Also, the configuration information with respect to the MBS may include information about a transport resource (a frequency, a time resource, a transmission cycle, a BWP (or a BWP ID), a bandwidth, an exclusive frequency (frequency information or an SCell ID), a sub-carrier spacing, a sub-frame number, an ID indicating a transmission pattern, or the like), through which each MBS is supported, broadcast, or transmitted.

The bearer may be configured as the bearer structures provided in FIG. 1G to receive the MBS. Also, the configuration information may include indicator configuration information indicating reordering of HARQ, retransmitting of HARQ, or whether or not to use HARQ ACK or NACK, indicator configuration information indicating whether or not to use reordering of RLC, information about a transport resource to transmit HARQ ACK or NACK, indicator configuration information indicating whether or not to use in-order delivery of the RLC, configuration information about an RLC reordering timer value, or indicator configuration information with respect to whether or not to use non-order delivery of PDCP. The indicator configuration information indicating reordering of HARQ, retransmitting of HARQ, or whether or not to use HARQ ACK or NACK, the indicator configuration information indicating whether or not to use reordering of RLC, the indicator configuration information indicating whether or not to use in-order delivery of the RLC, the configuration information about an RLC reordering timer value, configuration information with respect to an RLC mode (a TM, a UM, or an AM), configuration information with respect to whether or not to use a function of segmenting data in an RLC entity, or the indicator configuration information with respect to whether or not to use non-order delivery of PDCP may be configured for each MBS or each bearer. According to another method, the configuration information may be defined as default configuration information, and the MBS bearer may be configured, via which the UE has some of the described functions as default, without the configuration information.

- Indicator configuration information indicating whether a bearer or a bearer ID supporting (transmitting or receiving) the MBS is a unicast bearer or a multicast bearer.
- Indicator configuration information indicating whether a bearer or a bearer ID supporting (transmitting or receiving) the MBS is a unicast bearer or a multicast bearer.
- Indicator or configuration information indicating to transition to an RRC idle mode, an RRC inactive mode, or an RRC connected mode.
- MBS configuration information or bearer configuration information provided for reception of an MBS in the RRC idle mode.
- MBS configuration information or bearer configuration information provided for reception of an MBS in the RRC inactive mode.
- Information (for example, a frequency, a time resource, or a cell ID) about an MBS-exclusive carrier or a cell (Cell, SCell, or PCell) for the MBS.
- MBS-exclusive BWP information (for example, DL BWP information or UL BWP information) or BWP ID information for the MBS.
- Information about an indicator configuring a header compression function or procedure with respect to a bearer supporting the MBS (in this disclosure, a header compression procedure (for example, an ROHC, an EHC, or a data compression procedure may be configured and supported), or configuration information for a header compression procedure or a data compression procedure (for example, an indicator indicating whether or not to further use a header compression context).
- In the above configuration information, a length of a PDCP serial number or an RLC serial number may also be configured, and according to another method, a default length of the RLC serial number or the PDCP serial number may be defined.
- In the above configuration information, an indicator to indicate whether an RLC entity of the bearer supporting the MBS is to support or allow unidirectional communication or support or allow bidirectional communication may also be configured.

When the UE receives the MBS configuration information, in order to receive the MBS in which the UE is interested or which the UE is to receive, the UE may identify the first ID, the second ID, the RNTI, or the logical channel ID configured or assigned with respect to the MBS in which the UE is interested or which the UE is to receive, and, by using the identified IDs, may receive the MBS data through the MBS user data channel and receive the MBS, by applying the methods provided in FIG. 1G or 1H of the disclosure (1m-15).

In order to receive the MBS, the UE may transmit the first RRC message 1m-10, may receive the second RRC message 1m-15, may retransmit a message of the third RRC message 1m-20, may receive the fourth RRC message, may transmit the fifth RRC message, and may receive the MBS in the RRC connected mode. Alternatively, thereafter, the UE may receive the sixth RRC message 1m-45 and may receive the MBS in the RRC idle mode or the RRC inactive mode.

According to another method, in order to receive the MBS, the UE may transmit the first RRC message 1m-10, may receive the second RRC message 1m-15 (converted to the RRC connected mode), may retransmit the message of the third RRC message 1m-20, may receive the sixth RRC message 1m-45, and may be converted to the RRC idle mode or the RRC inactive mode to receive the MBS in the RRC idle mode or the RRC inactive mode.

A ciphering process or an integrity protection process may not be applied to the first RRC message or the second RRC message. According to another method, in order to enhance the security, a ciphering process or an integrity protection process may not be applied to the first RRC message or the second RRC message, and a ciphering process or an integrity protection process may be applied to the first RRC message or the second RRC message. According to another method, in order to further enhance the security, a ciphering process or an integrity protection process may be applied to the first RRC message or the second RRC message, and a ciphering process or an integrity protection process may be applied to the first RRC message or the second RRC message. A ciphering process or an integrity protection process may be applied to the third RRC message. Also, a ciphering process or an integrity protection process may also be applied to the fourth RRC message, the fifth RRC message, or the sixth RRC message.

In the next-generation mobile communication system according to the disclosure, the first signaling procedure, the second signaling procedure, the third signaling procedure, or the fourth signaling procedure provided according to the disclosure may be supported.

Figure 1N:
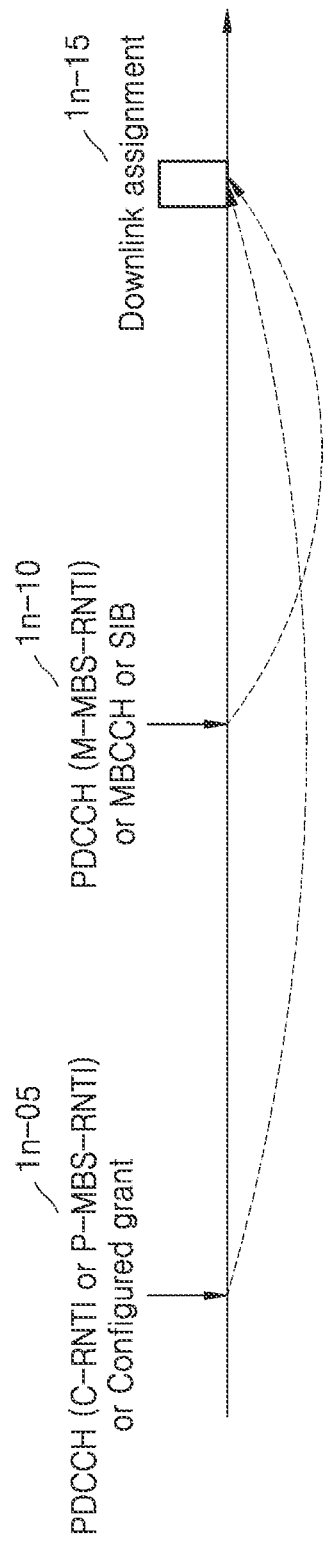
FIG. 1N is a diagram of a case in which general data and MBS data collide with or overlap each other when a terminal receives a general data service and an MBS in an RRC connected mode according to an embodiment of the disclosure.
Figure 10:
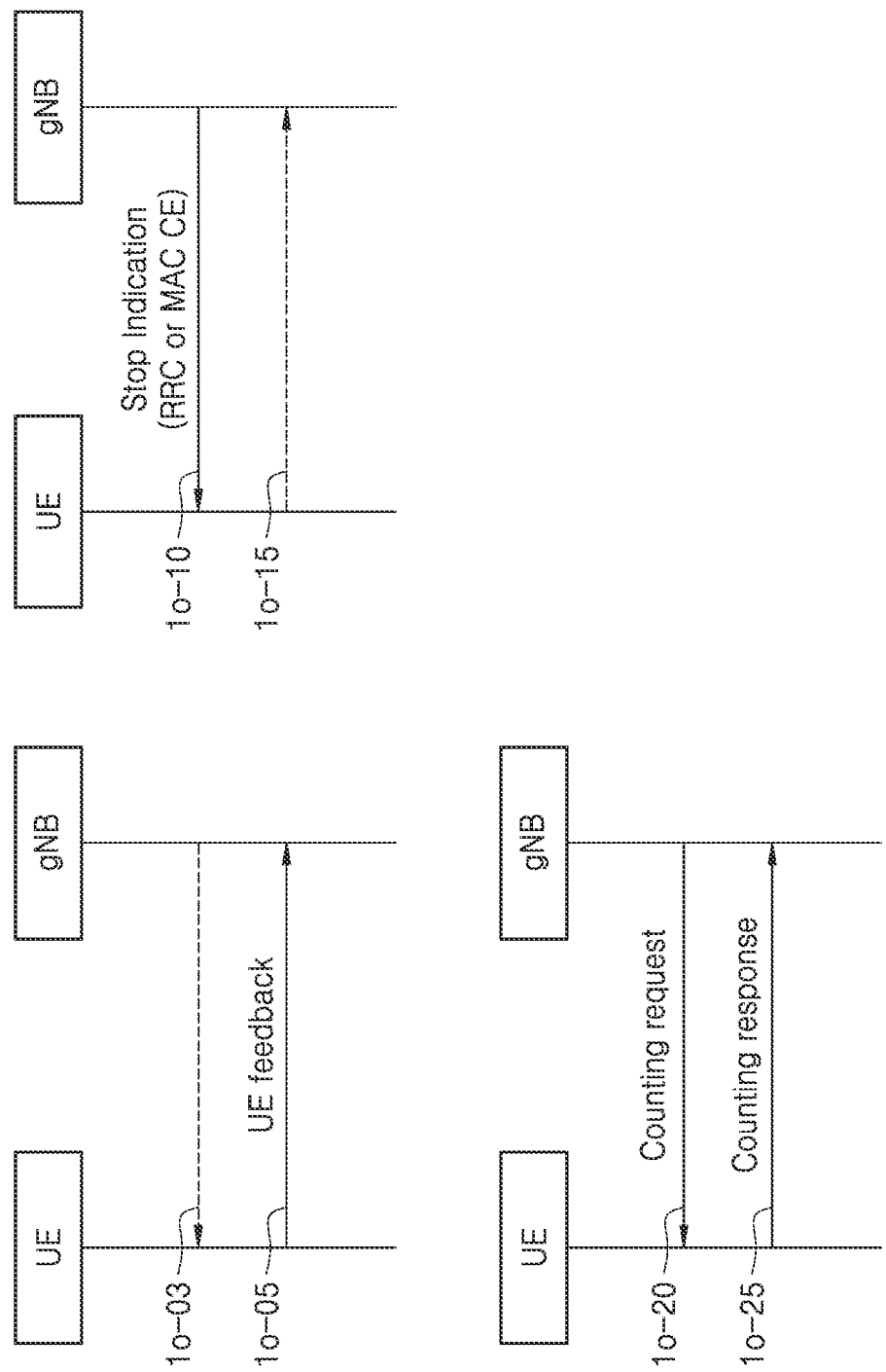

FIG. 1N is a diagram of a case in which general data and MBS data collide with or overlap each other when a UE receives a general data service and an MBS in an RRC connected mode according to an embodiment of the disclosure.

Referring to FIG. 1N, a UE in an RRC connected mode, which receives a general data service or an MBS, may receive first scheduling information 1n-05 with respect to the general data service and second scheduling information 1n-10 with respect to MBS data.

The first scheduling information 1n-05 may indicate a time resource or a frequency resource through which DL general data is transmitted, by using DCI of a PDCCH scrambled by a first RNTI (for example, a C-RNTI, which is an RNTI for scheduling the general data). According to another method, the first scheduling information may be indicated, by using an RRC message, as a time resource or a frequency resource configured for transmitting the DL general data. According to another method, the first scheduling information may be indicated, by using an RRC message, as a cyclic time resource or frequency resource configured for transmitting the DL general data, or may be indicated, by using DCI of a PDCCH, via activation or deactivation of the cyclic time resource or frequency resource.

The second scheduling information may indicate a time resource or a frequency resource through which DL MBS data is transmitted, by using DCI of a PDCCH scrambled by a second RNTI (for example, an MBS-RNTI, which is an RNTI for scheduling MBS data, or an RNTI for each MBS). According to another method, the second scheduling information may be indicated, by using system information, an RRC message, a control channel or a control message for an MBS, as a time resource or a frequency resource configured for transmitting the DL MBS data. According to another method, the second scheduling information may be indicated, by using system information, an RRC message, a control channel or a control message for an MBS, as a cyclic time resource or frequency resource configured for transmitting the DL MBS data, or may be indicated, by using DCI of a PDCCH, via activation or deactivation of the cyclic time resource or frequency resource.

When the UE receives the first scheduling information and the second scheduling information (1*n*-15), and when the DL time resource or frequency resource indicated by the first scheduling information or the second scheduling information is the same as each other, overlaps each other, or collides with each other, the UE may require a method of processing the first scheduling information and the second scheduling information.

Thus, next, according to the disclosure, methods of processing the first scheduling information and the second scheduling information when the UE receives the first scheduling information and the second scheduling information (1*n*-15), and when a DL time resource or frequency resource indicated by the first scheduling information or the second scheduling information is the same as each other, overlaps each other, or collides with each other, as described above, are provided.

A first method: when the time resource or the frequency resource indicated by the first scheduling information and the second scheduling information is the same as each other, overlaps each other, or collides with each other, the UE may receive general data via the time resource or the frequency resource according to the first scheduling information. Also, the UE may not receive the MBS data indicated by the second scheduling information, may ignore the MBS data indicated by the second scheduling information, or may not consider the second scheduling information. According to another method, when a transport resource (for example, a PUCCH), through which HARQ ACK or NACK for the DL MBS data indicated by the second scheduling information is transmitted, is configured, or it is configured to transmit HARQ ACK or NACK, the UE may indicate NACK indicating an unsuccessful reception of the MBS and may request a retransmission, and may subsequently receive, through the retransmission, the DL MBS data that is not received.

A second method: when the time resource or the frequency resource indicated by the first scheduling information and the second scheduling information is the same as each other, overlaps each other, or collides with each other, the UE may receive the MBS data via the time resource or the frequency resource according to the second scheduling information. Also, the UE may not receive the general data indicated by the first scheduling information, may ignore the general data indicated by the first scheduling information, or may not consider the first scheduling information. However, the UE may indicate NACK indicating an unsuccessful reception through a transport resource (for example, a PUCCH) through which HARQ ACK or NACK with respect to the DL general data indicated by the first scheduling information, to request a retransmission, and may subsequently receive, through the retransmission, the DL general data that is not received.

A third method: when, according to a UE capability, the UE is capable of simultaneously receiving different data via a transport resource having the same time resource or the same frequency resource, the UE may receive both the general data and the MBS data indicated by the first scheduling information and the second scheduling information, respectively. For example, when, according to the UE capability, the UE includes a plurality of antennas or the UE satisfies a relatively more complicated requirement, the third method may be applied.

A fourth method: whether the UE is to perform the first, second, or third method may be configured or indicated by a base station by using an RRC message or system information.

A fifth method: the base station may transmit, via the transport resource having the same time resource or the same frequency resource, the general data and the MBS data that are different from each other, by multiplexing the different data into one type of data (for example, MAC PDU). That is, via the transport resource having the same time resource or the same frequency resource, the UE may receive one type of data (for example, MAC PDU), and the one type of data may include the general data and the MBS data that are multiplexed. In the one type of data, each piece of the general data may be identified based on a logical channel ID (for example, an ID included in an MAC header) corresponding to each piece of the general data, and each piece of the MBS data may be identified based on a logical channel ID (for example, an ID included in an MAC header) corresponding to each piece of the MBS data. When the UE receives the one type of data and performs data processing thereon, the UE may receive (or demultiplex) the data corresponding to a logical channel ID configured in the UE and may transmit the data to an upper entity (for example, an RLC entity or an upper entity) corresponding to the logical channel ID, and may discard the data corresponding to a logical channel ID that is not configured in the UE.

FIG. 1O is a diagram of signaling procedures for efficiently supporting an MBS according to an embodiment of the disclosure.

For example, a signaling procedure 1*o*-05 in which a UE receiving MBS data transmits feedback to a base station, a signaling procedure 1*o*-10 in which a UE receiving MBS data receives an MBS-related control message from a base station, or signaling procedures 1*o*-20 and 1*o*-25 in which a base station transmits an MBS-related control message to a UE and the UE transmits a response thereto, for supporting an MBS, are provided.

Referring to FIG. 1O, in the signaling procedure 1*o*-05 of FIG. 1O, the UE receiving the MBS data may transmit, to a network or a base station, feedback or indication information of the UE with respect to the MBS. For example, when a predetermined event occurs, when there is a service in which the UE is interested (or which the UE is to receive), when a service in which the UE is interested (or which the UE is to receive) is changed, when the UE is to stop receiving a service in which the UE is interested (or which the UE is to receive), when the UE is to suspend the MBS, or when the UE is to change a method of receiving the MBS or change an RRC mode or a bearer, the UE may transmit the feedback or the indication information of the UE with respect to the MBS to the network or the base station (1*o*-05). According to another method, when there is a request from the network (1*o*-03), the feedback or the indication information may be transmitted by the UE. The information transmitted by the UE with respect to the MBS to the base station may include some of the following information.

Information about an MBS in which the UE is interested or which the UE wants to receive (for example, a first ID, a second ID, a logical channel ID, an RNTI, or a bearer ID with respect to the MBS).

An RRC connection state (for example, an RRC idle mode, an RRC connected mode, or an RRC inactive mode) preferred by the UE when the UE receives or is configured with the MBS.

A bearer structure or configuration information preferred by the UE when the UE receives or is configured with the MBS (for example, a unicast bearer, a multicast bearer, a preferred structure from among the bearer structures described in FIG. 1G, a preference about a function that the UE wants to be configured with, or the like).

A type of service preferred by the UE when the UE receives or is configured with the MBS (for example, a unicast service (a dedicated service) or a multicast service (a multicast, broadcast, or common service).

An indicator indicating an intention of the UE receiving the MBS for not further receiving the MBS, an indicator indicating an intention to stop receiving the MBS, an indicator indicating an intention to further receive the MBS, an indicator requesting a change of the MBS to another MBS (or a first ID, a second ID, a logical channel ID, a bearer ID, or an RNTI with respect to the other MBS), or an indicator indicating an interest that the UE has in the MBS.

An indicator indicating good or bad with respect to a reception quality of the MBS from the perspective of the UE.

An indicator indicating a successful reception or unsuccessful reception of the MBS, for example, HARQ ACK or NACK feedback.

When the UE transmits the above information with respect to the MBS, to the base station, the UE may transmit the information only in the RRC connected mode. For example, when the above information is requested from the base station, or when the UE has a need to transmit the above information, the UE in the RRC connected mode may configure and transmit the above information by using an RRC message, MAC control information, RLC control information, or PDCP control information through an SRB, a DRB, or an MBS bearer (a unicast bearer or a multicast bearer) configured to the UE in the RRC connected mode. According to another method, when the above information is requested from the base station or the UE has a need to transmit the above information, the UE in an RRC idle mode or an RRC inactive mode may configure a connection with a network (trigger an RRC connection procedure or an RRC connection resumption procedure), may convert the RRC idle mode or the RRC inactive mode to an RRC connected mode, and may configure and transmit the above information by using an RRC message, MAC control information, RLC control information, or PDCP control information through an SRB, a DRB, or an MBS bearer (a unicast bearer or a multicast bearer) configured to the UE in the RRC connected mode. According to another method, when the UE transmits the above information with respect to the MBS, to the base station, the UE may, in the RRC connected mode, the RRC inactive mode, or the RRC idle mode, transmit the feedback or the indication information of the UE through a transport resource indicated in system information, a transport resource configured by using an RRC message, or a transport resource indicated by a PDCCH including an RNTI indicating the MBS. When the UE transmits the feedback as described above, the base station may relatively more efficiently manage the resources for the MBS.

Referring to 1o-10 of FIG. 1O, the base station may transmit, to UEs receiving an MBS, control information with respect to the MBS. The control information with respect to the MBS may be transmitted through a channel, a transport resource, an RRC message, MAC control information, RLC control information, or PDCP control information for the MBS (1o-10).

The control information with respect to the MBS may include some of the following information.

An indicator indicating a request to suspend an MBS reception.

An indicator indicating that the base station is to suspend the MBS or an indicator indicating to stop receiving the MBS.

An ID of the MBS, which is to be suspended, or a reception of which is to be stopped. For example, a first ID, a second ID, a logical channel ID, an RNTI, or a bearer ID, corresponding to the MBS, may be included to indicate, to the UE in more detail, which MBS is to be suspended, or which MBS the UE is to stop receiving. According to another method, the control information may be transmitted and indicated through a PDCCH scrambled by an RNTI corresponding to the MBS. According to another method, the first ID, the second ID, the logical channel ID, the RNTI, or the bearer ID may be included in a list and transmitted for supporting a plurality of MBSs.

To indicate in further detail which MBS is to be suspended or which MBS the UE is to stop receiving, a first ID value or a second ID value indicating an MBS configured in the MBS list configured via the system information or the RRC message, may be mapped with a natural number value in an ascending order, and a natural number value may be input or mapped to a bitmap so that the bitmap may indicate the MBS.

A time point at which halting of receiving the MBS is started or a time point at which the MBS is suspended may be indicated by a time unit (a sub-frame, a time slot, or a symbol). For example, which numberth a time unit is in a cycle of transmitting the MBS may be indicated. According to another method, which numberth behind a time unit is from a time point at which the control information is received, may be indicated.

When the base station transmits, to the UE, the control information with respect to the MBS, the base station may transmit the control information to the UE in an RRC inactive mode, an RRC idle mode, or an RRC connected mode. For example, the base station may configure and transmit, to the UE in the RRC inactive mode, the RRC idle mode, or the RRC connected mode, the information by using an RRC message, MAC control information, RLC control information, or PDCP control information, through an SRB, a DRB, or an MBS bearer (a unicast bearer or a multicast bearer). According to another method, the base station may transmit, to the UE in the RRC connected mode, the RRC inactive mode, or the RRC idle mode, the control information through a transport resource indicated in the system information, a transport resource configured in the RRC message, or a transport resource indicated by a PDCCH including an RNTI indicating the MBS.

When the UE receives the control information from the base station (1o-10), the UE may transmit corresponding feedback to the base station as the feedback information or the indication information described in FIG. 1O (1o-15).

When the UE receives the control information from the base station (1o-10), and when the UE still has an MBS in which the UE is interested or when the UE still wants to receive the MBS, the UE may re-receive the MBS-related control information (for example, the system information, the RRC message, or the MBS control message) as described in FIG. 1K, 1L, 1M, or 1N, or may perform (or trigger) an RRC connection procedure or an RRC connection resumption procedure to receive or request, from the base station, configuration information for re-receiving the MBS, may re-receive the MBS configuration information, may re-configure the MBS configuration information, and may continually receive the MBS.

According to another method, when the UE receives the control information from the base station (1o-10), when the UE is not in an RRC connected mode and is in an RRC idle mode or an RRC inactive mode, or when the UE still has an MBS in which the UE is interested or when the UE still wants to receive the MBS, the UE may re-receive the MBS-related control information (for example, the system information, the RRC message, or the MBS control message) as described in FIG. 1K, 1L, 1M, or 1N, or may perform (or trigger) an RRC connection procedure or an RRC connection resumption procedure to receive or request, from the base station, configuration information for re-receiving the MBS, may re-receive the MBS configuration information, may re-configure the MBS configuration information, and may continually receive the MBS.

As described above, by transmitting the control information to the UE, the base station may relatively more efficiently manage the resources for the MBS.

Referring to 1o-20 and 1o-25 of FIG. 1O, in order to identify how many UEs receive the MBS, the base station may configure a message requesting a response for identifying whether or not the UEs receiving the MBS data receive the MBS or for counting up the number of UEs receiving the MBS and may transmit the message (1o-20). The UE receiving the message requesting the response for identifying whether or not the MBS is received or for counting up the number of UEs receiving the MBS may configure a response message and transmit the response message to the base station (1o-25).

The message requesting the response for identifying whether or not the MBS is received or for counting up the number of UEs receiving the MBS, configured by the base station, may be transmitted to the UE in an RRC idle mode, an RRC inactive mode, or an RRC connected mode, or the UE in the RRC idle mode, the RRC inactive mode, or the RRC connected mode may receive the request message. Also, the UE receiving the request message may configure the response message with respect to the request message and may transmit the response message by using an RRC message, MAC control information, RLC control information, or PDCP control information, through an SRB, a DRB, or an MBS bearer (a unicast bearer or a multicast bearer), configured to the UE, when the UE is in an RRC idle mode, an RRC inactive mode, or an RRC connected mode. Alternatively, the UE may transmit the response message through a transport resource indicated in system information, a transport resource configured in an RRC message, or a transport resource indicated by a PDCCH including an RNTI indicating the MBS.

According to another method, the message requesting the response for identifying whether or not the MBS is received or for counting up the number of UEs receiving the MBS, configured by the base station, may be transmitted to the UE in an RRC idle mode, an RRC inactive mode, or an RRC connected mode, or the UE in the RRC idle mode, the RRC inactive mode, or the RRC connected mode may receive the request message. Also, UEs in an RRC connected mode, from among the UEs receiving the request message, may configure the response message with respect to the request message, and may transmit the response message by using an RRC message, MAC control information, RLC control information, or PDCP control information, through an SRB, DRB, or MBS bearer (a unicast bearer or a multicast bearer). Alternatively, the UE may transmit the response message through a transport resource indicated in the system information, a transport resource configured in the RRC message, or a transport resource indicated by a PDCCH including an RNTI indicating the MBS. According to another method, UEs in an RRC idle mode or an RRC inactive mode, from among the UEs receiving the request message, may perform an RRC connection procedure or an RRC connection resumption procedure to convert the RRC idle mode or the RRC inactive mode to the RRC connected mode and may transmit the response message by using an RRC message, MAC control information, RLC control information, or PDCP control information, through an SRB, a DRB, or MBS bearer (a unicast bearer or a multicast bearer) configured to the UE. Alternatively, the UE may transmit the response message through a transport resource indicated in the system information, a transport resource configured in the RRC message, or a transport resource indicated by a PDCCH including an RNTI indicating the MBS.

Figure 1P:
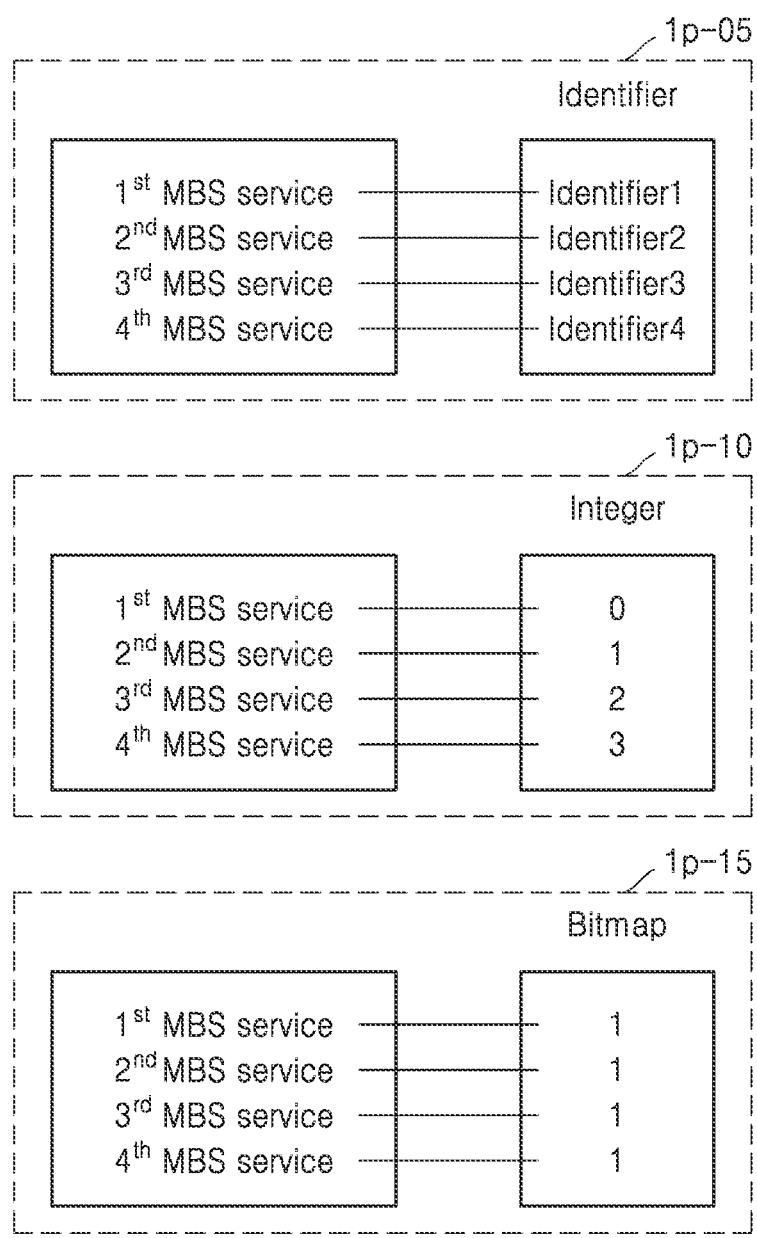
FIG. 1P is a diagram of a method of indicating each of a plurality of MBSs, according to an embodiment of the disclosure.

FIG. 1P is a diagram of a method of indicating each MBS from among a plurality of MBSs according to an embodiment of the disclosure.

Referring to FIG. 1P, as in 1p-05, each MBS may have a mapping relationship with a first ID, a second ID, a logical channel ID, an RNTI, or a bearer ID for the MBS, or each of the IDs may be assigned to each MBS.

Based on the scheme of 1p-05, each MBS may be identified, and a specific MBS may be identified and indicated by the ID. However, the IDs are long, and thus, it may not be an efficient method in terms of an overhead issue, to indicate each MBS via the first ID, the second ID, the logical channel ID, the RNTI, or the bearer ID.

In the disclosure, in the system information, the RRC message, or the MBS control message, a list with respect to supported MBSs or a list with respect to configured MBSs may be broadcast, appointed, or configured, and an integer value may be assigned or mapped to each MBS configured in the list with respect to the MBSs, as shown in 1p-10. According to another method, an integer value may be mapped or assigned, in an ascending (or descending) order of each ID value with respect to a respective MBS included in the list with respect to the MBSs. Also, when a specific MBS is indicated, the MBS may be indicated by the integer value, and thus, an overhead may be reduced. For example, when a plurality of MBSs are indicated, respective integer values with respect to the plurality of MBSs may be included in the list to indicate the plurality of MBSs.

According to another method, the list with respect to the supported MBSs or the list with respect to the configured MBSs may be broadcast, appointed, or configured in the system information, the RRC message, or the MBS control message, and each bit of a bitmap may be assigned or mapped to each MBS configured in the list with respect to the MBSs, as shown in 1p-15. According to another method, each bit of the bitmap may be mapped or assigned, in an ascending (or descending) order of each ID value with respect to a respective MBS included in the list with respect to the MBSs. Also, when a specific MBS is indicated, the MBS may be indicated by each bit of the bitmap (for example, each MBS may be indicated by the value of 1 or 0), and thus, an overhead may be reduced. For example, when a plurality of MBSs are indicated, respective bit values with respect to the plurality of MBSs may be configured in the bitmap to indicate the plurality of MBSs.

The methods of indicating each of the MBSs in FIG. 1P may be applied to various signaling procedures according to the disclosure based on application or extension.

For example, when, in 1*o*-20 and 1*o*-25 of FIG. 1O, the base station configures and transmits a message requesting a response for identifying whether the UEs receiving the MBS data receive the MBS or for counting up the number of UEs receiving the MBS, so as to identify how many UEs receive the MBS, and the UEs receiving the message requesting the response configures a response message and transmits the response message to the base station, the following methods may be applied.

In detail, the message requesting the response for identifying whether or not the UEs receive the MBS or for counting up the number of UEs receiving the MBS, and the response message in response thereto may be configured or generated by one of the following methods.

A first method: as shown in 1*p*-05 of FIG. 1P, each MBS may have a mapping relationship with a first ID, a second ID, a logical channel ID, an RNTI, or a bearer ID for the MBS, or each ID may be assigned to each MBS. When the base station wants to know how many UEs receive the MBS, the base station may configure the IDs corresponding to the MBSs as a list as shown in 1*p*-05 and may transmit a request message to the UEs by including the list in the request message. The request message may be transmitted to the UEs receiving the MBS, or the UEs receiving the MBS may receive the request message, and the UEs receiving respective MBSs included in the request message may respond to the request by configuring a response message by including an indication with respect to whether or not the UEs are interested in the MBSs or receive the MBSs. According to another method, when the base station configures the request message, an integer value may be assigned or mapped to each MBS in the list with respect to the MBSs configured by using system information, an RRC message, or an MBS control message, by applying the method of 1*p*-10. For example, the integer value may be mapped or assigned, in an ascending (or descending) order of each ID value with respect to a respective MBS included in the list with respect to the MBSs. Also, the mapped or assigned integer value(s) may be included in the request message or the list, so that how many UEs receive the MBS may be indicated. According to another method, when configuring the request message, the base station may assign or map each bit of a bitmap to each MBS in the list with respect to the MBSs configured by using the system information, the RRC message, or the MBS control message, by applying the method 1*p*-15. For example, each bit of the bitmap may be mapped or assigned, in an ascending (or descending) order of each ID value with respect to a respective MBS included in the list with respect to the MBSs. Also, when how many UEs receive the MBS is to be identified via the request message, the MBS may be indicated by each bit of the bitmap (for example, each MBS may be indicated by the value of 1 or 0), to reduce an overhead. Also, when a plurality of MBSs are indicated, respective bit values with respect to the plurality of MBSs may be configured in the bitmap to indicate the plurality of MBSs. The UEs receiving respective MBSs included in the request message may respond to the request by configuring a response message by including an indication with respect to whether or not the UEs are interested in the MBSs or receive the MBSs. Because each MBS may have the mapping relationship with the first ID, the second ID, the logical channel ID, the RNTI, or the bearer ID for the MBS, in the list with respect to the MBSs included in the request message or in the list with respect to the MBSs configured by using the system information, the RRC message, or the MBS control message, when the UE configures the response message, the UE may configure the IDs corresponding to the MBSs in which the UE is interested or which the UE is to receive, as a list, by applying the method of 1*p*-05, and may transmit the response message to the base station by including the list in the response message. When the UE configures the response message, the UE may assign or map an integer value to each MBS in the list with respect to the MBSs included in the request message or the list with respect to the MBSs configured by using the system information, the RRC message, or the MBS control message, by applying the method of 1*p*-10. For example, the integer value may be mapped or assigned, in an ascending (or descending) order of each ID value with respect to a respective MBS included in the list with respect to the MBSs. Also, when the UE indicates, through the response message, (an) MBS(s) in which the UE is interested or which the UE is to receive, the UE may include the mapped or assigned integer value(s) in the response message or in the list, so that the UE may indicate to the base station the MBSs in which the UE is interested or which the UE is to receive. Thus, an overhead may be reduced. Also, when a plurality of MBSs are indicated, respective integer values with respect to the plurality of MBSs may be included in the response message or in the list to indicate the plurality of MBSs. According to another method, when the UE configures the response message by applying the method of 1*p*-15, the UE may assign or map each bit of a bitmap to each MBS in the list with respect to the MBSs included in the request message or the list with respect to the MBSs configured by using the system information, the RRC message, or the MBS control message. For example, each bit of the bitmap may be mapped or assigned, in an ascending (or descending) order of each ID value with respect to a respective MBS included in the list with respect to the MBSs. Also, when an MBS, in which the UE is interested or which the UE is to receive, is indicated in the response message, the MBS may be indicated by each bit of the bitmap (for example, each MBS may be indicated by the value of 1 or 0), and thus, an overhead may be reduced. For example, when a plurality of MBSs are indicated, respective bit values with respect to the plurality of MBSs may be configured in the bitmap to indicate the plurality of MBSs.

A second method: the base station may configure a request message requesting a UE to transmit a response message by configuring the response message with respect to an MBS in which the UE is interested or which the UE is to receive, and may transmit the request message to the UE. The request message may be transmitted to UEs receiving an MBS, or the UEs receiving the MBS may receive the request message, and the request message may include an indicator indicating a request to configure the response message with respect to whether or not the UEs are interested in the MBS or the UEs receive the MBS. The UEs receiving respective MBSs included in the request message may respond to the request by configuring a response message by including an indication with respect to whether or not the UEs are interested in the MBSs or receive the MBSs. When the UE configures the response message, because each MBS may have the mapping relationship with the first ID, the second ID, the logical channel ID, the RNTI, or the bearer ID for the MBS in the list with respect to the MBSs configured by using the system information, the RRC message, or the MBS control message, the UE may configure the IDs corresponding to the MBSs in which the UE is interested or which the UE is to receive, as a list, by applying the method of 1p-05, and may transmit the response message to the base station by including the list in the response message. According to another method, when the UE configures the response message, the UE may assign or map an integer value to each MBS in the list with respect to the MBSs configured by using the system information, the RRC message, or the MBS control message, by applying the method of 1p-10. For example, the integer value may be mapped or assigned, in an ascending (or descending) order of each ID value with respect to a respective MBS included in the list with respect to the MBSs. Also, when the UE indicates, through the response message, (an) MBS(s) in which the UE is interested or which the UE is to receive, the UE may include the mapped or assigned integer value(s) in the response message or in the list, so that the UE may indicate to the base station the MBSs in which the UE is interested or which the UE is to receive. Thus, an overhead may be reduced. Also, when a plurality of MBSs are indicated, respective integer values with respect to the plurality of MBSs may be included in the response message or in the list to indicate the plurality of MBSs. According to another method, when the UE configures the response message, the UE may assign or map each bit of a bitmap to each MBS in the list with respect to the MBSs configured by using the system information, the RRC message, or the MBS control message, by applying the method of 1p-15. For example, each bit of the bitmap may be mapped or assigned, in an ascending (or descending) order of each ID value with respect to a respective MBS included in the list with respect to the MBSs. Also, when the UE indicates an MBS, in which the UE is interested or which the UE is to receive, in the response message, the UE may indicate the MBS by using each bit of the bitmap (for example, indicate each MBS by using the value of 1 or 0), and thus, an overhead may be reduced. For example, when a plurality of MBSs are indicated, respective bit values with respect to the plurality of MBSs may be configured in the bitmap to indicate the plurality of MBSs.

The methods 1p-05, 1p-10, and 1p-15 of indicating the MBSs in FIG. 1P may be applied, via extension, when an interesting MBS is indicated or configuration information of the MBS is configured, according to the disclosure. For example, the methods of indicating each of the MBSs in FIG. 1P may be applied to the methods provided in FIG. 1J, 1K, 1L, 1M, or 1O based on extension.

The system information or the configuration information configured in an RRC message, according to the disclosure, may include first discontinuous reception (DRX) configuration information (for example, a cycle, a duration length (on-duration), an offset, or the like) for a general data service. Thus, based on the first DRX configuration information for the general data service, the UE may monitor a PDCCH at a specific duration or may not monitor the PDCCH at a specific duration to spare power of the UE.

The system information or the configuration information for an MBS, the configuration information for an MBS being configured by using an RRC message or MBS control data, according to the disclosure, may include second discontinuous reception (DRX) configuration information (for example, a cycle, a duration length (on-duration), an offset, or the like) for an MBS. Thus, based on the second DRX configuration information for the MBS, the UE may monitor a PDCCH at a specific duration or may not monitor the PDCCH at a specific duration to spare power of the UE.

The base station may configure, for the UE, the first DRX configuration information for the general data service or the second DRX configuration information for the MBS, and when the UE is configured with the first DRX configuration information or the second DRX configuration information, the UE may separately operate first DRX and second DRX and may transmit or receive data according to the separately operated first DRX or second DRX. For example, when the UE receives or transmits general data, the UE may operate the first DRX based on the first DRX configuration information and may read or may not read a PDCCH to save power. Also, when the UE receives or transmits MBS data, the UE may operate the second DRX based on the second DRX configuration information and may read or may not read a PDCCH to save power.

Figure 1Q:
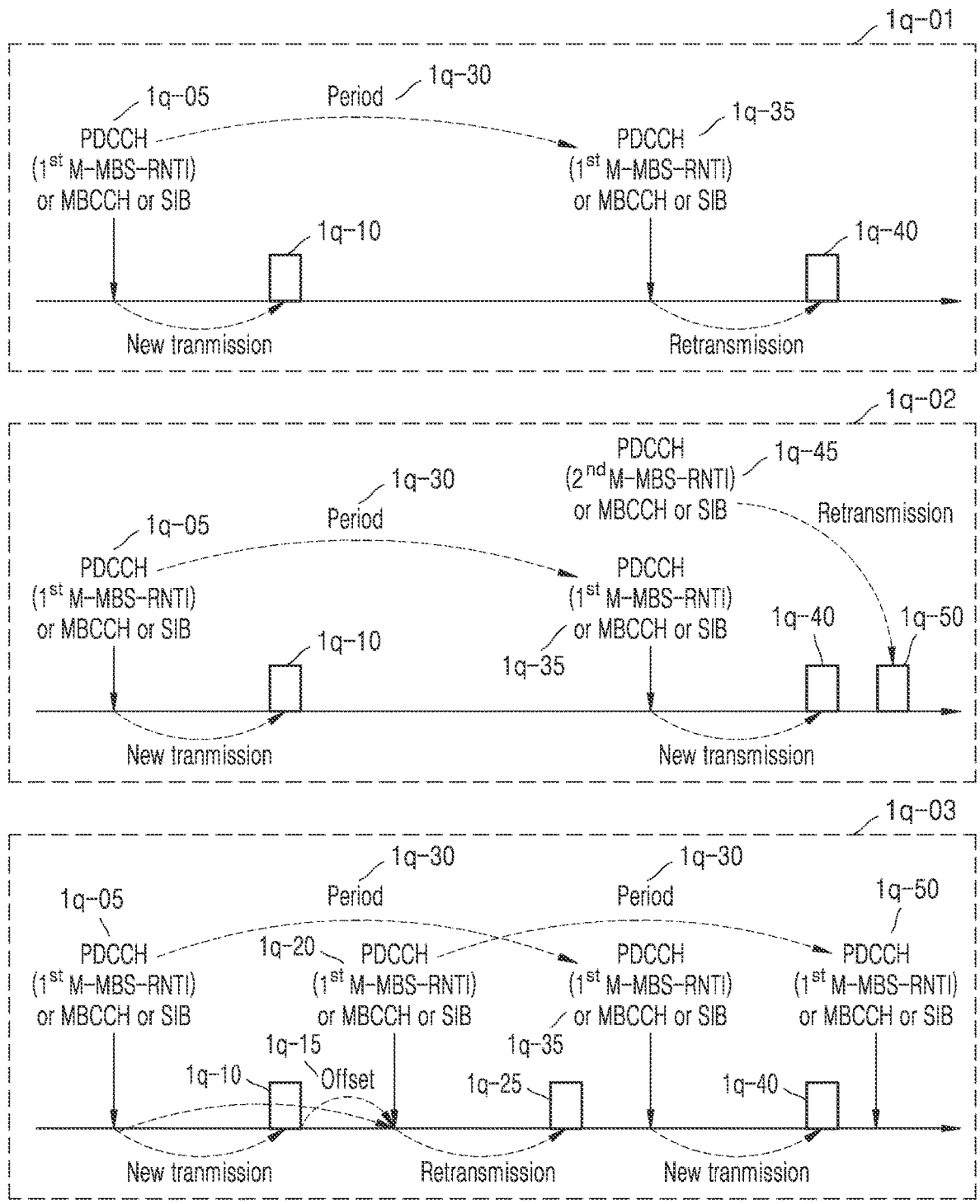
FIG. 1Q is a diagram of a method of retransmitting MBS data, according to an embodiment of the disclosure.

FIG. 1Q is a diagram of a method of retransmitting MBS data, according to an embodiment of the disclosure.

Referring to FIG. 1Q, as described above (for example, in FIG. 1G, 1K, 1L, or 1M), when HARQ reordering, RLC reordering, HARQ ACK or NACK transmission, HARQ processing, or HARQ retransmission is configured with respect to an MBS or a bearer supporting the MBS by using system information, an RRC message, or an MBS control message, and when a UE has not successfully received the MBS data, through a transport resource indicated by a PDCCH (for example, a PDCCH scrambled by an RNTI for an MBS) or a transport resource periodically configured for the MBS (i.e., a transport resource for the MBS configured in the system information or the RRC message, the transport resource including a time resource, a frequency resource, a cycle, an offset, or additional DRX configuration information for the MBS (a cycle, an activation duration (on-duration), a duration (a length) 1q-05 and 1q-10 at which the PDCCH is to be read, or an offset)), the UE may indicate NACK through the transport resource (for example, a PUCCH) indicated by the PDCCH or the transport resource configured by using the system information, the RRC message, or the MBS control message. According to another method, when a UE has successfully received the MBS data through the transport resource indicated by the PDCCH (for example, the PDCCH scrambled by the RNTI for the MBS) or the transport resource periodically configured for the MBS, the UE may indicate ACK.

According to another method, when a UE has not successfully received the MBS data through the transport resource indicated by the PDCCH (for example, the PDCCH scrambled by the RNTI for the MBS) or the periodically configured transport resource, the UE may include an indicator or a UE ID indicating the UE in MAC control information, RLC control information, or PDCP control information and may indicate to a base station which one from among UEs has not successfully received the MBS data. According to another method, each UE may indicate NACK through a transport resource predetermined for each UE, so that which one of the UEs has not successfully received the MBS data may be indicated to the base station.

The base station may configure a transport resource through which the UE may indicate a successful reception of the MBS data (ACK) or an unsuccessful reception of the MBS data (NACK), as a common transport resource for UEs receiving the MBS. Also, when at least one UE indicates NACK or a predetermined UE indicates NACK through the common transport resource, the base station may retransmit the MBS data. According to another method, when a UE has not successfully received the MBS data, and when the UE, which has not successfully received the MBS data, is indicated to the base station, the base station may retransmit the MBS data only to the corresponding UE.

The base station may apply one or a combination of the following methods in order to perform a retransmission of the MBS data.

1. A first retransmission method (1*q*-01): the base station may transmit MBS data through a transport resource configured by using system information, an RRC message, or MBS control data (a time resource, a frequency resource, a sub-carrier spacing, DRX configuration information, or the like) or through a configured cycle, or may indicate a transport resource for the MBS through a PDCCH scrambled by an RNTI indicating the MBS data and transmit the MBS data through the transport resource (1*q*-05, 1*q*-10, 1*q*-30, and 1*q*-35). The UE may receive the MBS data through a transport resource configured by using system information, an RRC message, or MBS control data (a time resource, a frequency resource, a sub-carrier spacing, DRX configuration information, or the like) or through a configured cycle, or may be configured with a transport resource for the MBS through a PDCCH scrambled by an RNTI indicating the MBS data and may receive the MBS data through the transport resource (1*q*-05, 1*q*-10, 1*q*-30, and 1*q*-35). When the UE has not successfully received the MBS data, the UE may indicate NACK through the transport resource (for example, a PUCCH) indicated by the PDCCH or the transport resource configured by using the system information, the RRC message, or the MBS control message. When the base station receives, from a certain UE, an indication that the UE has not successfully received the MBS data, the base station may perform the retransmission. The base station may retransmit the MBS data through a transport resource configured by using system information, an RRC message, or MBS control data (a time resource, a frequency resource, a sub-carrier spacing, DRX configuration information, or the like) or through a configured cycle, or may indicate a transport resource for the MBS through a PDCCH scrambled by an RNTI indicating the MBS data and retransmit the MBS data through the transport resource. When the base station performs retransmission, the base station may include an indicator indicating the retransmission, in the PDCCH, the MBS control data, or the RRC message indicating the transport resources (1*q*-35 and 1*q*-40). For example, the retransmission may be indicated based on whether or not a new data indicator (NDI) is toggled or not (when the NDI is changed, it indicates a new transmission, or when the NDI is not changed, it indicates a retransmission). According to another method, the base station may configure an additional transport resource for retransmission and may indicate the retransmission directly via the transport resource. According to another method, the base station may define an RNTI for retransmitting the MBS data and may indicate the retransmission by scrambling the PDCCH by using the RNTI. When the UE receives the MBS data through the transport resource configured by using the system information, the RRC message, or the MBS control data (the time resource, the frequency resource, the sub-carrier spacing, the DRX configuration information, or the like) or through the configured cycle, or when the UE is indicated with the transport resource for the MBS data via the PDCCH scrambled by the RNTI indicating the MBS data, and when the indicator indicating retransmission is included in the indicated transport resource or the indicated transport resource indicates the retransmission, the UE, when the UE has not successfully received the previous MBS data, may receive the retransmitted MBS data, or, when the UE has successfully received the previous MBS data, may ignore the retransmitted MBS data, may not receive the retransmitted MBS data, or may discard the retransmitted MBS data even after receiving the data (for example, may discard the retransmitted MBS data via a duplicate detection procedure in an MAC entity, an RLC entity, or a PDCP entity).

2. A second retransmission method (1*q*-02): the base station may transmit MBS data through a transport resource configured by using system information, an RRC message, or MBS control data (a time resource, a frequency resource, a sub-carrier spacing, DRX configuration information, or the like) or through a configured cycle, or may indicate a transport resource for the MBS through a PDCCH scrambled by an RNTI indicating the MBS data and transmit the MBS data through the transport resource (1*q*-05, 1*q*-10, 1*q*-30, and 1*q*-35). The UE may receive the MBS data through a transport resource configured by using system information, an RRC message, or MBS control data (a time resource, a frequency resource, a sub-carrier spacing, DRX configuration information, or the like) or through a configured cycle, or may be configured with a transport resource for the MBS through a PDCCH scrambled by an RNTI indicating the MBS data and may receive the MBS data through the transport resource (1*q*-05, 1*q*-10, 1*q*-30, and 1*q*-35). When the UE has not successfully received the MBS data, the UE may indicate NACK through the transport resource (for example, a PUCCH) indicated by the PDCCH or the transport resource configured by using the system information, the RRC message, or the MBS control message. When the base station receives, from a certain UE, an indication that the UE has not successfully received the MBS data, the base station may perform the retransmission. The base station may retransmit the MBS data through a transport resource configured by using system information, an RRC message, or MBS control data (a time resource, a frequency resource, a sub-carrier spacing, DRX configuration information, or the like) or through a configured cycle, or may indicate a transport resource for the MBS through a PDCCH scrambled by an RNTI indicating the MBS data and retransmit the MBS data through the transport resource. According to another method, the base station may transmit MBS data through a transport resource configured by using system information, an RRC message, or MBS control data (a time resource, a frequency resource, a sub-carrier spacing, DRX configuration information, or the like) or through a configured cycle, or when the base station may indicate a transport resource for the MBS through a PDCCH scrambled by an RNTI indicating the MBS data, the base station may simultaneously indicate new MBS data and retransmitted MBS data through a plurality of PDCCHs (for example, a PDCCH scrambled by an RNTI for a new transmission or including an indicator indicating a new transmission and a PDCCH scrambled by an RNTI for a retransmission or including an indicator indicating a retransmission), a plurality of RNTIs (for example, an indicator indicating scrambling via an RNTI for a new transmission or indicating a new transmission, and an indicator indicating scrambling via an RNTI for a retransmission or indicating a retransmission), or a plurality of pieces of MBS control data (indicating a new transmission or a retransmission), and may indicate a transport resource through which new data is transmitted or a transport resource through which retransmitted data is retransmitted as different from each other (1*q*-35, 1*q*-45, 1*q*-40, and 1*q*-50). When the base station performs retransmission, the base station may include an indicator indicating the retransmission, in the PDCCH, the MBS control data, or the RRC message indicating the transport resources (1*q*-35 and 1*q*-40). For example, the retransmission may be indicated based on whether or not a new data indicator (NDI) is toggled or not (when the NDI is changed, it indicates a new transmission, or when the NDI is not changed, it indicates a retransmission). According to another method, the base station may configure an additional transport resource for retransmission and may indicate the retransmission directly via the transport resource. According to another method, the base station may define an RNTI for retransmitting the MBS data and may indicate the retransmission by scrambling the PDCCH by using the RNTI. When the UE receives a plurality of pieces of MBS data through the transport resource configured by using the system information, the RRC message, or the MBS control data (the time resource, the frequency resource, the sub-carrier spacing, the DRX configuration information, or the like) or through the configured cycle, or when the UE is indicated with the transport resource for the MBS data via the PDCCH scrambled by the RNTI indicating the plurality of pieces of MBS data, and when an indicator indicating retransmission is included in the indicated transport resource, an indicator indicating a new transmission is included in the indicated transport resource, the indicated transport resource indicates a retransmission, or the indicated transport resource indicates a new transmission, the UE, when the UE has not successfully received the previous MBS data, may receive the retransmitted MBS data, or may also receive the new data, when the new transmission is indicated. Alternatively, when the UE has successfully received the previous MBS data, the UE may ignore the retransmitted data, may not receive the retransmitted data, or may discard the retransmitted data even after receiving the data (for example, may discard the retransmitted data via a duplicate detection procedure in an MAC entity, an RLC entity, or a PDCP entity), or may receive the new data, when the new transmission is indicated ($1q$-40 and $1q$-50).

3. A third retransmission method ($1q$-03): the base station may transmit MBS data through a transport resource configured by using system information, an RRC message, or MBS control data (a time resource, a frequency resource, a sub-carrier spacing, DRX configuration information, or the like) or through a configured cycle, or may indicate a transport resource for the MBS through a PDCCH scrambled by an RNTI indicating the MBS data and transmit the MBS data through the transport resource ($1q$-05, $1q$-10, $1q$-30, and $1q$-35). The UE may receive the MBS data through a transport resource configured by using system information, an RRC message, or MBS control data (a time resource, a frequency resource, a sub-carrier spacing, DRX configuration information, or the like) or through a configured cycle, or may be configured with a transport resource for the MBS through a PDCCH scrambled by an RNTI indicating the MBS data and may receive the MBS data through the transport resource ($1q$-05, $1q$-10, $1q$-30, and $1q$-35). When the UE has not successfully received the MBS data, the UE may indicate NACK through the transport resource (for example, a PUCCH) indicated by the PDCCH or the transport resource configured by using the system information, the RRC message, or the MBS control message. When the base station receives, from a certain UE, an indication that the UE has not successfully received the MBS data, the base station may perform the retransmission. According to a new-data transmission procedure, MBS data may be transmitted through a transport resource configured by using system information, an RRC message, or MBS control data (a time resource, a frequency resource, a sub-carrier spacing, DRX configuration information, or the like) or through a configured cycle, or a transport resource for the MBS may be indicated through a PDCCH scrambled by an RNTI indicating the MBS data, and the data may be transmitted through the transport resource ($1q$-05, $1q$-10, $1q$-35, and $1q$-40). According to a retransmission procedure for retransmitting data, an additional transport resource for a retransmission may be configured by using system information, an RRC message, or MBS control data, and MBS data may be transmitted through the additionally configured transport resource (a time resource, a frequency resource, a sub-carrier spacing, DRX configuration information, an offset, a cycle, a transport resource configured to indicate a new-data transport resource, an offset with a cycle, or a cycle ($1q$-15 and $1q$-45)) or through a configured cycle, or when a transport resource for the MBS data is indicated by using a PDCCH scrambled by an RNTI indicating the MBS, retransmitted MBS data may be indicated by using a PDCCH for a retransmission (for example, a PDCCH scrambled by an RNTI for a retransmission, including an indicator indicating a retransmission, or scrambled by an RNTI for an MBS), RNTIs (for example, an indicator indicating scrambling by an RNTI for a retransmission or indicating a retransmission), or pieces of MBS control data (indicating a retransmission), and a transport resource through which the retransmitted data is retransmitted may be indicated ($1q$-20, $1q$-25, and $1q$-50). When the base station performs retransmission, the base station may include an indicator indicating the retransmission, in the PDCCH, the MBS control data, or the RRC message indicating the transport resources ($1q$-35 and $1q$-40). For example, the retransmission may be indicated based on whether or not a new data indicator (NDI) is toggled or not (when the NDI is changed, it indicates a new transmission, or when the NDI is not changed, it indicates a retransmission). According to another method, the base station may configure an additional transport resource for retransmission and may indicate the retransmission directly via the transport resource. According to another method, the base station may define an RNTI for retransmitting the MBS data and may indicate the retransmission by scrambling the PDCCH by using the RNTI. When the UE receives MBS data through the transport resource configured by using the system information, the RRC message, or the MBS control data (the time resource, the frequency resource, the sub-carrier spacing, the DRX configuration information, or the like) or through the configured cycle, or when the UE is indicated with the transport resource for the MBS data via the PDCCH scrambled by the RNTI indicating the MBS data, the UE, when the UE has not successfully received the previous MBS data, may be indicated with a retransmission of the MBS data through an additional transport resource (a time resource, a frequency resource, a sub-carrier spacing, DRX configuration information, an offset, a cycle, a transport resource configured to indicate a new-data transport resource, an offset with a cycle, or a cycle ($1q$-15 and $1q$-45)) configured for a retransmission by using the system information, the RRC message, or the MBS control data or, through a configured cycle, and may receive the MBS data. Alternatively, the UE may be indicated with a transmission of new MBS data through a transport resource configured for a new transmission and may receive new MBS data. Alternatively, when the UE has successfully received the previous MBS data, the UE may ignore, may not receive, or may discard even after receiving (for example, may card via a duplicate detection procedure in an MAC entity, an RLC entity, or a PDCP entity) an indication or data through the additional transport resource configured for the retransmission, or may be indicated with a new transmission of new MBS data through a transport resource configured for a new transmission and may receive the new MBS data (1*q*-20, 1*q*-25, 1*q*-35, and 1*q*-40).

4. A fourth retransmission method: for transmitting new data, or using the first, second, or third retransmission method, a multicast bearer or a multicast MBS support or a unicast bearer or a unicast MBS support may be applied. According to another method, for transmitting new data, or using the first, second, or third retransmission method, a multicast bearer or a multicast MBS support may be applied. According to another method, for transmitting new data, a multicast bearer or a multicast MBS support may be applied, and for applying the first, second, or third retransmission method for retransmission, a unicast bearer or a unicast MBS support may be applied. For example, a procedure for retransmission may be applied and performed only with respect to UEs having not successfully received the MBS data.

Next, according to the disclosure, when a UE receiving an MBS suspends the MBS, is to stop receiving the MBS, is to release a bearer through which the MBS is received, is to configure a base station, or is to release an MBS bearer according to an indication in an RRC message or an MBS control message, one or a combination of the following methods is applied as a receiving operation of the UE.

A first method: when the UE releases an MBS bearer (for example, a unicast bearer or a multicast bearer) or receives an indication to release an MBS bearer, the UE, when the UE still has MBS data stored in the MBS bearer (for example, an MAC entity, an RLC entity, or a PDCP entity) (or when the UE has data that is not yet transmitted to an upper entity), may discard all the stored data. Then, the UE may release the MBS bearer.

A second method: when the UE releases an MBS bearer (for example, a unicast bearer or a multicast bearer) or receives an indication to release an MBS bearer, the UE, when the UE still has MBS data stored in the MBS bearer (for example, an MAC entity, an RLC entity, or a PDCP entity) (or when the UE has data that is not yet transmitted to an upper entity), may perform data processing and may transmit the MBS data to an upper entity (for example, may transmit the MBS data to the upper entity in an order in which the MBS data is received or in an ascending order of serial numbers). Then, the UE may release the MBS bearer.

A third method: when the UE releases an MBS bearer (for example, a unicast bearer or a multicast bearer) or receives an indication to release an MBS bearer, the UE, when a reordering function is configured in the MBS bearer (for example, an MAC entity, an RLC entity, or a PDCP entity) or the reordering function is performed, may suspend or initialize a reordering timer, or, when the UE still has stored MBS data (or data that is not yet transmitted to an upper entity), may perform data processing and transmit the MBS data to an upper entity (for example, may transmit the MBS data to the upper entity in an order in which the MBS data is received or in an ascending order of serial numbers). Then, the UE may release the MBS bearer.

A fourth method: when the UE releases an MBS bearer (for example, a unicast bearer or a multicast bearer) or receives an indication to release an MBS bearer, the UE, when a reordering function is configured in the MBS bearer (for example, an MAC entity, an RLC entity, or a PDCP entity), the reordering function is performed, or a header compression procedure (or a data compression procedure) is configured, may suspend or initialize a reordering timer, or, when the UE still has stored MBS data (or data that is not yet transmitted to an upper entity), may perform a header compression release procedure on the MBS data (for example, when the header compression release procedure has not been performed) and may transmit the MBS data to an upper entity (for example, may transmit the MBS data to the upper entity in an order in which the MBS data is received or in an ascending order of a serial number). Then, the UE may release the MBS bearer.

Figure 1R:
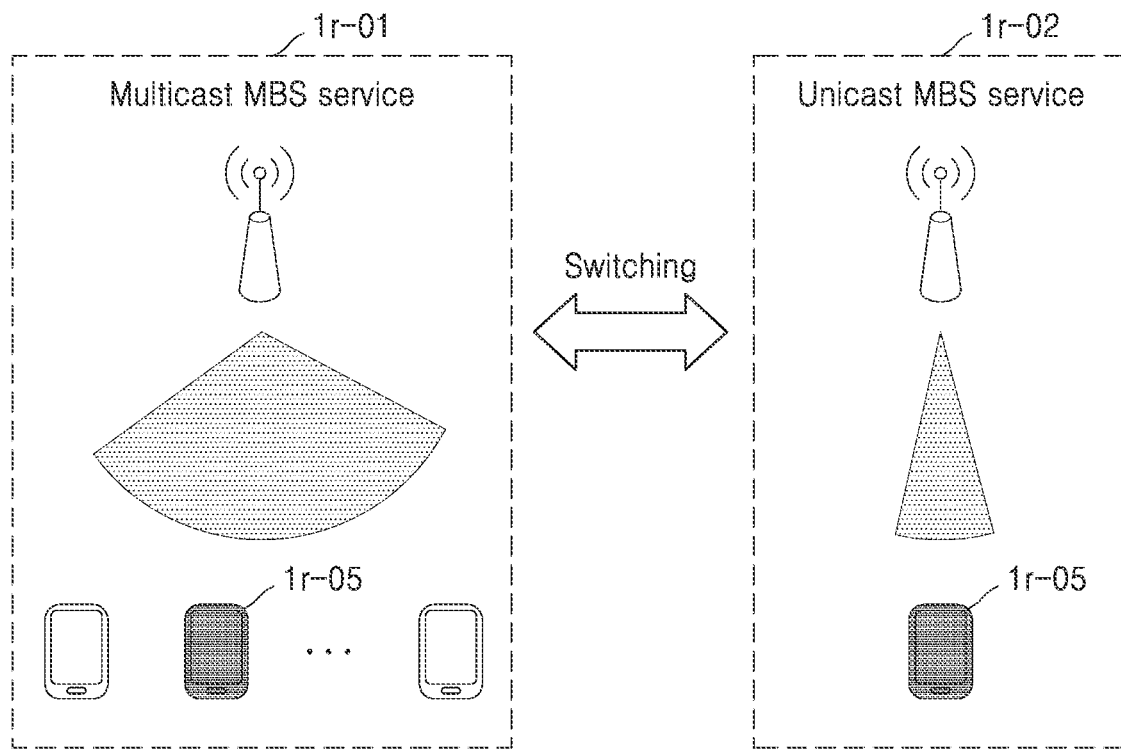
FIG. 1R is a diagram of a first switching method or a second switching method in a method of supporting an MBS proposed in a next-generation mobile communication system or an access stratum (AS), according to an embodiment of the disclosure, wherein the first switching method relates to continually supporting (transmitting or receiving) the MBS via switching a multicast service or a multicast bearer to a unicast service or a unicast bearer, and the second switching method relates to continually supporting (transmitting or receiving) the MBS via switching the unicast service or the unicast bearer to the multicast service or the multicast bearer.

FIG. 1R is a diagram of a first switching method or a second switching method in a method of supporting an MBS proposed in a next-generation mobile communication system or an AS, according to an embodiment of the disclosure, wherein the first switching method relates to continually supporting (transmitting or receiving) the MBS via switching a multicast service or a multicast bearer to a unicast service or a unicast bearer, and the second switching method relates to continually supporting (transmitting or receiving) the MBS via switching the unicast service or the unicast bearer to the multicast service or the multicast bearer.

Referring to FIG. 1R, the first switching method refers to a method in which a multicast service in which MBS data that is broadcast or transmitted by a base station with respect to a certain MBS is simultaneously received by a plurality of UEs as in 1*r*-01 is converted to a unicast service that is an MBS, in which the base station broadcasts or transmits MBS data for the MBS to only one UE as in 1*r*-02. Also, the first switching method may be indicated as an indicator in system information, an RRC message, an MBS control information message, MAC control information, RLC control information, PDCP control information, or a PDCCH.

Referring to FIG. 1R, the second switching method refers to a method in which a unicast service that is an MBS, in which the base station broadcasts or transmits MBS data for the MBS to only one UE as in 1*r*-02, is converted to a multicast service in which MBS data that is broadcast or transmitted by a base station with respect to a certain MBS is simultaneously received by a plurality of UEs as in 1*r*-01. Also, the second switching method may be indicated as an indicator in system information, an RRC message, an MBS control information message, MAC control information, RLC control information, PDCP control information, or a PDCCH.

As in 1*r*-01, when the MBS data broadcast or transmitted by the base station with respect to a certain MBS is simultaneously received by a plurality of UEs, a bearer via which each of the plurality of UEs receives the MBS may be referred to as a multicast bearer. Also, as in 1*r*-02, when the base station broadcasts or transmits the MBS data for the MBS to only one UE, a bearer via which the UE receives the MBS may be referred to as a unicast bearer.

The UE may receive the MBS based on the multicast service or the multicast bearer or the unicast service or the unicast bearer provided in the disclosure. For example, with respect to the same MBS, a UE 1*r*-05 may receive the MBS via a multicast service or a multicast bearer as in 1*r*-01, or may receive the MBS via a unicast service or a unicast bearer as in 1*r*-02. According to another method, when the UE receives the MBS via the multicast service according to a base station configuration, system information, an RRC message, or an MBS control message as in 1*r*-01, the UE may receive the MBS by configuring, establishing, or re-establishing the multicast bearer, or switching a bearer to the multicast bearer, or when the UE receives the MBS via the unicast service according to a base station configuration, system information, an RRC message, or an MBS control message as in 1*r*-02, the UE may receive the MBS by configuring, establishing, or re-establishing the unicast bearer, or switching a bearer to the unicast bearer. According to another method, the UE may configure one MBS bearer with respect to one MBS and may receive a multicast service or a unicast service based on a mapping relationship of a bearer ID, a logical channel ID, an RNTI, or a first or second ID for an MBS, corresponding to the MBS bearer.

When the UE receives an MBS or is to receive an MBS, the UE may receive the MBS based on a multicast service or a multicast bearer or a unicast service or a unicast bearer according to a configuration of a base station, system information, an RRC message, or an MBS control message.

The first switching method for continually supporting (transmitting or receiving) the MBS or the second switching method for continually supporting (transmitting or receiving) the MBS via switching, provided in this disclosure, may be performed with respect to one or a plural number of the following cases. When one or a plural number of the following conditions are satisfied, the first switching method or the second switching method may be indicated or triggered to the UE by the base station, as an indicator through a configuration of the base station, system information, an RRC message, an MBS control message, MAC control information, RLC control information, PDCP control information, or a PDCCH, or when the UE satisfies one or a plural number of the following conditions, the first switching method or the second switching method may be directly performed (for example, without an indication from the base station).

- When the UE requests, from a network, the first switching method or the second switching method.
- When the UE indicates to the network a preference for a unicast service or a unicast bearer.
- When the UE indicates to the network a preference for a multicast service or a multicast bearer.
- When the base station is to transition the UE into an RRC inactive mode or an RRC idle mode.
- When the UE is to receive an MBS in an RRC inactive mode or an RRC idle mode.
- When the base station is to support an MBS for the UE in an RRC inactive mode or an RRC idle mode.
- When the base station is to transition the UE into an RRC inactive mode, an RRC idle mode, or an RRC connected mode.
- When the UE is to be transitioned into an RRC inactive mode, an RRC idle mode, or an RRC connected mode.
- When the UE is to receive an MBS in an RRC inactive mode, an RRC idle mode, or an RRC connected mode.
- When the base station is to support an MBS for the UE in an RRC inactive mode, an RRC idle mode, or an RRC connected mode.
- When the UE detects or declares a radio link failure.
- When the base station needs the first switching method or the second switching method based on a network transport resource or a scheduling embodiment.
- When the UE needs the first switching method or the second switching method based on a UE capability or configuration information.
- When the UE is not able to support a multicast service or a multicast bearer in a current cell (base station), domain, or system information.
- When the UE is not able to support a unicast service or a unicast bearer in a current cell (base station), domain, or system information.
- When the UE is not able to support a multicast service or a multicast bearer with respect to a certain service in a current cell (base station), domain, or system information.
- When the UE is not able to support a unicast service or a unicast bearer with respect to a certain service in a current cell (base station), domain, or system information.

For example, the base station may configure the UE to receive a first MBS via a multicast service or a multicast bearer in an RRC connected mode. When the UE in the RRC connected mode indicates an intention to receive a service via a unicast service or a unicast bearer, the base station may indicate the first switching method for continually supporting (transmitting or receiving) the MBS by reflecting the preference of the UE via an RRC message or an MBS control message and may further provide the MBS to the UE via the unicast service or the unicast bearer.

Here, an example may also include an opposite case in which a unicast service or a unicast bearer is switched to a multicast service or a multicast bearer. For example, the base station may configure the UE to receive the first MBS via a unicast service or a unicast bearer in an RRC connected mode. When the base station is to transition the UE in the RRC connected mode into an RRC inactive mode or an RRC idle mode, or when the UE is to be transitioned to the RRC inactive mode or the RRC idle mode, the base station may indicate the second switching method for further supporting (transmitting or receiving) the MBS via an RRC message or an MBS control message and may further provide the MBS to the UE via a multicast service or a multicast bearer.

Here, an example may also include an opposite case in which a multicast service or a multicast bearer is switched to a unicast service or a unicast bearer. For example, the base station may configure the UE to receive the first MBS via a multicast service or a multicast bearer in an RRC connected mode. When the base station indicates a handover process to the UE in the RRC connected mode, and when a target base station does not support the first MBS via the multicast service or the multicast bearer or does not support the MBS, the base station may indicate, to the UE, the first switching method for further supporting (transmitting or receiving) the MBS via an RRC message or an MBS control message and may further provide the MBS to the UE via a unicast service or a unicast bearer.

Here, an example may also include an opposite case in which a unicast service or a unicast bearer is switched to a multicast service or a multicast bearer. For example, when the UE wants to receive a certain MBS in an RRC idle mode or an RRC inactive mode, the UE may configure a connection according to system information or with the base station, and may receive the service via a multicast service or a multicast bearer according to an indication of an RRC message or an MBS control message. When the UE in the RRC inactive mode or the RRC idle mode configures or resumes a connection with a network to transmit or receive general data, the base station may indicate the first switching method for further supporting (transmitting or receiving) the MBS according to a determination of the base station or a preference of the UE, via an RRC message or an MBS control message, and may further provide the MBS to the UE via a unicast service or a unicast bearer.

Here, an example may also include an opposite case in which a unicast service or a unicast bearer is switched to a multicast service or a multicast bearer. For example, when the UE wants to receive a certain MBS in an RRC idle mode or an RRC inactive mode, the UE may configure a connection according to system information or with the base station, and may receive a multicast service or a service via a multicast bearer according to an indication of an RRC message or an MBS control message. When the UE in the RRC inactive mode or the RRC idle is moved and is camped on to another cell via cell selection or re-selection, and when the MBS is not supported in the new cell or system information of the new cell (for example, indicated via an indicator), or when the MBS is not supported via a multicast service or a multicast bearer (for example, indicated via an indicator), the UE may configure an RRC connection with the base station and may further receive the MBS via a unicast service or a unicast bearer according to an RRC message or an MBS control message indicating the first switching method for further supporting (transmitting or receiving) the MBS according to a configuration or a determination of the base station.

Here, an example may also include an opposite case in which a unicast service or a unicast bearer is switched to a multicast service or a multicast bearer. The first switching method for further supporting (transmitting or receiving) the MBS or the second switching method for further supporting (transmitting or receiving) the MBS, provided in the disclosure, may be performed by applying one or a combination of the following methods.

A first method: a bearer via which each MBS is received may be configured in the system information, the RRC message, or the MBS control message as described above, and a first ID, a second ID, a bearer ID, a logical channel ID, or an RNTI corresponding to each MBS may be configured or assigned. With respect to a bearer for receiving each MBS, an indicator indicating whether the bearer corresponds to a unicast service or a unicast bearer or a multicast service or a multicast bearer may be configured. According to another method, a first ID, a second ID, a bearer ID, a logical channel ID, or an RNTI may be configured or assigned with respect to a unicast service or a unicast bearer corresponding to each MBS, or a first ID, a second ID, a bearer ID, a logical channel ID, or an RNTI may be configured or assigned with respect to a multicast service or a multicast bearer corresponding to each MBS. Here, when a base station supports the MBS via unicast, the base station may configure MBS data corresponding to IDs or indicators corresponding to the MBS and may transmit the MBS data by indicating a transport resource. When the base station is to support the MBS via multicast, the base station may configure MBS data corresponding to IDs or indicators corresponding to the MBS and may transmit the MBS data by indicating a transport resource. As described above, the base station may apply the first switching method or the second switching method based on the IDs or the indicators. Thus, when the UE receives the MBS data via a bearer configured with respect to the MBS, the UE may identify the ID or the indicator and may identify the logical channel ID, the bearer ID, the first ID, or the second ID, to receive a unicast service or a multicast service for each MBS.

A second method: a bearer via which each MBS is received may be configured in the system information, the RRC message, or the MBS control message as described above, and a first ID, a second ID, a bearer ID, a logical channel ID, or an RNTI corresponding to each MBS may be configured or assigned. Here, with respect to a bearer for receiving each MBS, an indicator indicating whether the bearer corresponds to a unicast service or a unicast bearer or a multicast service or a multicast bearer may be configured. According to another method, a first ID, a second ID, a bearer ID, a logical channel ID, or an RNTI may be configured or assigned with respect to a unicast service or a unicast bearer corresponding to each MBS, or a first ID, a second ID, a bearer ID, a logical channel ID, or an RNTI may be configured or assigned with respect to a multicast service or a multicast bearer corresponding to each MBS. In the second method, the first ID, the second ID, the bearer ID, or the logical channel ID corresponding to each MBS may be configured or assigned. Also, for each MBS, a first RNTI may be assigned with respect to a unicast service of the MBS, and a second RNTI may be assigned with respect to a multicast service of the MBS. Thus, when the base station supports the MBS via unicast, the base station may configure MBS data corresponding to the IDs corresponding to the MBS, scramble a PDCCH by using the first RNTI, indicate a transport resource, and transmit the MBS data. When the base station is to support the MBS via multicast, the base station may configure the MBS data corresponding to the IDs corresponding to the MBS, scramble a PDCCH by using the second RNTI, indicate a transport resource, and transmit the MBS. As described above, the base station may apply the first switching method or the second switching method based on the first RNTI or the second RNTI that are different from each other. Thus, when the UE receives the MBS data via a bearer configured with respect to the MBS, the UE may identify the first RNTI or the second RNTI and may identify the logical channel ID, the bearer ID, the first ID, or the second ID, to receive a unicast service or a multicast service.

A third method: a bearer via which each MBS is received may be configured in the system information, the RRC message, or the MBS control message as described above, and a first ID, a second ID, a bearer ID, a logical channel ID, or an RNTI corresponding to each MBS may be configured or assigned. With respect to a bearer for receiving each MBS, an indicator indicating whether the bearer corresponds to a unicast service or a unicast bearer or a multicast service or a multicast bearer may be configured. According to another method, a first ID, a second ID, a bearer ID, a logical channel ID, or an RNTI may be configured or assigned with respect to a unicast service or a unicast bearer corresponding to each MBS, or a first ID, a second ID, a bearer ID, a logical channel ID, or an RNTI may be configured or assigned with respect to a multicast service or a multicast bearer corresponding to each MBS. In the third method, a first RNTI may be configured or assigned with respect to a unicast service of the MBSs, and a second RNTI may be configured or assigned with respect to a multicast service of the MBSs. Thus, the UE may identify a unicast service or a multicast service based on the first RNTI or the second RNTI, or the base station may support a unicast service or a multicast service based on the first RNTI or the second RNTI. The base station may support the unicast service based on the first RNTI, and in the unicast service, each MBS may be identified based on a bearer ID, a logical channel ID, a first ID, or a second ID, and MBS data may be generated and transmitted. Thus, when the UE receives the unicast service based on the first RNTI, each MBS may be identified based on the bearer ID, the logical channel ID, the first ID, or the second ID, and each MBS data may be received and processed via each MBS bearer. Also, the base station may support the multicast service based on the second RNTI, and in the multicast service, each MBS may be identified based on a bearer ID, a logical channel ID, a first ID, or a second ID, and MBS data may be generated and transmitted. Thus, when the UE receives the multicast service based on the second RNTI, each MBS may be identified based on the bearer ID, the logical channel ID, the first ID, or the second ID, and each MBS data may be received and processed via each MBS bearer. Thus, when the base station supports the MBS via unicast, the base station may configure MBS data corresponding to the IDs corresponding to the MBS, scramble a PDCCH by using the first RNTI, indicate a transport resource, and transmit the MBS data. When the base station is to support the MBS via multicast, the base station may configure the MBS data corresponding to the IDs corresponding to the MBS, scramble a PDCCH by using the second RNTI, indicate a transport resource, and transmit the MBS. As described above, the base station may apply the first switching method or the second switching method based on the first RNTI or the second RNTI that are different from each other. Thus, when the UE receives the MBS data via a bearer configured with respect to the MBS, the UE may identify the first RNTI or the second RNTI and may identify the logical channel ID, the bearer ID, the first ID, or the second ID, to receive a unicast service or a multicast service.

A fourth method: a bearer via which each MBS is received may be configured in the system information, the RRC message, or the MBS control message as described above, and a first ID, a second ID, a bearer ID, a logical channel ID, or an RNTI corresponding to each MBS may be configured or assigned. With respect to a bearer for receiving each MBS, an indicator indicating whether the bearer corresponds to a unicast service or a unicast bearer or a multicast service or a multicast bearer may be configured. According to another method, a first ID, a second ID, a bearer ID, a logical channel ID, or an RNTI may be configured or assigned with respect to a unicast service or a unicast bearer corresponding to each MBS, or a first ID, a second ID, a bearer ID, a logical channel ID, or an RNTI may be configured or assigned with respect to a multicast service or a multicast bearer corresponding to each MBS. In the fourth method, with respect to the first ID, the second ID, the bearer ID, the logical channel ID, or the RNTI corresponding to each MBS, a restriction, a rule, or mapping with respect to a reception of DL data may be configured in system information, an RRC message, or an MBS control message. For example, for each MBS, a DL data logical channel restriction method may be configured. For example, a rule or a restriction (for example, a sub-carrier spacing, a maximum PUSCH duration length, a cyclic transport resource type, an SCell ID, a BWP ID, a cyclic transport resource group, or a physical entity priority order indicator ID) with respect to a data reception, may be configured with respect to an ID corresponding to each MBS (for example, a first ID, a second ID, a logical channel ID, or a bearer ID). That is, a base station may support the MBS by mapping or configuring a type of MBS, a unicast service or a multicast service, with respect to a first rule or restriction (for example, a sub-carrier spacing, a maximum PUSCH duration length, a cyclic transport resource type, an SCell ID, a BWP ID, a cyclic transport resource group, or a physical entity priority order indicator ID). Thus, when the first rule or restriction is configured, the UE may receive a service by configuring MBS data received according to the first rule or restriction to be processed via an MBS bearer corresponding thereto. For example, the base station may support a certain MBS with respect to the first rule or restriction (for example, a sub-carrier spacing, a maximum PUSCH duration length, a cyclic transport resource type, an SCell ID, a BWP ID, a cyclic transport resource group, or a physical entity priority order indicator ID) and may transmit MBS data via unicast. Thus, when the first rule or restriction is configured, the UE may receive a service by configuring the MBS data received according to the first rule or restriction to be processed via an MBS bearer corresponding thereto. For example, the base station may support a certain MBS with respect to a second rule or restriction (for example, a sub-carrier spacing, a maximum PUSCH duration length, a cyclic transport resource type, an SCell ID, a BWP ID, a cyclic transport resource group, or a physical entity priority order indicator ID) and may transmit MBS data via multicast. Thus, when the second rule or restriction is configured, the UE may receive a service by configuring the MBS data received according to the second rule or restriction to be processed via an MBS bearer corresponding thereto. Thus, in the fourth method, the base station may configure a corresponding rule or restriction according to a type of MBS, an RRC mode (for example, an RRC idle mode, an RRC inactive mode, or an RRC connected mode), a unicast service, or a multicast service, and may provide the MBS. Thus, according to the type of MBS, the unicast service, the multicast service, or the RRC mode of the UE, the base station may configure, as a restriction or a rule, an exclusive transport resource, an exclusive carrier (cell), an exclusive BWP ID, an exclusive sub-carrier spacing, or a priority order, corresponding to the type of MBS, the unicast service, the multicast service, or the RRC mode of the UE, and may provide the MBS. Also, the UE may receive each MBS via unicast or multicast according to the configured restriction or rule. The base station or the UE may perform the first switching method or the second switching method by configuring a different rule or restriction for a respective MBS. For example, a logical channel ID of a certain MBS may be mapped or configured as a first SCell ID (or BWP ID) or a second SCell ID (or BWP ID), and the base station may support a unicast service via the first SCell ID (or BWP ID) and may support a multicast service via the second SCell ID (or BWP ID). According to another method, the base station or the UE may restrict all MBSs to the unicast service via the first SCell ID (or BWP ID) and with respect to data received in an SCell (or a BWP) corresponding to the first SCell ID (or BWP ID), the base station or the UE may provide or receive a service by identifying different MBS data based on a logical channel ID (or a bearer ID). According to another method, the base station or the UE may restrict all MBSs to the multicast service via the second SCell ID (or BWP ID) and with respect to data received in an SCell (or a BWP) corresponding to the second SCell ID (or BWP ID), the base station or the UE may provide or receive a service by identifying different MBS data based on a logical channel ID (or a bearer ID). As described above, the restriction or rule with respect to each MBS may be variously configured or mapped, and the base station or the UE may support each MBS, the unicast service, or the multicast service, or the MBS may be supported in the RRC connected mode, the RRC idle mode, or the RRC inactive mode.

A fifth method: a bearer via which each MBS is received may be configured in the system information, the RRC message, or the MBS control message as described above, and a first ID, a second ID, a bearer ID, a logical channel ID, or an RNTI corresponding to each MBS may be configured or assigned. With respect to a bearer for receiving each MBS, an indicator indicating whether the bearer corresponds to a unicast service or a unicast bearer or a multicast service or a multicast bearer may be configured. According to another method, a first ID, a second ID, a bearer ID, a logical channel ID, or an RNTI may be configured or assigned with respect to a unicast service or a unicast bearer corresponding to each MBS, or a first ID, a second ID, a bearer ID, a logical channel ID, or an RNTI may be configured or assigned with respect to a multicast service or a multicast bearer corresponding to each MBS. In the fifth method, when the first switching method or the second switching method is triggered or applied with respect to a first ID, a second ID, a bearer ID, a logical channel ID, or an RNTI corresponding to each MBS, a bearer with respect to the MBS may be released, a new MBS bearer may be configured, and MBS data may be received through an RRC message, system information, an MBS control message, or MAC control information. For example, when the first switching method is indicated with respect to a certain MBS, a UE may release a multicast bearer via which the UE receives the MBS, may newly configure a unicast bearer with respect to the MBS (for example, may also newly configure IDs corresponding to the MBS), and may receive MBS data. For example, when the second switching method is indicated with respect to a certain MBS, a UE may release a unicast bearer via which the UE receives the MBS, may newly configure a multicast bearer with respect to the MBS (for example, may also newly configure IDs corresponding to the MBS), and may receive MBS data. According to another method, the UE or a base station may configure both a unicast bearer and a multicast bearer for each MBS to receive the MBS and may apply the first switching method or the second switching method. When the switching method is applied, an indicator indicating which data is the last data may be adopted, so that data may be sequentially transmitted to an upper entity during the switching. According to another method, the first switching method or the second switching method may be applied with respect to an MBS bearer supporting each MBS by an SDAP entity via QoS flow reconfiguration or remapping (mapping configuration between a QoS flow and a bearer). When the switching method is applied by adopting the indicator indicating which data is the last data, data may be sequentially transmitted to an upper entity when the switching is performed.

In the first switching method or the second switching method provided in the disclosure, the base station may configure a timer value through an RRC message, system information, or an MBS control message, and when the timer is expired, the base station may perform or trigger the first switching method or the second switching method. The timer may be configured for each bearer (for example, a unicast bearer, a multicast bearer, or each MBS bearer), for each MBS, or for each ID. The timer may be started or resumed when a bearer is configured or whenever an MBS is received, and the timer may be suspended when a bearer is released, an MBS is suspended or stopped, or an indicator indicating a suspension of an MBS is received. When the timer is expired, the first switching method or the second switching method may be performed or triggered.

In the disclosure, when the MBS is supported via a multicast service, the multicast service may be supported only in a default BWP or an initial BWP. That is because, when the MBS is supported in the default BWP or the initial BWP via multicast as described above, the UE in an RRC idle mode or an RRC inactive mode may also easily receive the MBS.

Next, the disclosure provides an operation of a UE, when a base station indicates to the UE or triggers the first switching method, the second switching method, releasing of a bearer, or configuring of a bearer by using an indicator via a configuration of the base station, system information, an RRC message, an MBS control message, MAC control information, RLC control information, PDCP control information, or a PDCCH. The operation of the UE may be performed by applying one or a combination of the following methods.

A first method: when the UE receives an indication, and when there is MBS data stored via an MBS bearer (for example, an MAC entity, an RLC entity, or a PDCP entity) (or when there is data that is not yet transmitted to an upper entity), the UE may discard all the stored data. Alternatively, the RLC entity or the PDCP entity may perform variable initialization (for example, initialization as 0) or reconfiguration (for example, configuration as a specific value). According to another method, the RLC entity may update a reception window variable (for example, RX_NEXT or RX_NEXT_Highest) as an RLC serial number of received data+1. According to another method, the PDCP entity may update a reception window variable (for example, RX_NEXT, RX_DELIV, or RX_REORD) as a PDCP serial number (or a COUNT value) of received data+1 or may configure an HFN value as 1.

A second method: when the UE receives an indication, and when there is MBS data stored via the MBS bearer (for example, the MAC entity, the RLC entity, or the PDCP entity) (or when there is data that is not yet transmitted to an upper entity), the UE may perform data processing on the data and may transmit the processed data to an upper entity (for example, the UE may transmit the processed data to the upper entity in an order in which the data is received or in an ascending order of a serial number). Alternatively, the RLC entity or the PDCP entity may perform variable initialization (for example, initialization as 0) or reconfiguration (for example, configuration as a specific value). According to another method, the RLC entity may update a reception window variable (for example, RX_NEXT or RX_NEXT_Highest) as an RLC serial number of received data+1. According to another method, the PDCP entity may update a reception window variable (for example, RX_NEXT, RX_DELIV, or RX_REORD) as a PDCP serial number (or a COUNT value) of received data+1 or may configure an HFN value as 1.

A third method: when the UE receives an indication, and when a reordering function is configured or performed via the MBS bearer (for example, the MAC entity, the RLC entity, or the PDCP entity), the UE may suspend or initialize a reordering timer, or when there is stored MBS data (or when there is data that is not yet transmitted to an upper entity), the UE may perform data processing on the data and may transmit the processed data to an upper entity (for example, the UE may transmit the data to the upper entity in an order in which the data is received or in an ascending order of a serial number). Alternatively, the RLC entity or the PDCP entity may perform variable initialization (for example, initialization as 0) or reconfiguration (for example, configuration as a specific value). According to another method, the RLC entity may update a reception window variable (for example, RX_NEXT or RX_NEXT_Highest) as an RLC serial number of received data+1. According to another method, the PDCP entity may update a reception window variable (for example, RX_NEXT, RX_DELIV, or RX_RE-ORD) as a PDCP serial number (or a COUNT value) of received data+1 or may configure an HFN value as 1.

A fourth method: when the UE receives an indication, and when a reordering function is configured, a reordering function is performed, or a header compression procedure (or a data compression procedure) is configured via the MBS bearer (for example, the MAC entity, the RLC entity, or the PDCP entity), the UE may suspend or initialize a reordering timer, or when there is stored MBS data (or when there is data that is not yet transmitted to an upper entity), the UE may perform a header compression release procedure (for example, when the header compression release procedure has not been performed) on the MBS data and may transmit the data to an upper entity (for example, the UE may transmit the data to the upper entity in an order in which the data is received or in an ascending order of a serial number). Then, the UE may release the MBS bearer. Alternatively, the RLC entity or the PDCP entity may perform variable initialization (for example, initialization as 0) or reconfiguration (for example, configuration as a specific value). According to another method, the RLC entity may update a reception window variable (for example, RX_NEXT or RX_NEXT_Highest) as an RLC serial number of received data+1. According to another method, the PDCP entity may update a reception window variable (for example, RX_NEXT, RX_DELIV, or RX_REORD) as a PDCP serial number (or a COUNT value) of received data+1 or may configure a HFN value as 1.

Figure 1S:
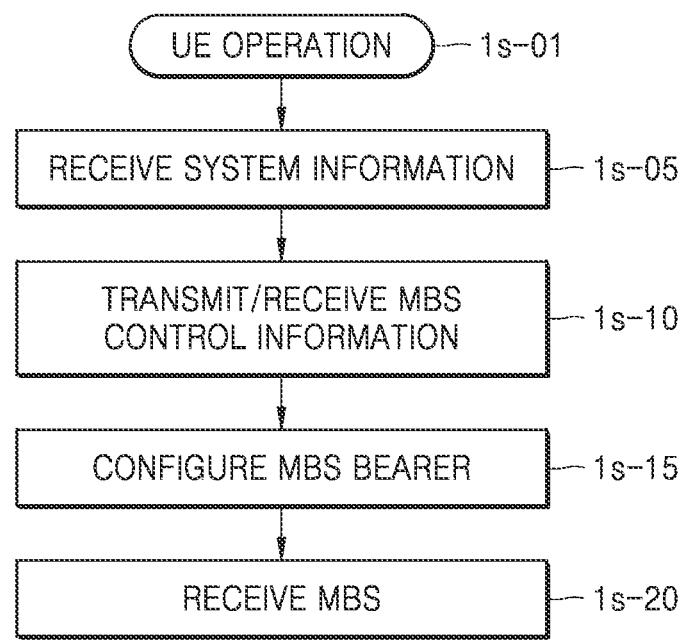
FIG. 1S is a diagram of an operation of a terminal, according to an embodiment of the disclosure.

FIG. 1S illustrates a UE operation 1s-01 provided according to an embodiment of the disclosure.

Referring to FIG. 1S, a UE may camp-on or access a cell, may receive system information 1s-05 in an RRC idle mode, an RRC inactive mode, or an RRC connected mode, and may identify whether or not an MBS is supported, a type of MBS that is supported, a configuration of an MBS, etc., according to the first, second, third, or fourth signaling procedure provided in the disclosure.

The UE may receive or transmit (for example, may be indicated with or indicate a request, an interest, or a preference with respect to an MBS) MBS control information (MBS-related configuration information) from or to a base station (1s-10).

When an MBS is supported, or an MBS in which the UE is interested or which the UE is to receive is supported, the UE may configure an MBS bearer based on the method provided in FIG. 1G of the disclosure (1s-15). Also, the UE may receive MBS data according to an MBS configuration. Also, the UE may receive the MBS data and the MBS based on the method provided in FIG. 1H of the disclosure (1s-20).

Also, by applying various methods provided in this disclosure, the UE may further receive, suspend, or resume the MBS.

Figure 1T:
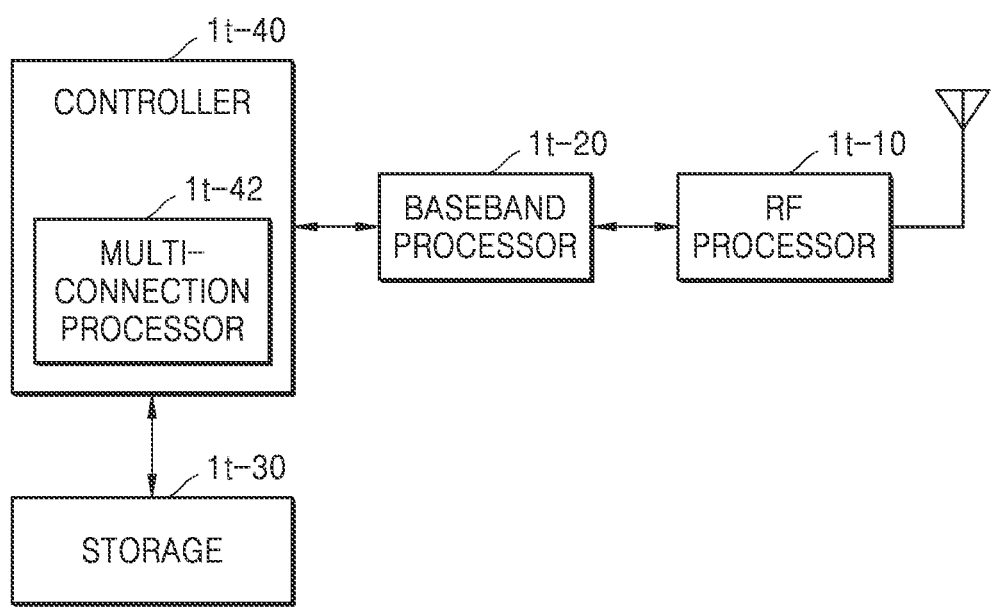
FIG. 1T is a diagram of a structure of a terminal, according to an embodiment of the disclosure.

FIG. 1T is a diagram of a structure of a UE, according to an embodiment of the disclosure.

Referring to FIG. 1T, the UE may include an RF processor 1t-10, a baseband processor 1t-20, a storage 1t-30, and a controller 1t-40.

The RF processor 1t-10 may perform a function for transmitting and receiving a signal through a wireless channel, such as signal band conversion, amplification, etc. That is, the RF processor 1t-10 may perform upward conversion on a baseband signal provided from the baseband processor 1t-20 to an RF band signal, may transmit the RF band signal through an antenna, and may perform downward conversion on an RF band signal received through the antenna to a baseband signal. For example, the RF processor 1t-10 may include a transmission filter, a reception filter, an amplifier, a mixer, an oscillator, a digital-to-analog converter (DAC), an analog-to-digital converter (ADC), etc. In FIG. 1T, only one antenna is illustrated. However, the UE may include a plurality of antennas. Also, the RF processor 1t-10 may include a plurality of RF chains. In addition, the RF processor 1t-10 may perform beamforming. For beamforming, the RF processor 1t-10 may adjust a phase and a magnitude of each of signals transceived through the antennas or antenna elements. Also, the RF processor 1t-10 may perform a multi-input and multi-output (MIMO) operation and may receive a plurality of layers while performing the MIMO operation. The RF processor 1t-10 may appropriately configure the plurality of antennas or the antenna elements according to control by the controller to perform sweeping of a reception beam or adjust a direction and a beam width of the reception beam such that the reception beam may cooperate with a transmission beam.

The baseband processor 1t-20 may perform conversion between a baseband signal and a bit string according to a physical entity standard of a system. For example, during data transmission, the baseband processor 1t-20 may generate complex symbols by encoding and modulating a transmitted bit string. Also, during data reception, the baseband processor 1t-20 may reconstruct a received bit string by demodulating and decoding the baseband signal provided from the RF processor 1t-10. For example, according to OFDM, during data transmission, the baseband processor 1t-20 may generate complex symbols by encoding and modulating the transmitted bit string, may map the complex symbols to sub-carrier waves, and then, may perform inverse fast Fourier transform (IFFT) and cyclic prefix (CP) to construct OFDM symbols. Also, during data reception, the baseband processor 1t-20 may split a baseband signal provided from the RF processor 1t-10 into units of an OFDM symbol, may reconstruct signals mapped to sub-carrier waves by performing fast Fourier transform (FFT), and then, may reconstruct the received bit string via demodulation and decoding.

The baseband processor 1t-20 and the RF processor 1t-10 may transmit and receive signals as described above. Accordingly, the baseband processor 1t-20 and the RF processor 1t-10 may be referred to as a transmitter, a receiver, a transceiver, or a communicator. Further, at least one of the baseband processor 1t-20 or the RF processor 1t-10 may include a plurality of communication modules to support a plurality of different radio access technologies. Also, at least one of the baseband processor 1t-20 or the RF processor 1t-10 may include different communication modules for processing signals of different frequency bands. For example, the different radio access technologies may include an LTE network, an NR network, etc. Also, the different frequency bands may include a super high frequency (SHF) (for example, 2.5 GHz to 5 GHz) band and a millimeter (mm) wave (for example, 60 GHz) band.

The storage 1t-30 may store basic programs, application programs, or data such as configuration information for operations of the UE. The storage 1t-30 may provide the stored data in response to a request of the controller 1t-40.

The controller 1t-40 may control general operations of the UE. For example, the controller 1t-40 may transmit and receive signals through the baseband processor 1t-20 and the RF processor 1t-10. Also, the controller 1t-40 may record and read data to and from the storage 1t-30. To this end, the controller 1t-40 may include at least one multi-connection processor 1t-42. For example, the controller 1t-40 may include a communication processor (CP) performing a control operation for communication and an application processor (AP) performing a control operation for an upper entity, such as an application program.

Figure 1U:
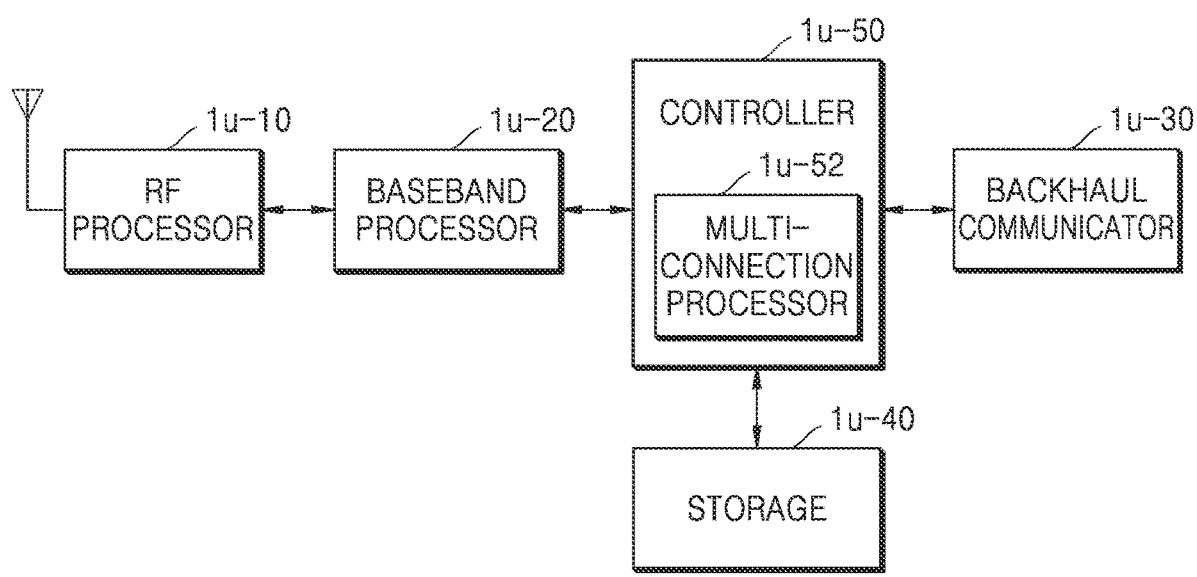
FIG. 1U is a block diagram of a Tx/Rx point (TRP), according to an embodiment of the disclosure.

FIG. 1U is a block diagram of a Tx/Rx point (TRP) in a wireless communication system, according to an embodiment of the disclosure.

Referring to FIG. 1U, the base station may include an RF processor 1u-10, a baseband processor 1u-20, a backhaul communicator 1u-30, a storage 1u-40, and a controller 1u-50.

The RF processor 1u-10 may perform a function for transmitting and receiving a signal through a wireless channel, such as signal band conversion, amplification, etc. That is, the RF processor 1u-10 may perform upward conversion on a baseband signal provided from the baseband processor 1u-20 to an RF band signal, may transmit the RF band signal through an antenna, and may perform downward conversion on an RF band signal received through the antenna to a baseband signal. For example, the RF processor 1u-10 may include a transmission filter, a reception filter, an amplifier, a mixer, an oscillator, a DAC, an ADC, etc. In FIG. 1U, only one antenna is illustrated. However, a first connection node may include a plurality of antennas. Also, the RF processor 1u-10 may include a plurality of RF chains. Further, the RF processor 1u-10 may perform beamforming. For beamforming, the RF processor 1u-10 may adjust a phase and a magnitude of each of signals transceived through the antennas or antenna elements. The RF processor 1u-10 may perform downward MIMO by transmitting one or more layers.

The baseband processor 1u-20 may perform conversion between a baseband signal and a bit string according to a physical entity standard of a first radio access technology. For example, during data transmission, the baseband processor 1u-20 may generate complex symbols by encoding and modulating a transmitted bit string. Also, during data reception, the baseband processor 1u-20 may reconstruct a received bit string by demodulating and decoding the baseband signal provided from the RF processor 1u-10. For example, according to OFDM, during data transmission, the baseband processor 1u-20 may generate complex symbols by encoding and modulating the transmitted bit string, may map the complex symbols to sub-carrier waves, and then, may perform IFFT and CP to construct OFDM symbols. Also, during data reception, the baseband processor 1u-20 may split a baseband signal provided from the RF processor 1u-10 into units of an OFDM symbol, may reconstruct signals mapped to sub-carrier waves by performing FFT, and then, may reconstruct the received bit string via demodulation and decoding. The baseband processor 1u-20 and the RF processor 1u-10 may transmit and receive signals as described above. Accordingly, the baseband processor 1u-20 and the RF processor 1u-10 may be referred to as a transmitter, a receiver, a transceiver, or a communicator.

The communicator 1u-30 may provide an interface for performing communication with other nodes in a network.

The storage 1u-40 may store basic programs, application programs, or data such as configuration information for operations of a base station. In particular, the storage 1u-40 may store information about a bearer assigned to an accessed UE, measurement results reported from the accessed UE, etc. Also, the storage 1u-40 may provide information which may be used as a reference for determining whether to provide or suspend multiple connection. Also, the storage 1u-40 may provide the stored data in response to a request of the controller 1u-50.

The controller 1u-50 may control general operations of the base station. For example, the controller 1u-50 may transmit and receive signals through the baseband processor 1u-20 and the RF processor 1u-10, or through the backhaul communicator 1u-30. Also, the controller 1u-50 may record and read data to and from the storage 1u-40. To this end, the controller 1u-50 may include at least one multi-connection processor 1u-52.

The disclosure provides a structure or a configuration method of a multicast bearer or a unicast bearer supporting an MBS, and a data processing method of a PHY entity, an MAC entity, an RLC entity, or a PDCP entity receiving and processing MBS data, for supporting the MBS in a next-generation mobile communication system.

Also, the disclosure provides a signaling procedure or an operation of a UE for further supporting an MBS in an RRC connected mode, an RRC idle mode, or an RRC inactive mode, or during conversion between the RRC connected mode, the RRC idle mode, and the RRC inactive mode.

Also, the disclosure provides a method of reconfiguring (or switching) a multicast bearer to a unicast bearer or a unicast bearer to a multicast bearer for supporting an MBS, according to a handover process between a base station supporting the MBS and a network or according to mobility of a UE.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A method performed by a user equipment (UE) in a wireless communication system, the method comprising:
receiving configuration information on a multicast broadcast service (MBS); and
receiving, based on the configuration information, the MBS in a radio resource control (RRC) connected mode,
wherein the MBS is transmitted to a plurality of UEs including the UE for multicast transmission, or to the UE for unicast transmission,
wherein a hybrid automatic repeat and request (HARQ) retransmission is applied to a transmission of the MBS,
wherein a service data adaptation protocol (SDAP) entity is configured for a bearer of the MBS, and
wherein a mapping information between a quality of service (QoS) flow and the bearer of the MBS is configured.

2. The method of claim 1,
wherein the bearer for the MBS includes a packet data convergence protocol (PDCP) entity.

3. The method of claim 2,
wherein the PDCP entity provides a header compression function by using a robust header compression (ROHC) and a PDCP reordering function.

4. The method of claim 1,
wherein the bearer for the MBS includes at least one of radio link control (RLC) acknowledged mode (AM) or RLC unacknowledged mode (UM) for dynamic switch between the unicast transmission and the multicast transmission.

5. The method of claim 4,
wherein the MBS is scheduled by using a cell-radio network temporary identifier (C-RNTI) for the unicast transmission, and a MBS-radio network temporary identifier (MBS-RNTI) for the multicast transmission.

6. A method performed by a base station in a wireless communication system, the method comprising:
transmitting, to a user equipment (UE), configuration information on a multicast broadcast service (MBS); and
transmitting, based on the configuration information, the MBS in a radio resource control (RRC) connected mode,
wherein the MBS is transmitted to a plurality of UEs including the UE for multicast transmission, or to the UE for unicast transmission,
wherein a hybrid automatic repeat and request (HARQ) retransmission is applied to a transmission of the MBS,
wherein a service data adaptation protocol (SDAP) entity is configured for a bearer of the MBS, and
wherein a mapping information between a quality of service (QoS) flow and the bearer of the MBS is configured.

7. The method of claim 6,
wherein the bearer for the MBS includes a packet data convergence protocol (PDCP) entity.

8. The method of claim 7,
wherein the PDCP entity provides a header compression function by using a robust header compression (ROHC) and a PDCP reordering function.

9. The method of claim 6,
wherein the bearer for the MBS includes at least one of radio link control (RLC) acknowledged mode (AM) or RLC unacknowledged mode (UM) for dynamic switch between the unicast transmission and the multicast transmission.

10. The method of claim 9,
wherein the MBS is scheduled by using a cell-radio network temporary identifier (C-RNTI) for the unicast transmission, and a MBS-radio network temporary identifier (MBS-RNTI) for the multicast transmission.

11. A user equipment (UE) in a wireless communication system, the UE comprising:
a transceiver; and
at least one processor operatively connected with the transceiver and configured to:
receive configuration information on a multicast broadcast service (MBS), and
receive, based on the configuration information, the MBS in a radio resource control (RRC) connected mode,
wherein the MBS is transmitted to a plurality of UEs including the UE for multicast transmission, or to the UE for unicast transmission,
wherein a hybrid automatic repeat and request (HARQ) retransmission is applied to a transmission of the MBS,
wherein a service data adaptation protocol (SDAP) entity is configured for a bearer of the MBS, and
wherein a mapping information between a quality of service (QoS) flow and the bearer of the MBS is configured.

12. The UE of claim 11,
wherein the bearer for the MBS includes a packet data convergence protocol (PDCP) entity.

13. The UE of claim 12,
wherein the PDCP entity provides a header compression function by using a robust header compression (ROHC) and a PDCP reordering function.

14. The UE of claim 11,
wherein the bearer for the MBS includes at least one of radio link control (RLC) acknowledged mode (AM) or RLC unacknowledged mode (UM) for dynamic switch between the unicast transmission and the multicast transmission.

15. The UE of claim 14,
wherein the MBS is scheduled by using a cell-radio network temporary identifier (C-RNTI) for the unicast transmission, and a MBS-radio network temporary identifier (MBS-RNTI) for the multicast transmission.

16. A base station in a wireless communication system, the base station comprising:
a transceiver; and
at least one processor operatively connected with the transceiver and configured to:
transmit, to a user equipment (UE), configuration information on a multicast broadcast service (MBS), and
transmit, based on the configuration information, the MBS in a radio resource control (RRC) connected mode,
wherein the MBS is transmitted to a plurality of UEs including the UE for multicast transmission, or to the UE for unicast transmission,
wherein a hybrid automatic repeat and request (HARQ) retransmission is applied to a transmission of the MBS,
wherein a service data adaptation protocol (SDAP) entity is configured for a bearer of the MBS, and
wherein a mapping information between a quality of service (QoS) flow and the bearer of the MBS is configured.

17. The base station of claim 16,
wherein the bearer for the MBS includes a packet data convergence protocol (PDCP) entity.

18. The base station of claim 17,
wherein the PDCP entity provides a header compression function by using a robust header compression (ROHC) and a PDCP reordering function.

19. The base station of claim 16,
wherein the bearer for the MBS includes at least one of radio link control (RLC) acknowledged mode (AM) or RLC unacknowledged mode (UM) for dynamic switch between the unicast transmission and the multicast transmission.

20. The base station of claim 19,
wherein the MBS is scheduled by using a cell-radio network temporary identifier (C-RNTI) for the unicast transmission, and a MBS-radio network temporary identifier (MBS-RNTI) for the multicast transmission.

* * * * *